United States Patent
Abe et al.

(10) Patent No.: US 10,775,216 B2
(45) Date of Patent: Sep. 15, 2020

(54) PHYSICAL QUANTITY DETECTING DEVICE WITH A CIRCUIT BOARD THAT HAS PROJECTIONS TO REPEL WATER

(71) Applicant: HITACHI AUTOMOTIVE SYSTEMS, LTD., Ibaraki (JP)

(72) Inventors: Hiroyuki Abe, Hitachinaka (JP); Takayuki Yogo, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 206 days.

(21) Appl. No.: 15/770,996

(22) PCT Filed: Oct. 5, 2016

(86) PCT No.: PCT/JP2016/079560
§ 371 (c)(1),
(2) Date: Apr. 25, 2018

(87) PCT Pub. No.: WO2017/073272
PCT Pub. Date: May 4, 2017

(65) Prior Publication Data
US 2019/0056253 A1 Feb. 21, 2019

(30) Foreign Application Priority Data
Oct. 30, 2015 (JP) .................... 2015-213639

(51) Int. Cl.
*G01F 1/684* (2006.01)

(52) U.S. Cl.
CPC ............ *G01F 1/684* (2013.01); *G01F 1/6842* (2013.01)

(58) Field of Classification Search
CPC ................. G01F 1/684; G01F 1/6842
See application file for complete search history.

(56) References Cited

U.S. PATENT DOCUMENTS

| 7,527,832 B2 * | 5/2009 | Sakoske | ................. C03C 17/04 427/446 |
| 9,322,686 B2 * | 4/2016 | Kono | ..................... G01F 1/692 |

(Continued)

FOREIGN PATENT DOCUMENTS

| JP | 2009-243996 A | 10/2009 | |
| JP | 2014-174064 A | 9/2014 | |
| WO | WO-2013151112 A1 * | 10/2013 | ........... G01F 1/6842 |

OTHER PUBLICATIONS

International Search Report for WO 2017/073272 A1, dated Jan. 24, 2017.

*Primary Examiner* — Justin N Olamit
(74) *Attorney, Agent, or Firm* — Volpe and Koenig, P.C.

(57) ABSTRACT

Provided is a physical-quantity detecting device having high reliability by preventing water droplets from attaching to a diaphragm area. A physical-quantity detecting device according to the present invention includes: a circuit board having provided thereon at least one detecting unit that detects a physical quantity of gas to be measured that passes through a main passage and also having provided thereon a circuit unit that executes computational processing on the physical quantity detected by the detecting unit; and a housing accommodating the circuit board, wherein the physical-quantity detecting unit on the circuit board is constructed to be exposed to the main passage. Furthermore, convex projections are provided around a through hole directly communicating with the physical-quantity detecting unit implemented on the circuit board.

13 Claims, 62 Drawing Sheets

(56) References Cited

U.S. PATENT DOCUMENTS

2009/0241660 A1 10/2009 Nakano et al.
2012/0324990 A1 12/2012 Briese
2017/0030753 A1* 2/2017 Wienand ............... G01F 1/6842

* cited by examiner

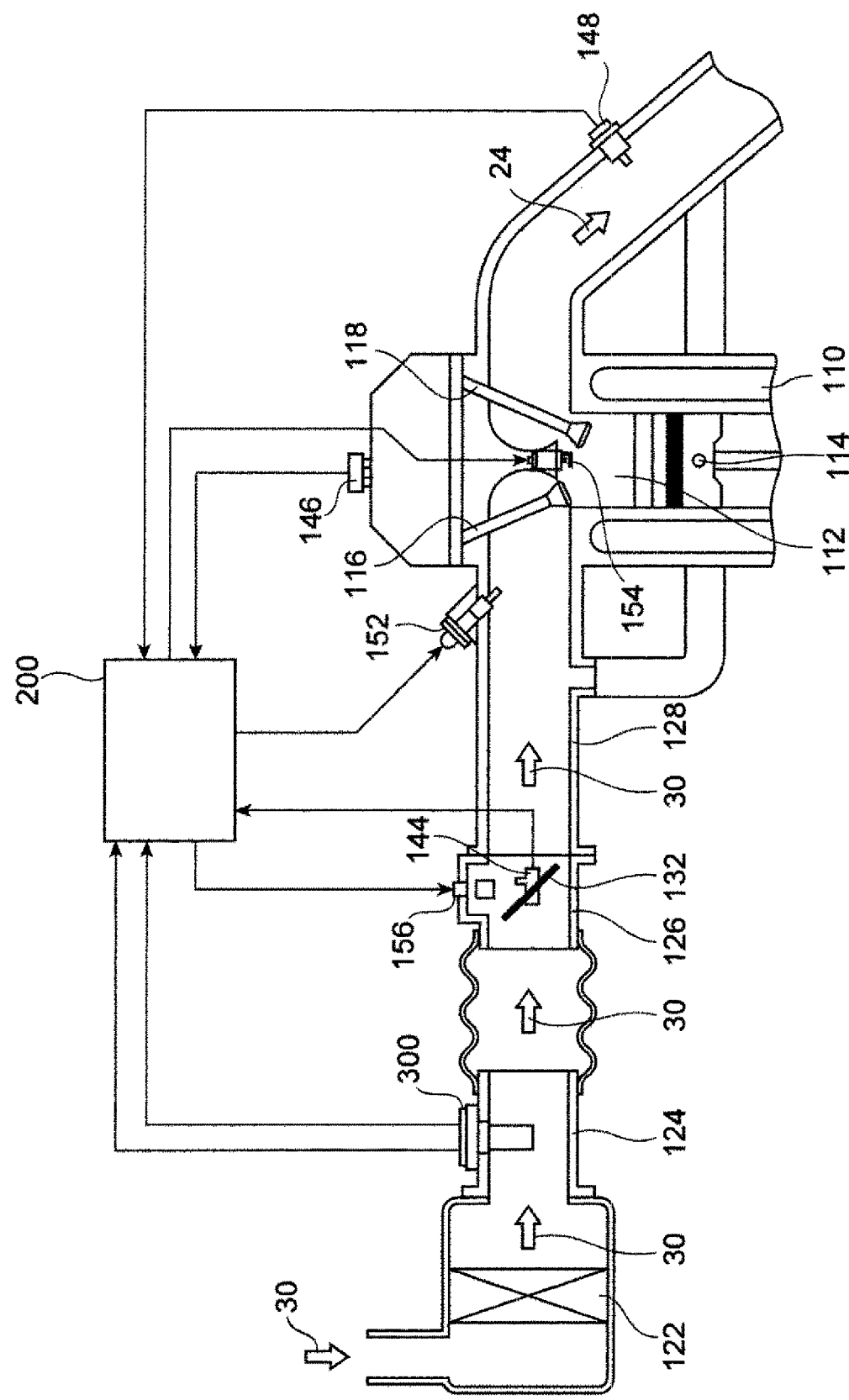
[Fig. 1]

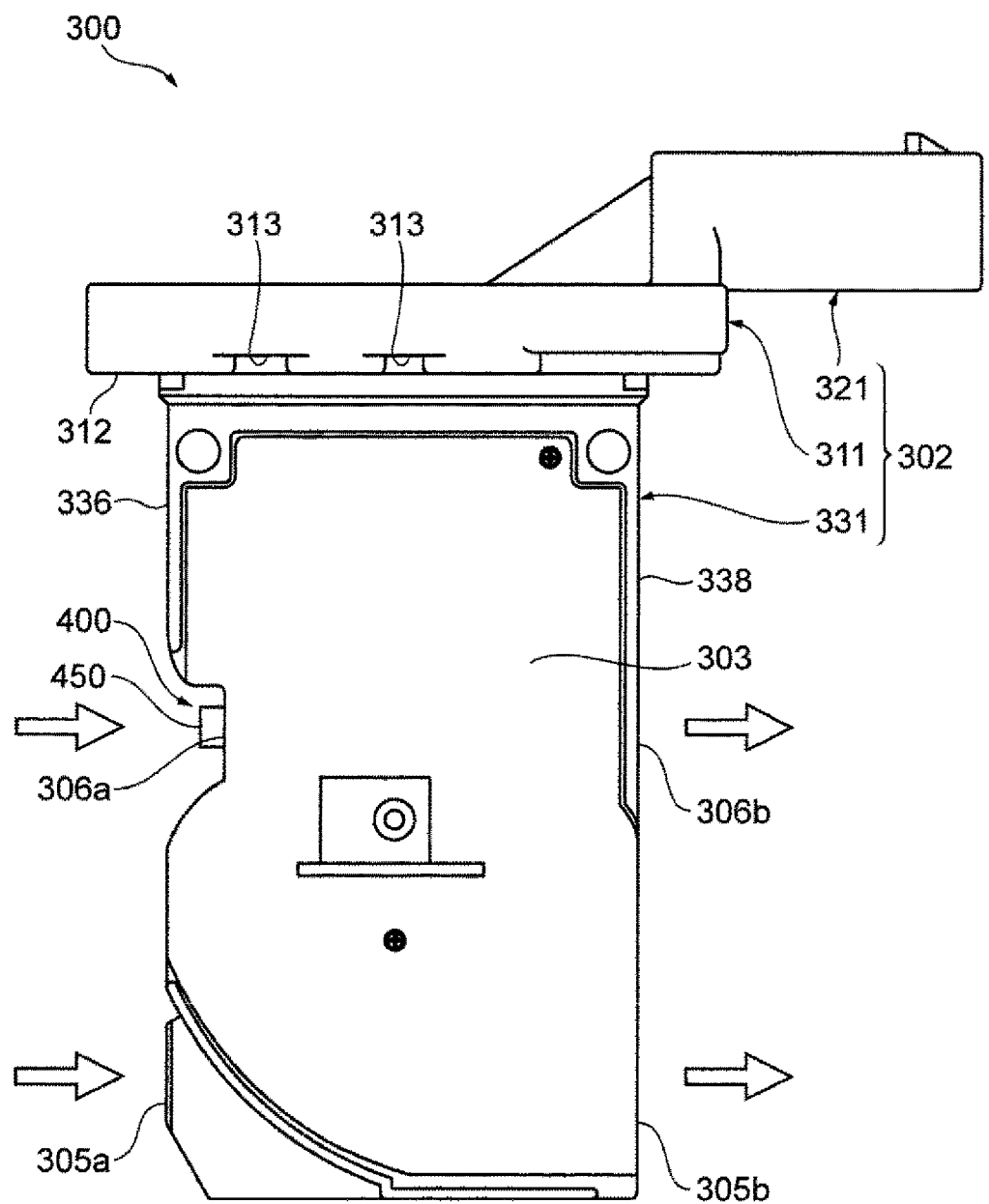
[Fig. 2-1]

[Fig. 2-2]
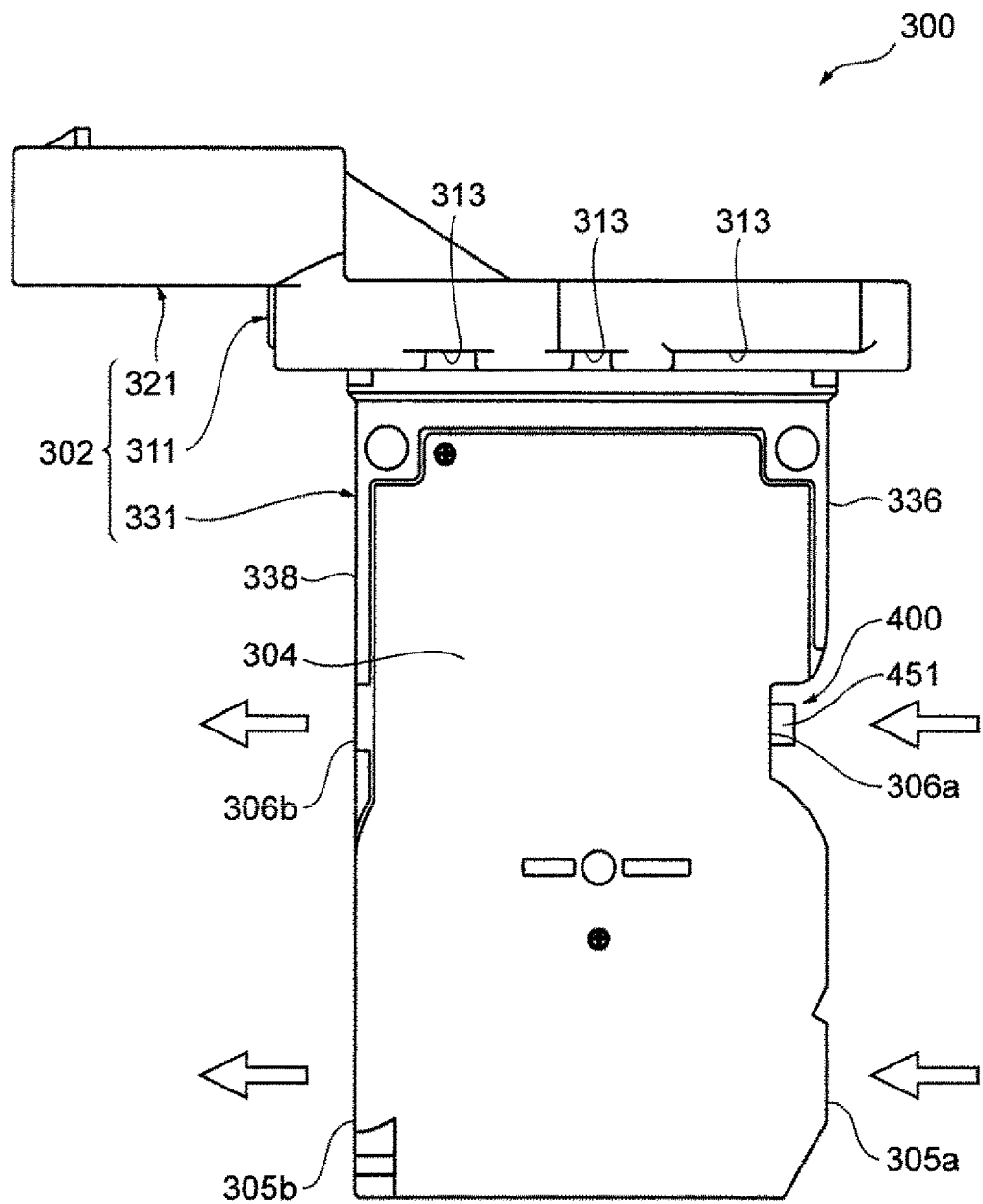

[Fig. 2-3]
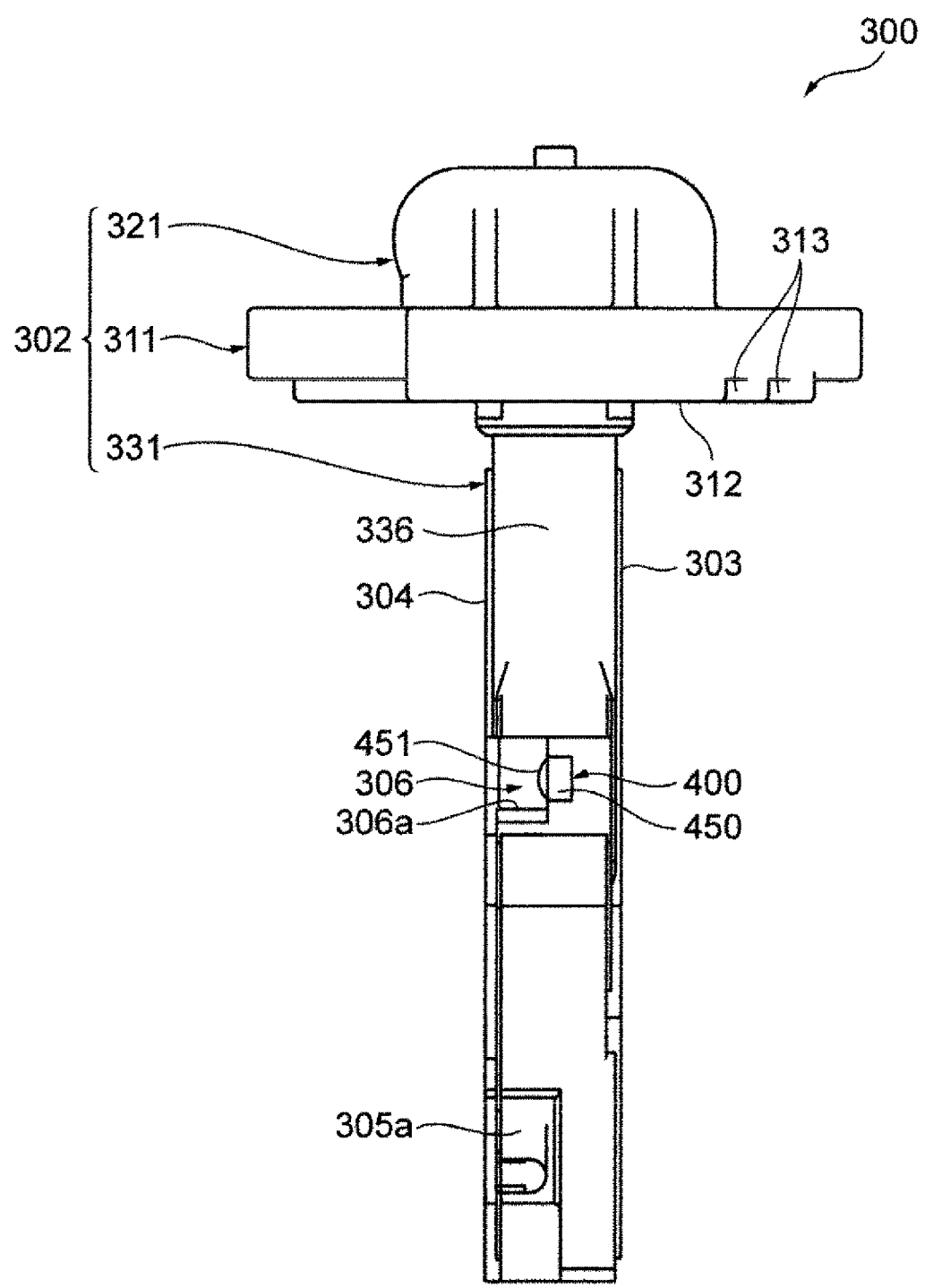

[Fig. 2-4]
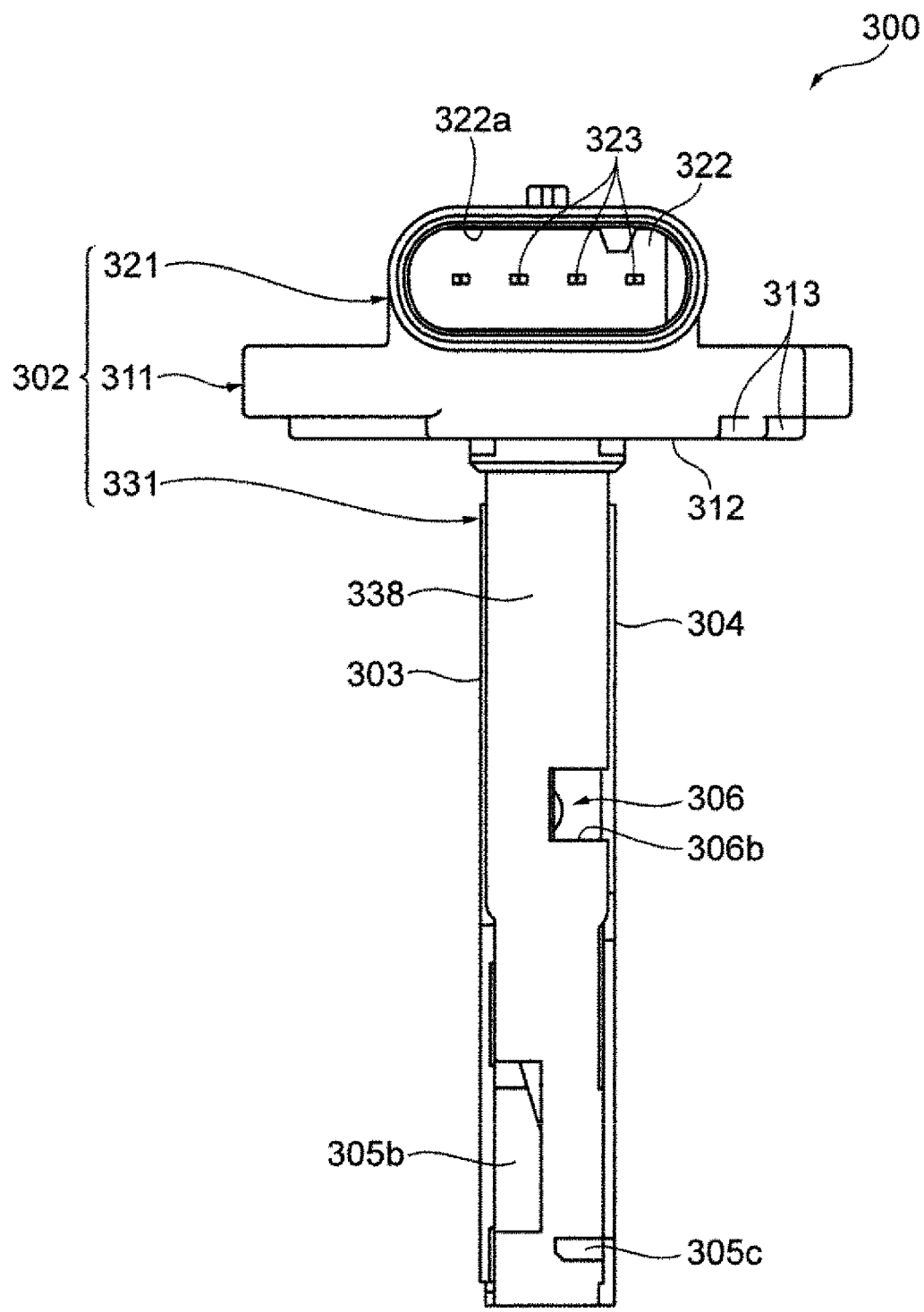

[Fig. 2-5]
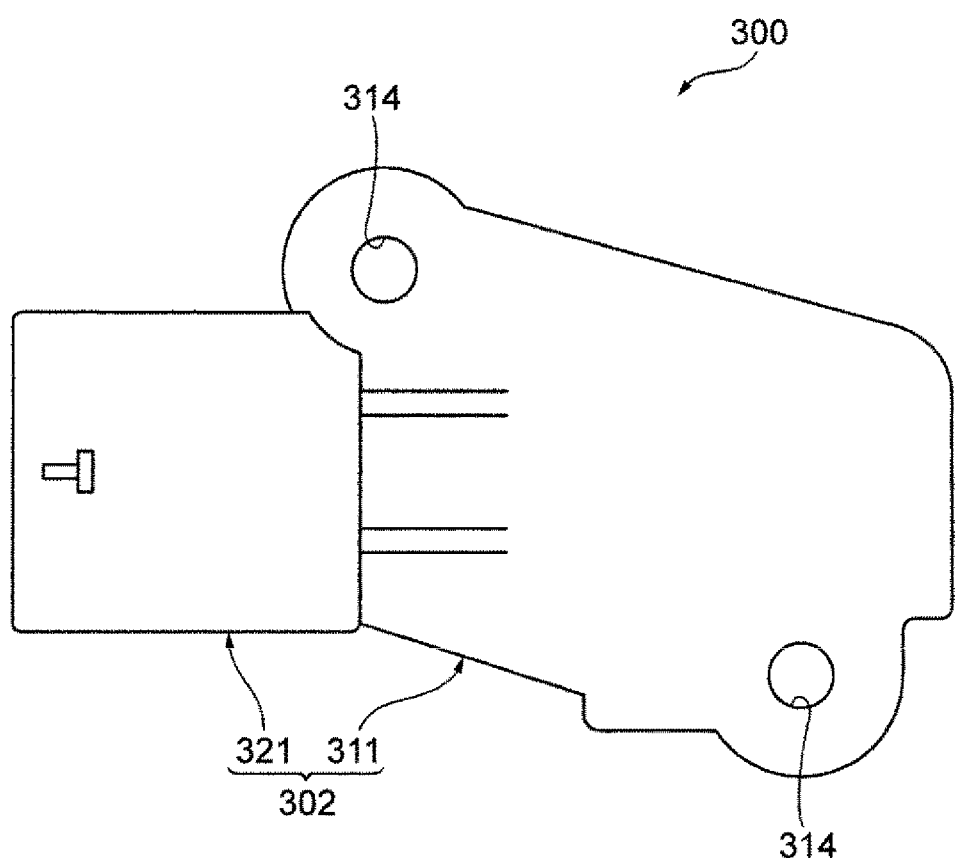

[Fig. 2-6]
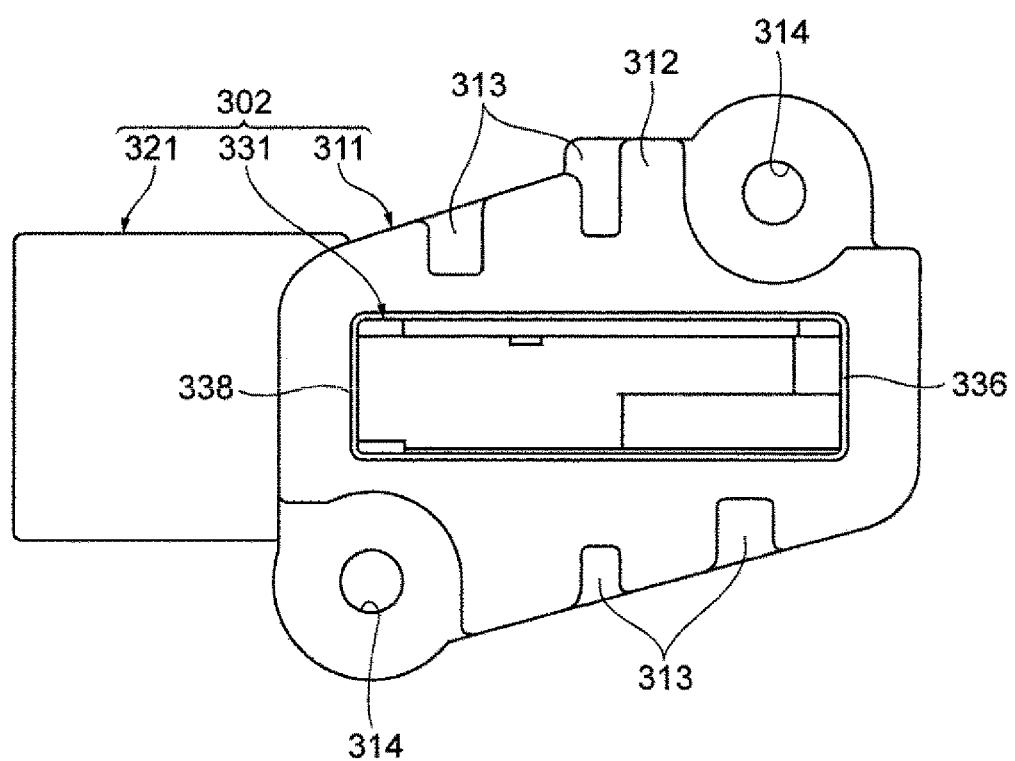

[Fig. 3-1]
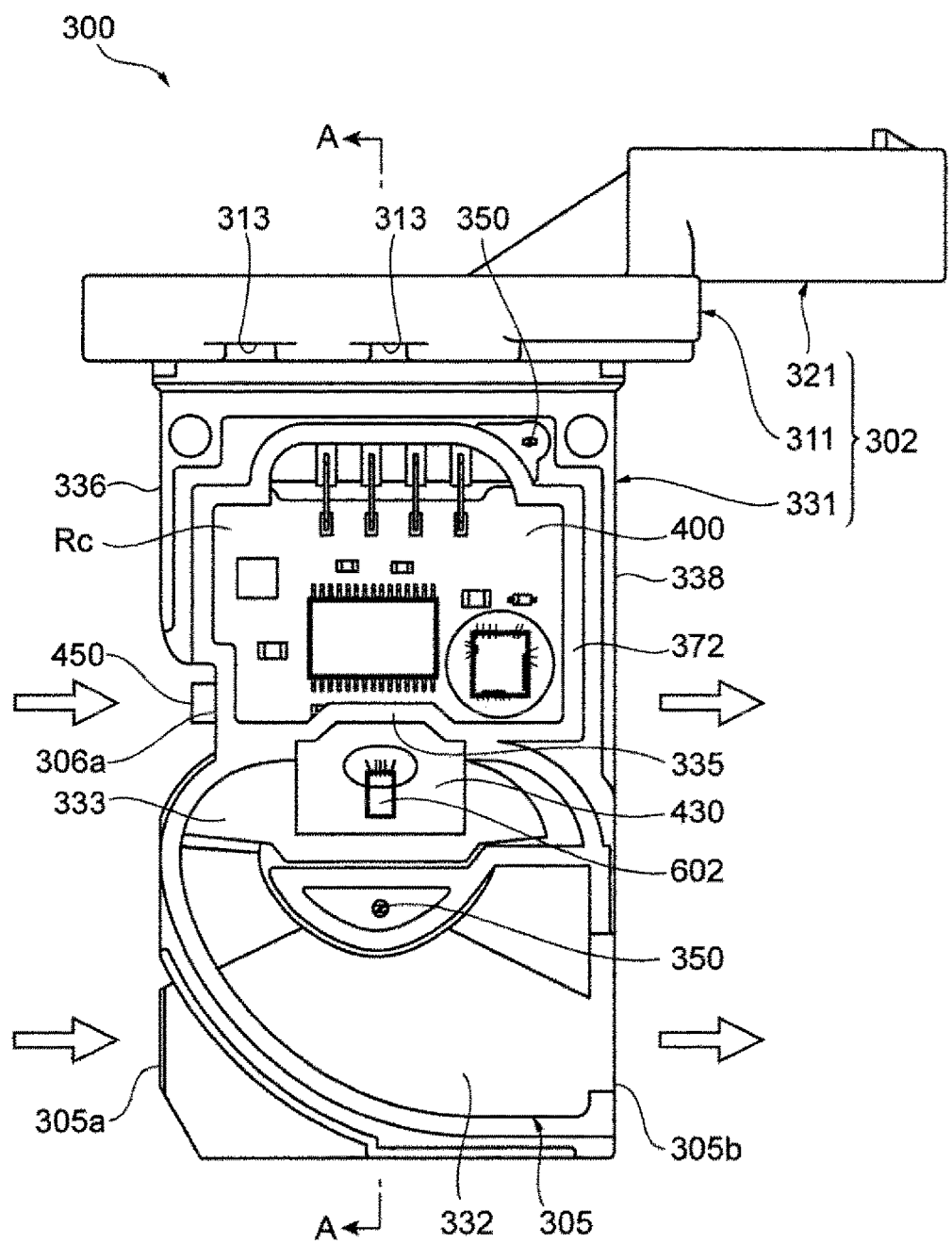

[Fig. 3-2]
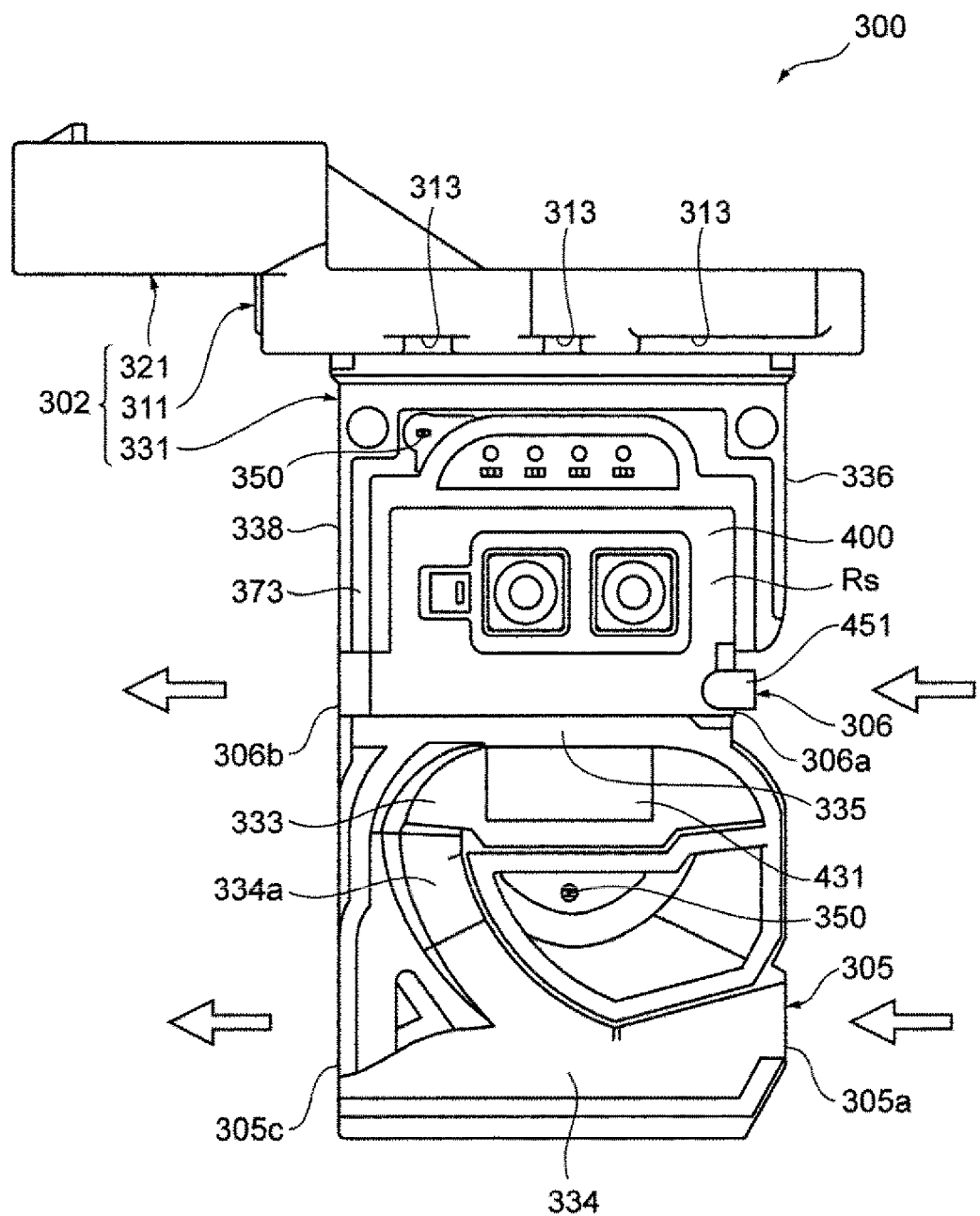

[Fig. 3-3]
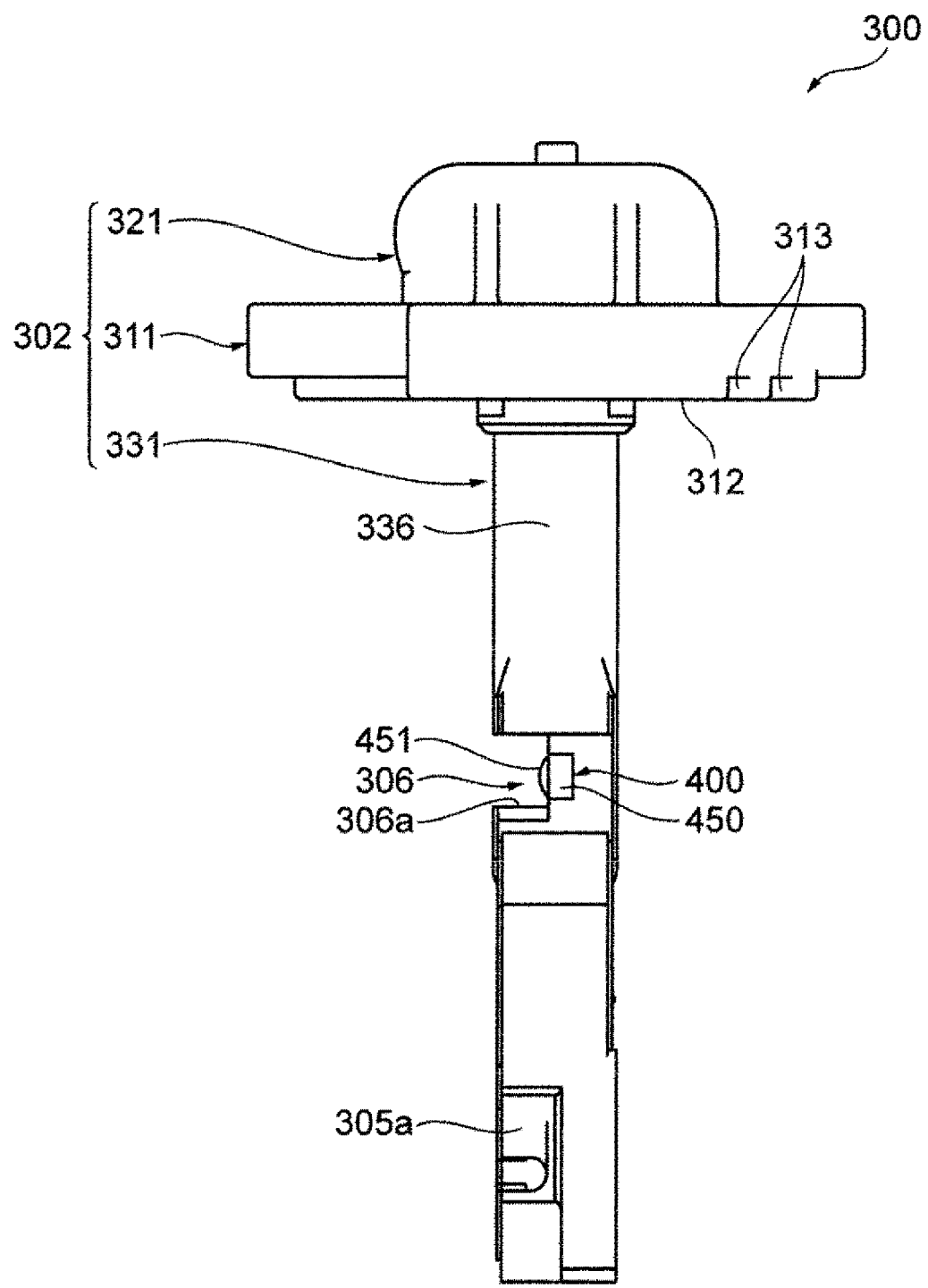

[Fig. 3-4]
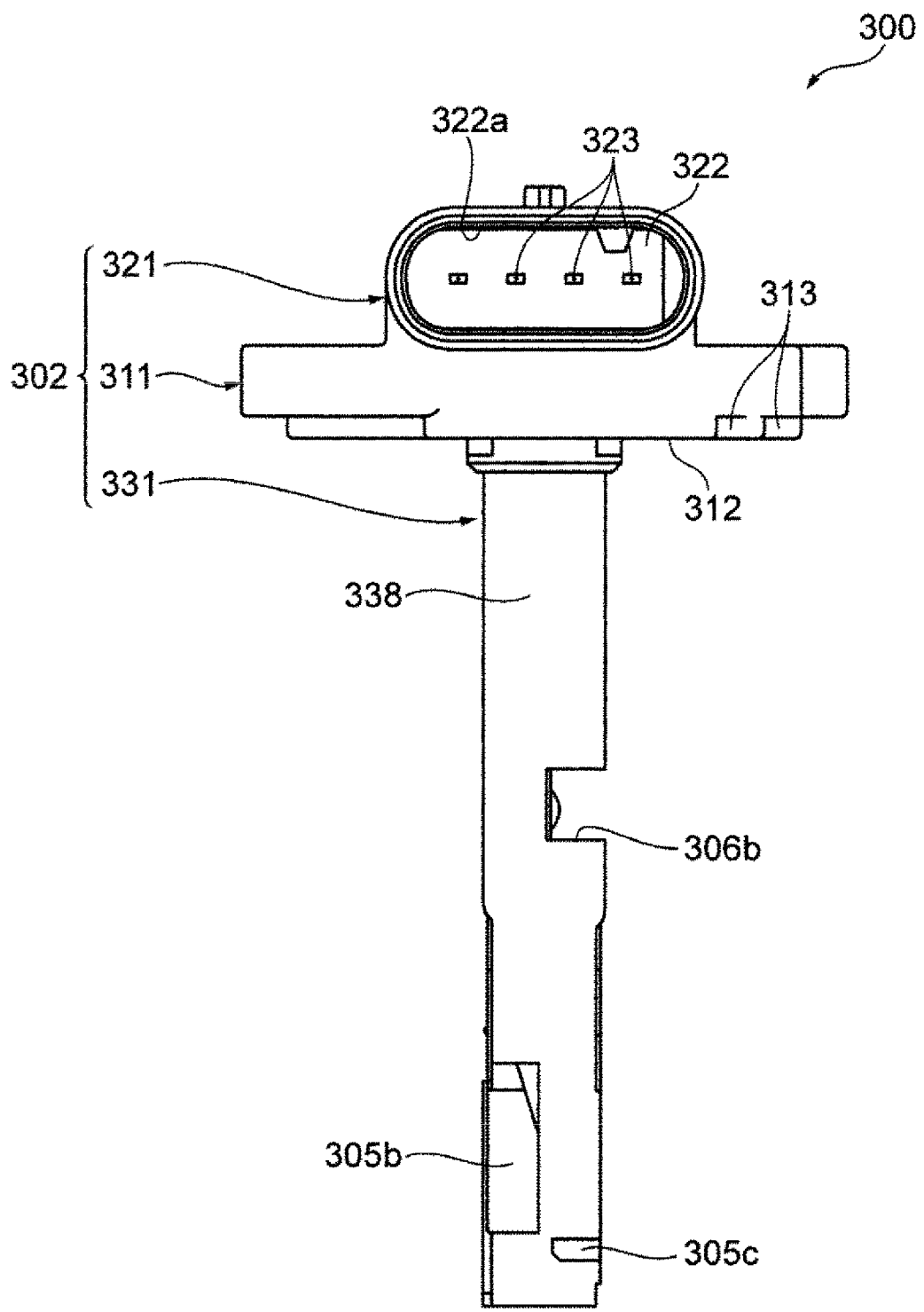

[Fig. 3-5]
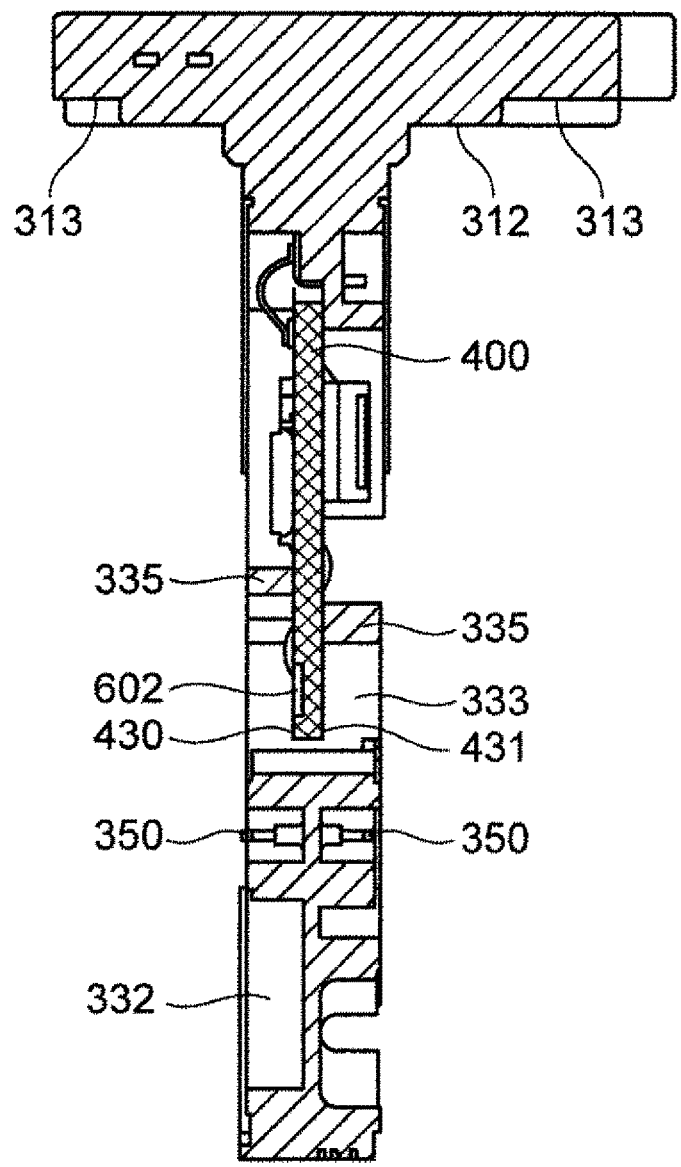

[Fig. 4-1]
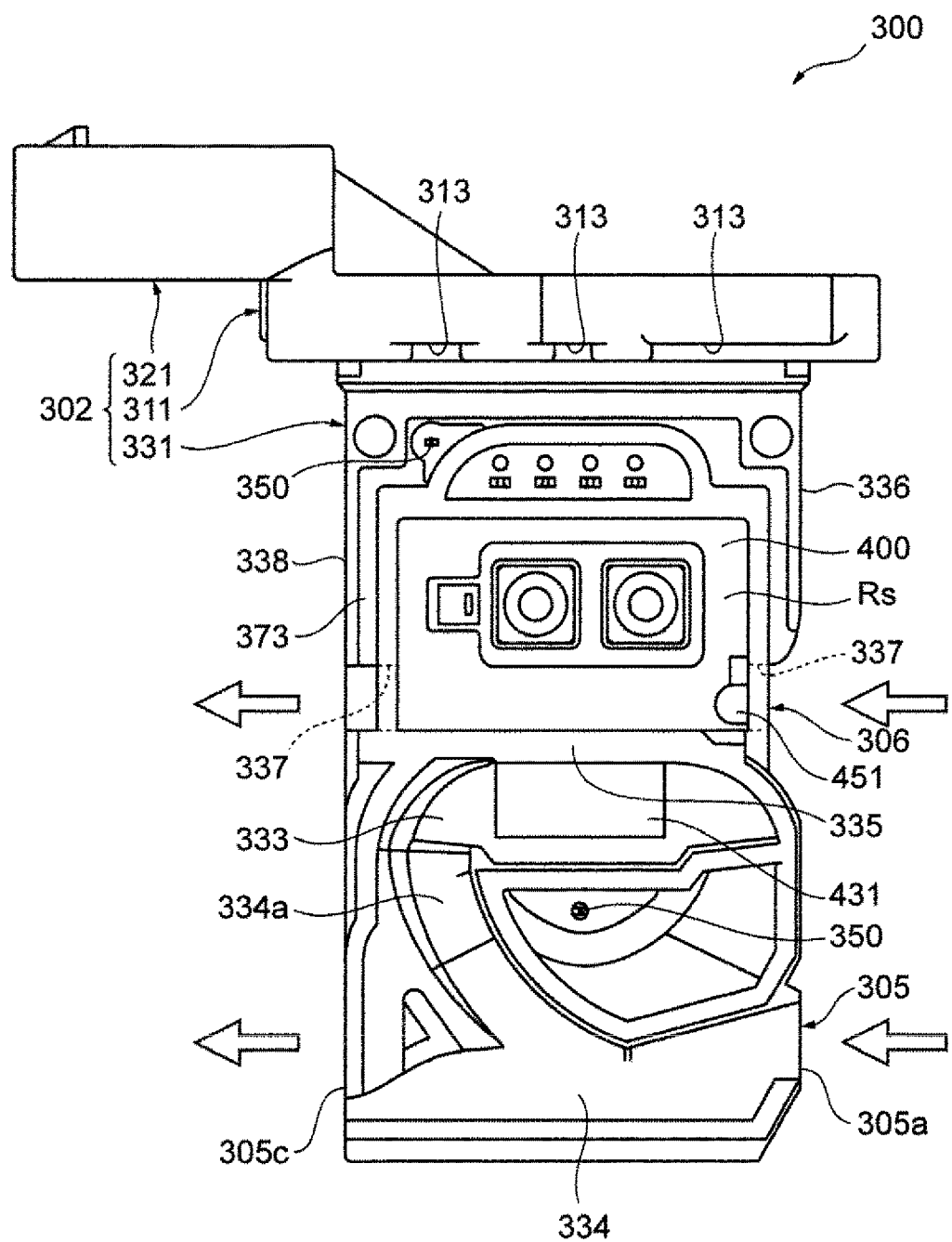

[Fig. 4-2]
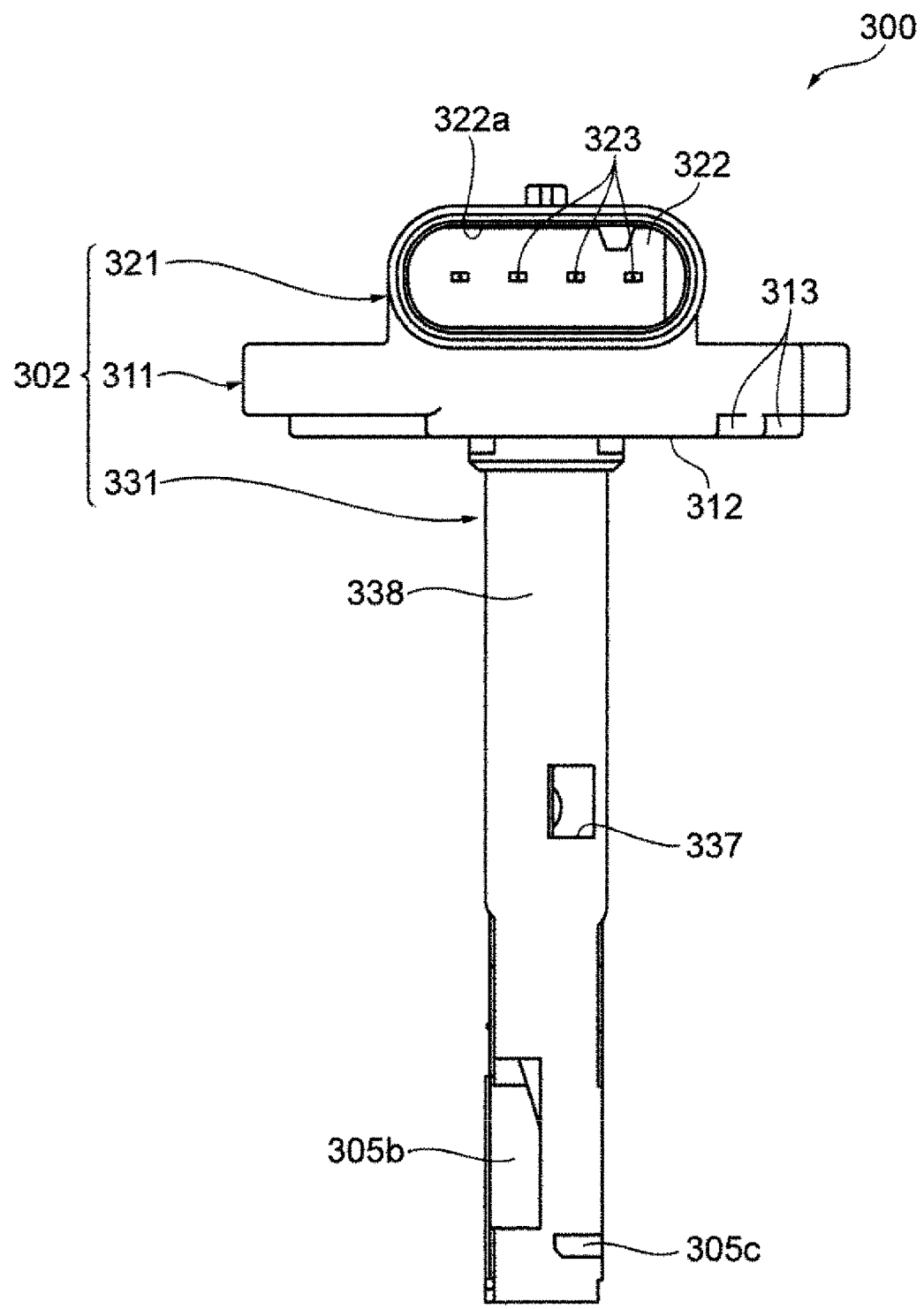

[Fig. 5]
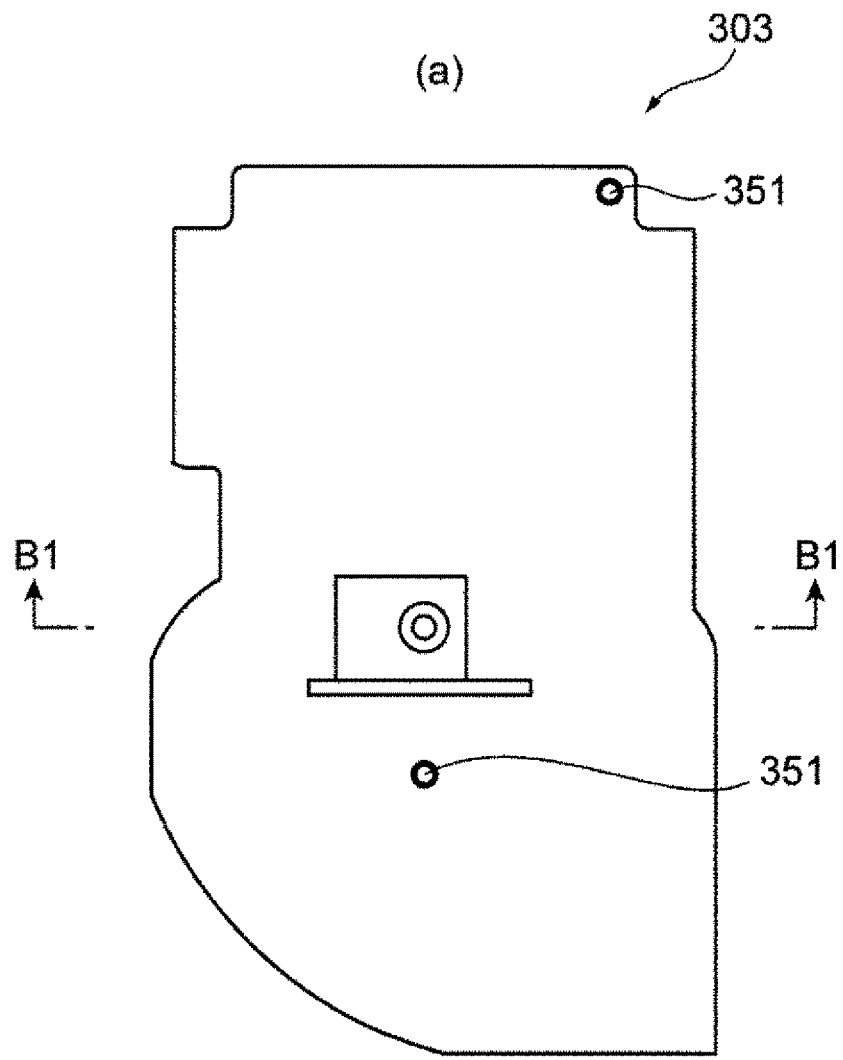
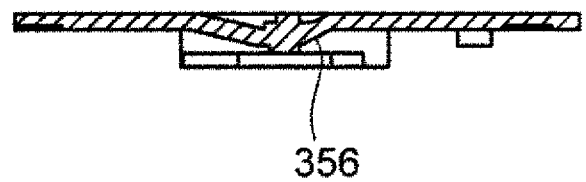

[Fig. 6]
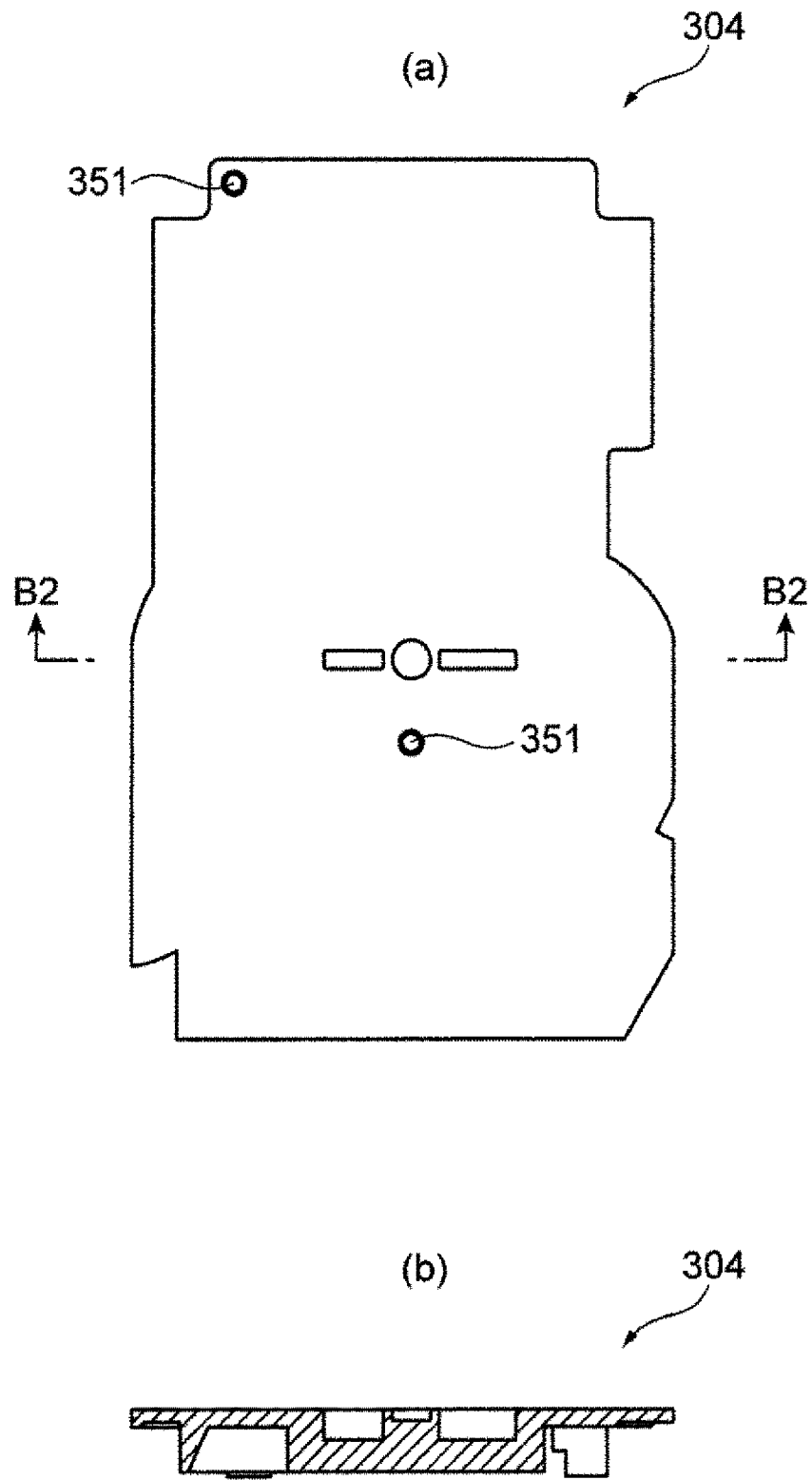

[Fig. 7-1]
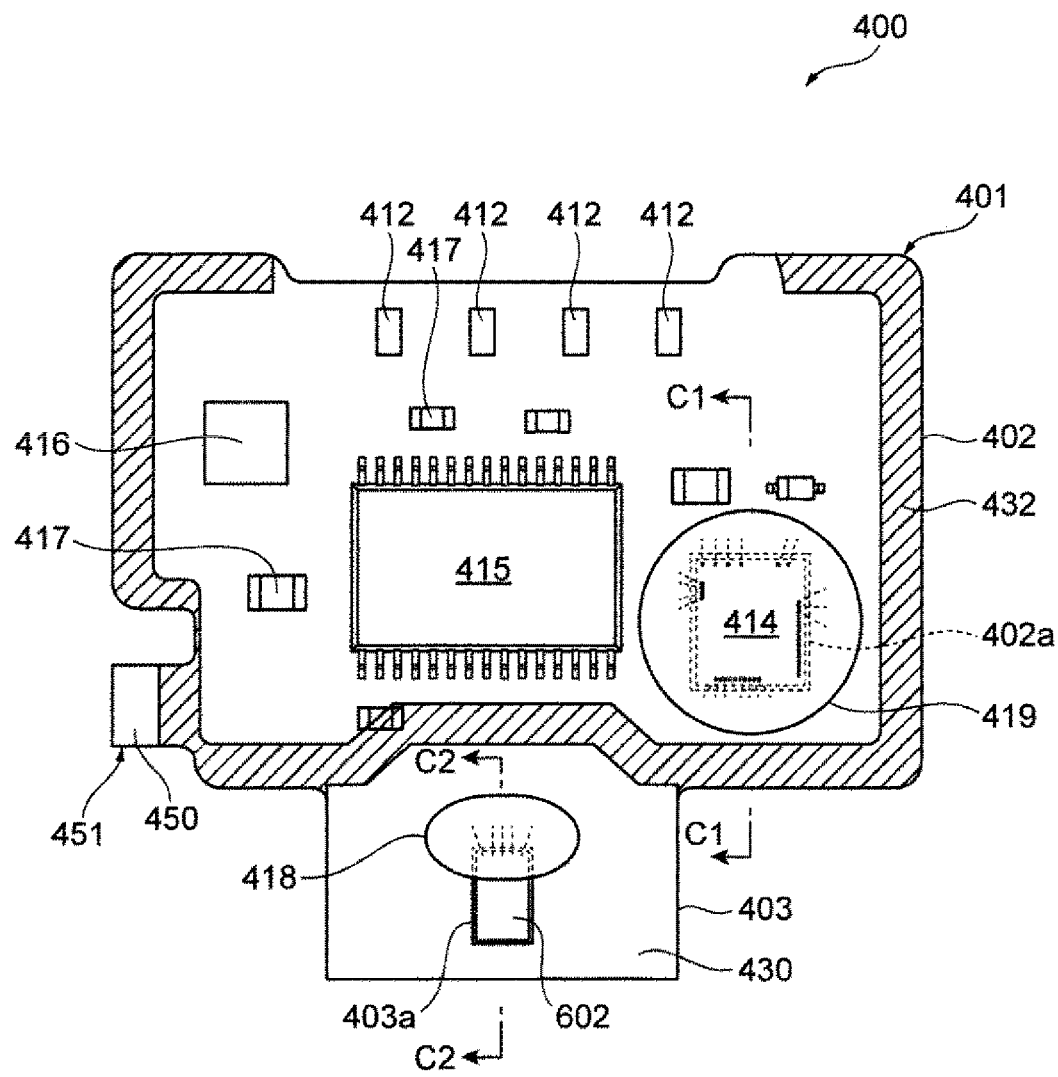

[Fig. 7-2]
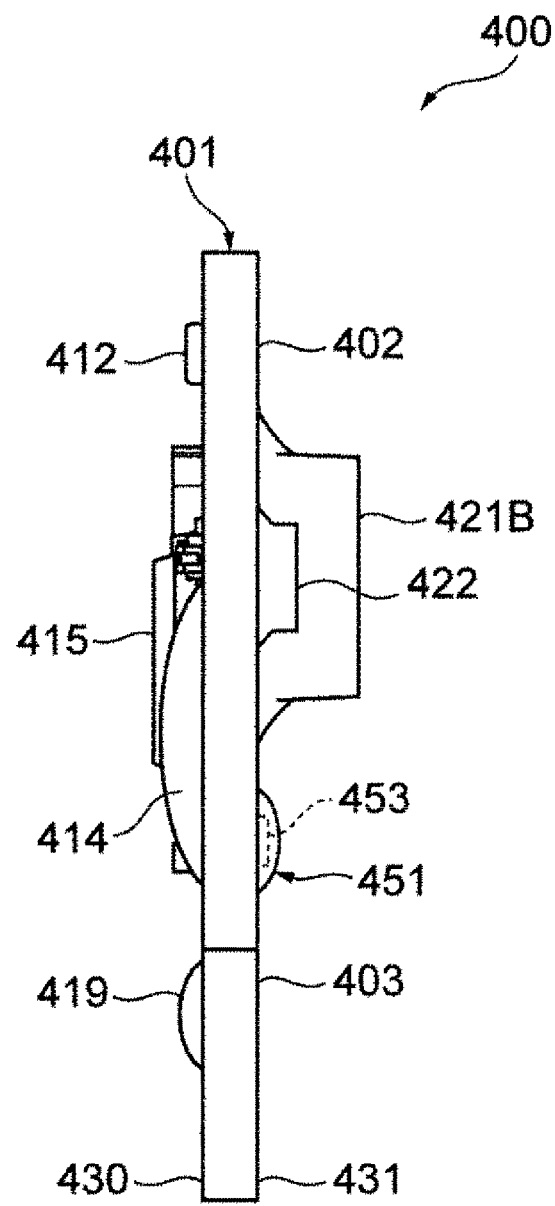

[Fig. 7-3]
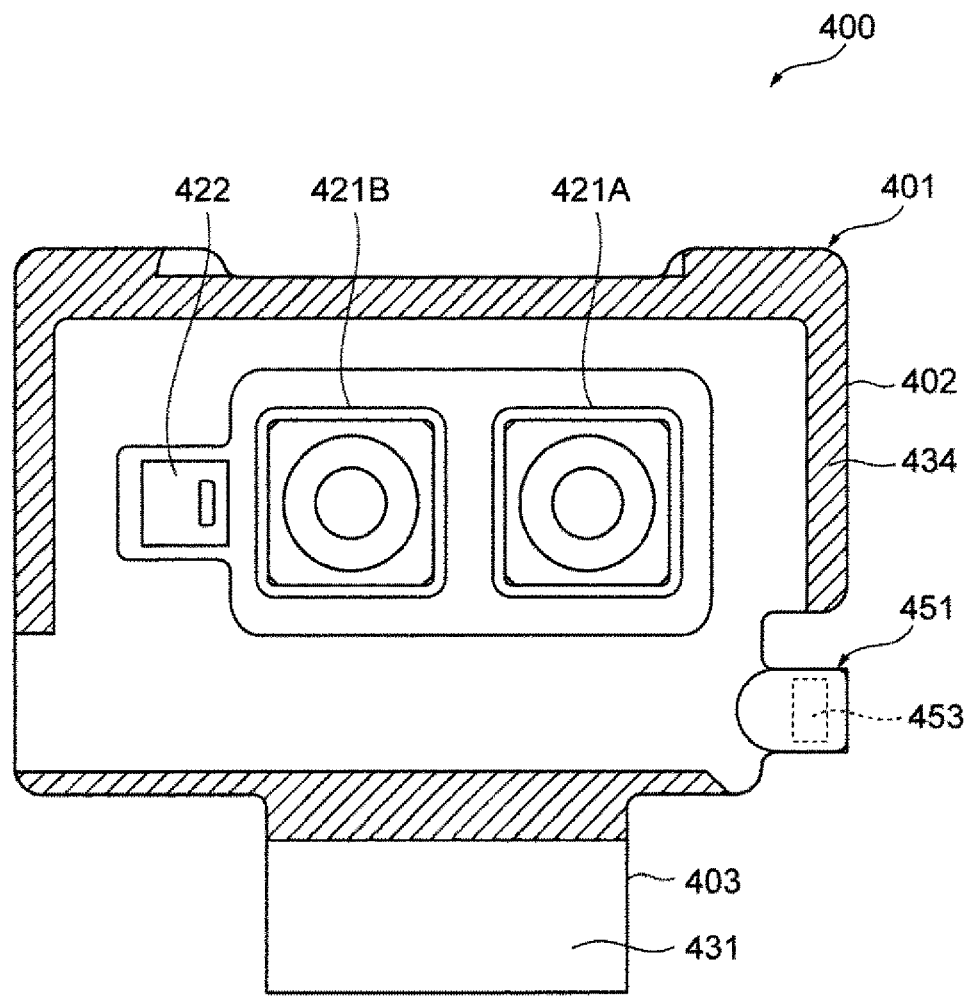

[Fig. 7-4]
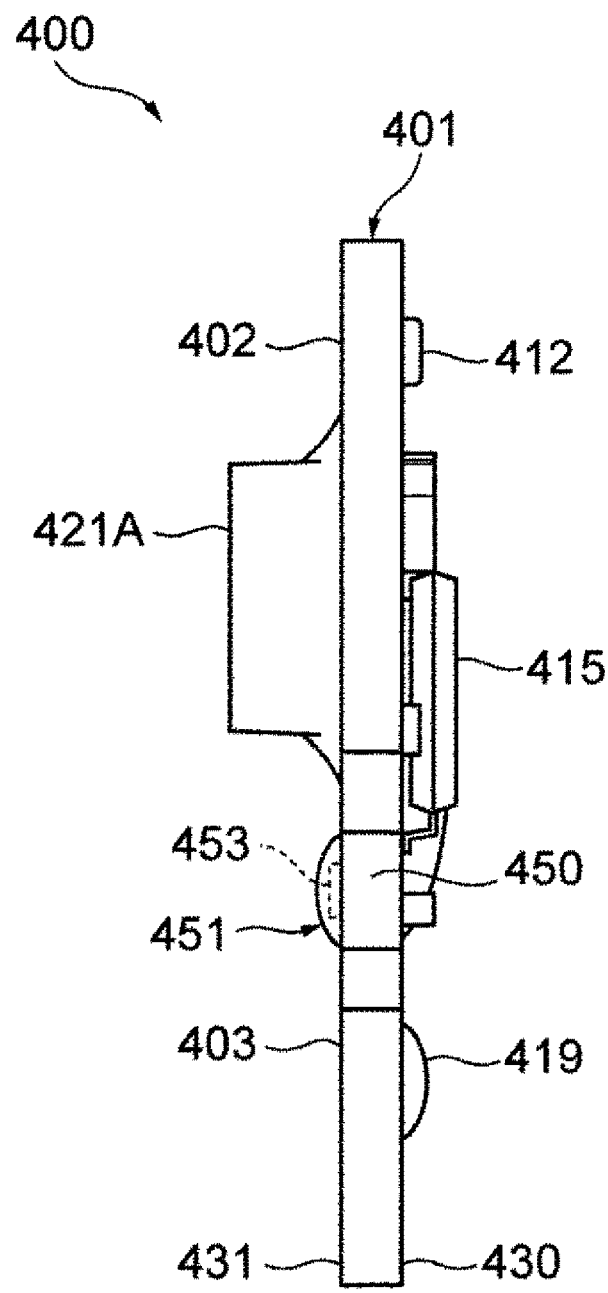

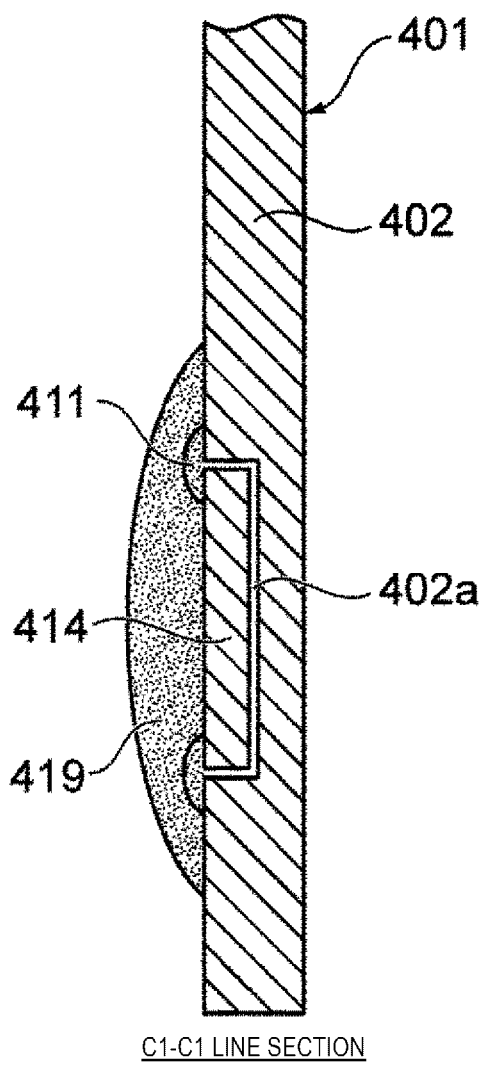
[Fig. 7-5]
C1-C1 LINE SECTION

[Fig. 7-6]
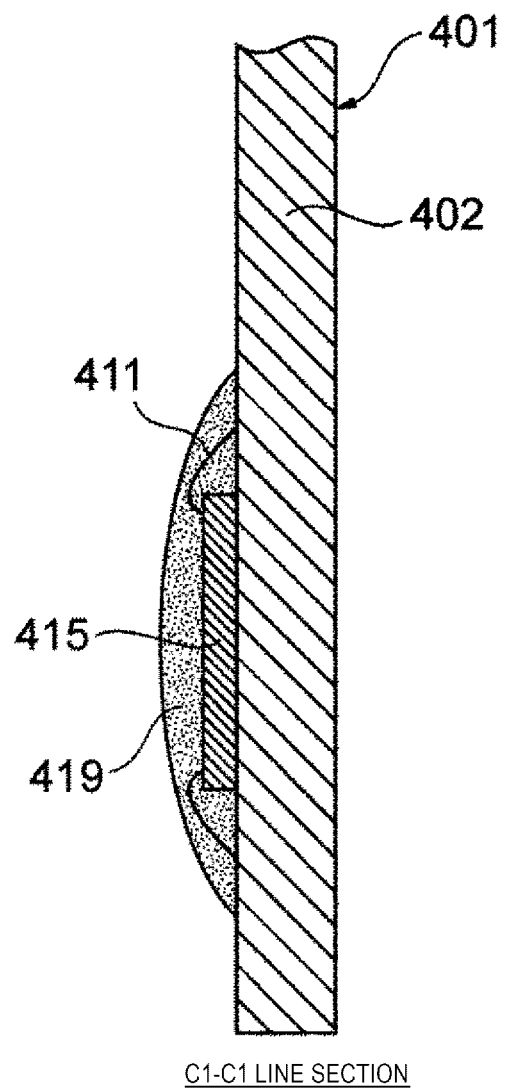
C1-C1 LINE SECTION

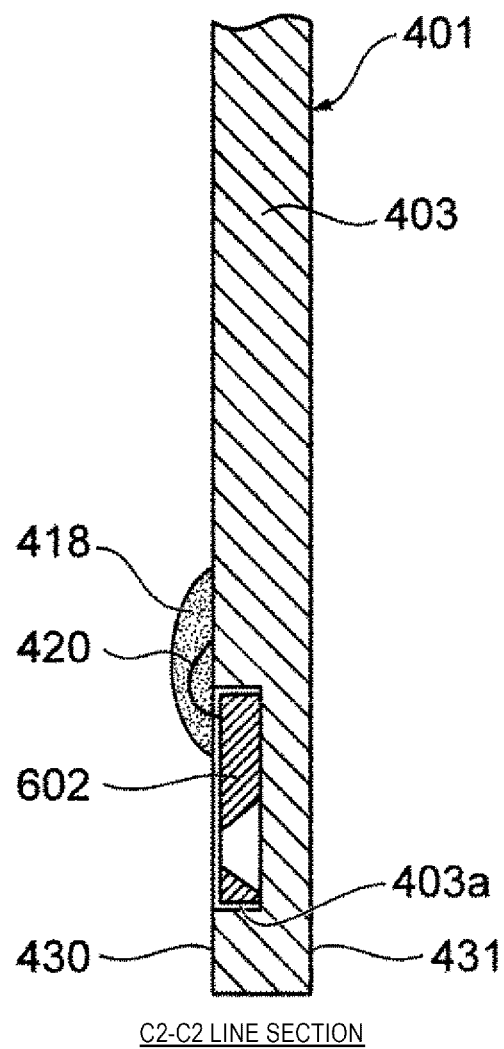
[Fig. 7-7]
C2-C2 LINE SECTION

[Fig. 8-1]
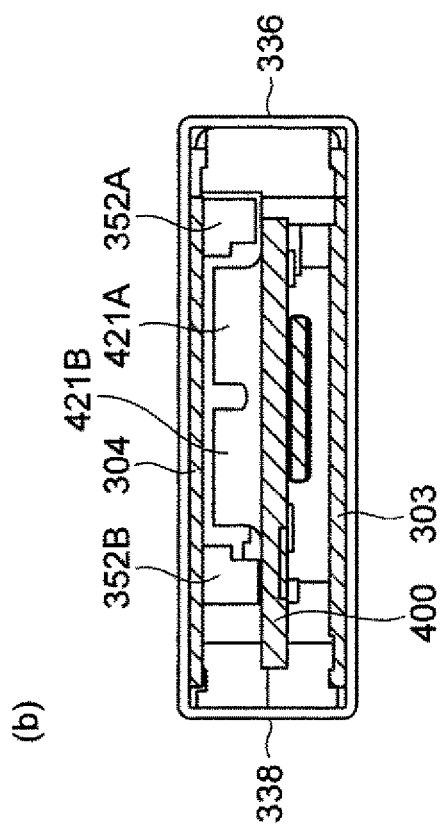
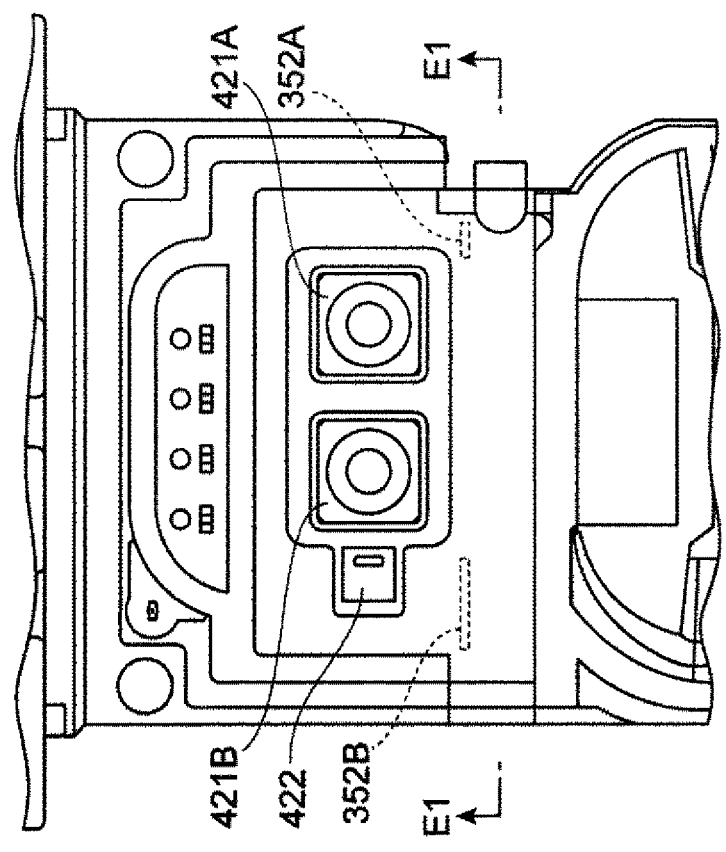

[Fig. 8-2]
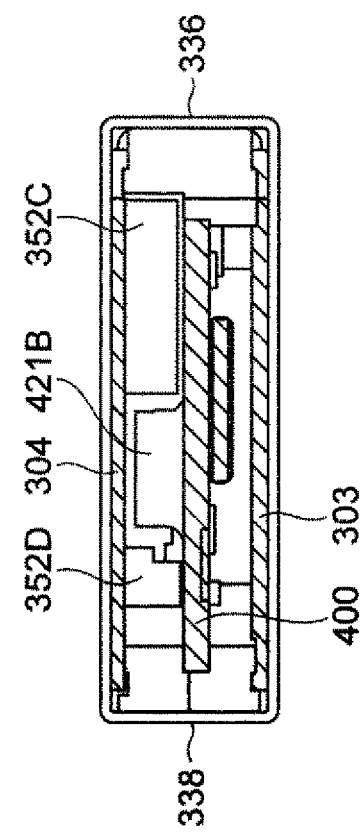
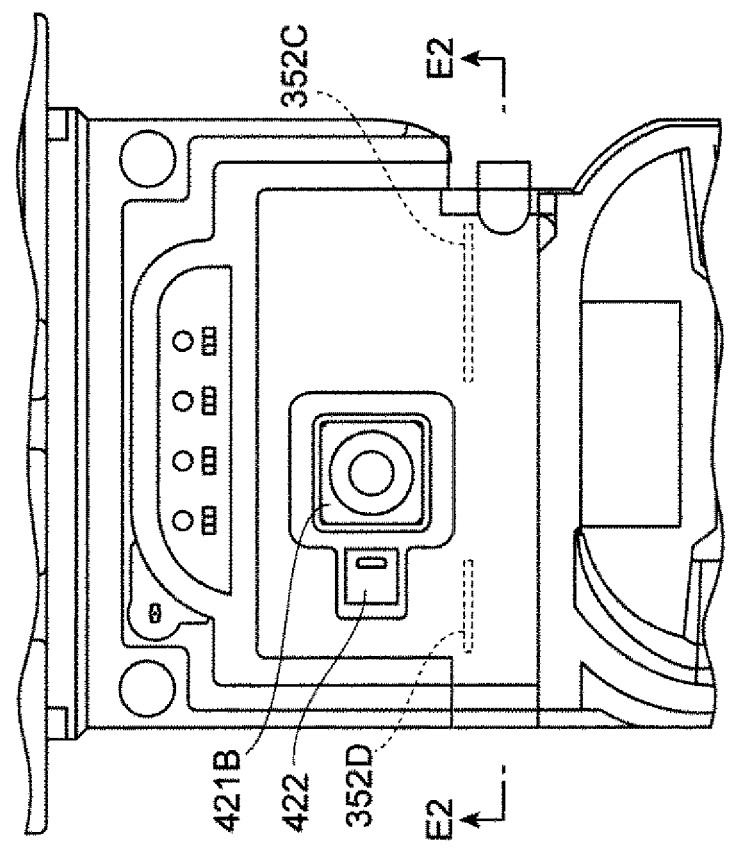

[Fig. 8-3]
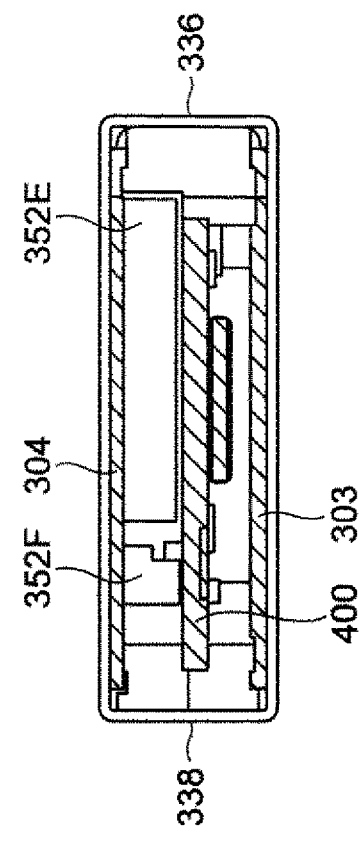
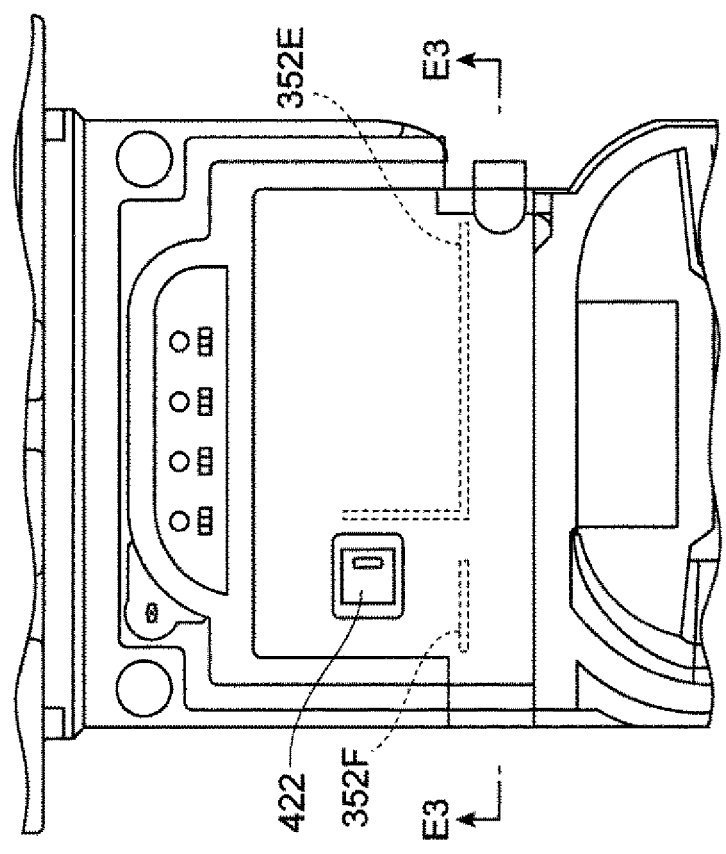

[Fig. 9-1]
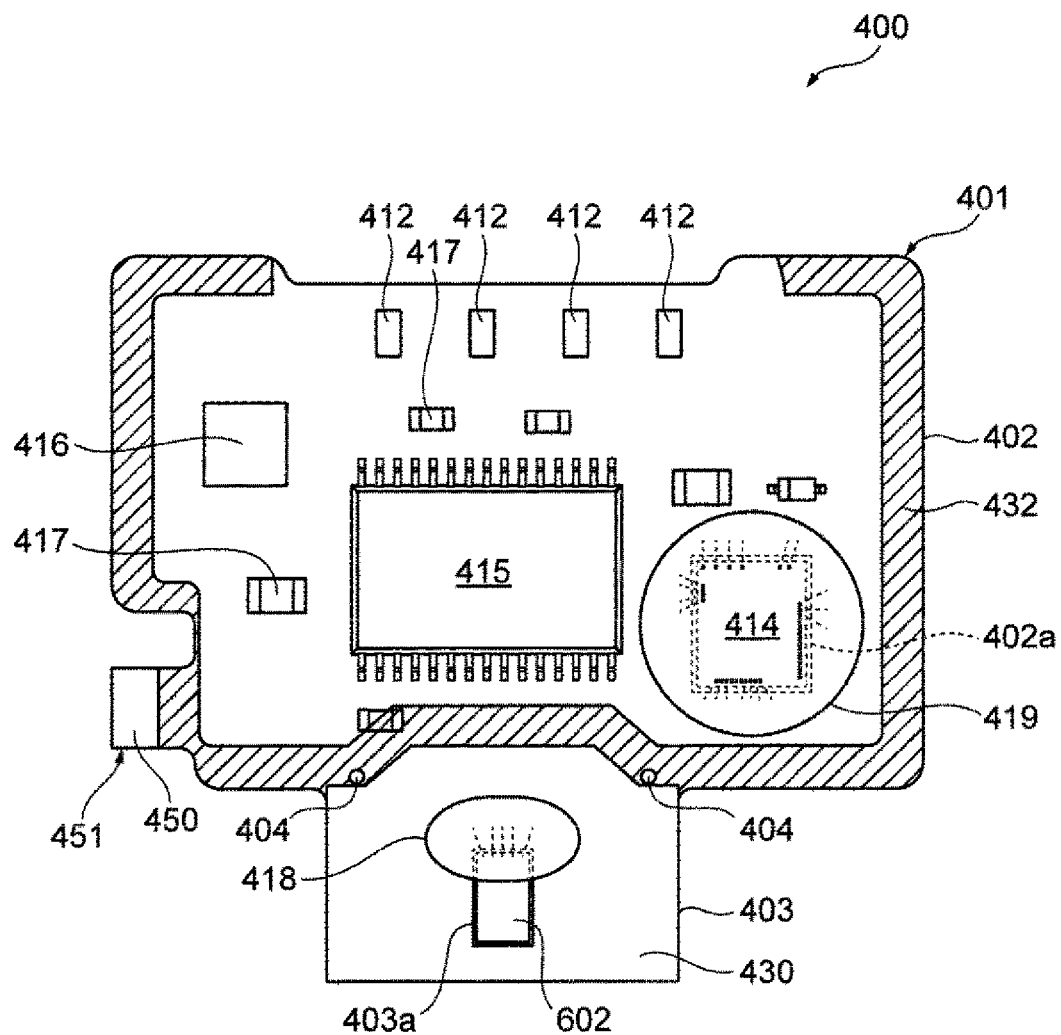

[Fig. 9-2]
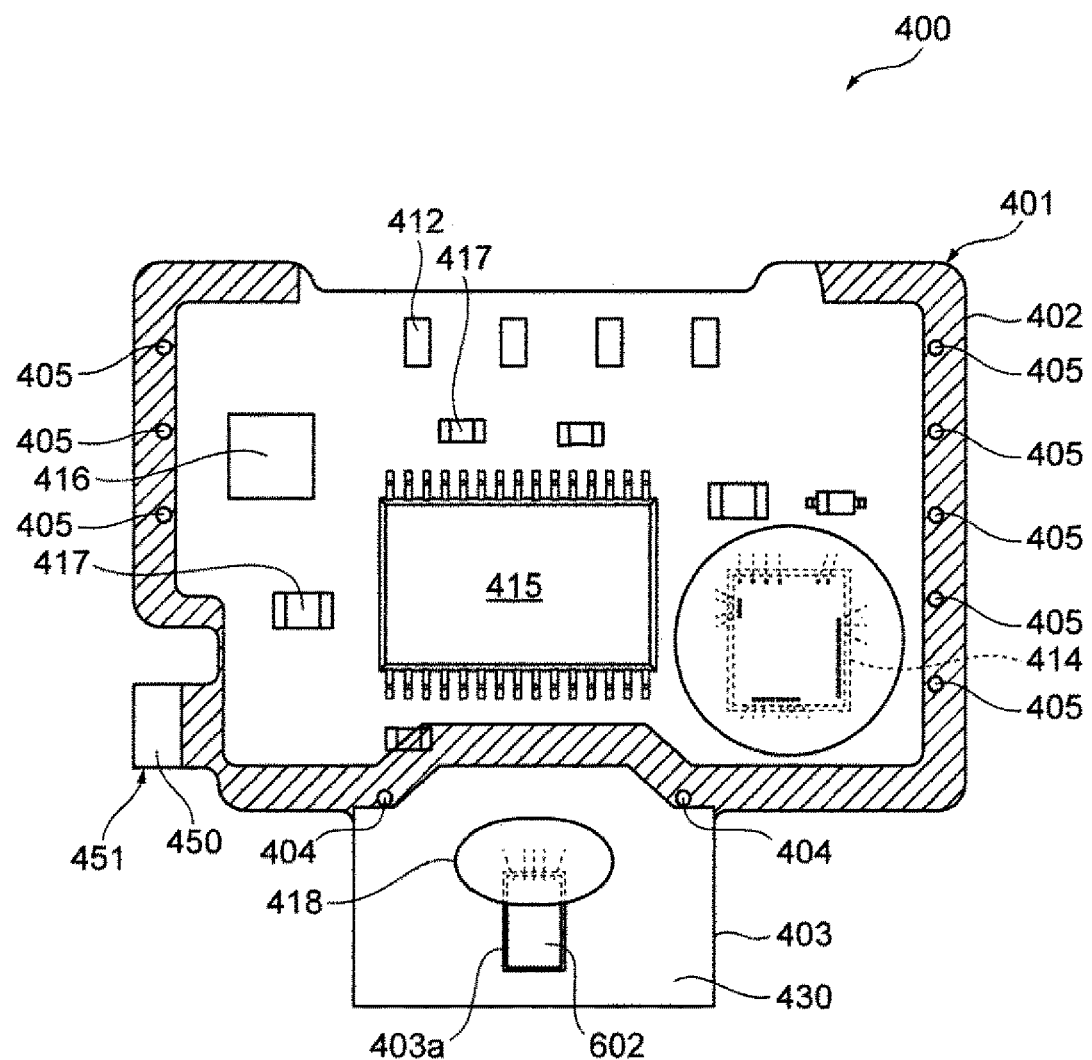

[Fig. 9-3]
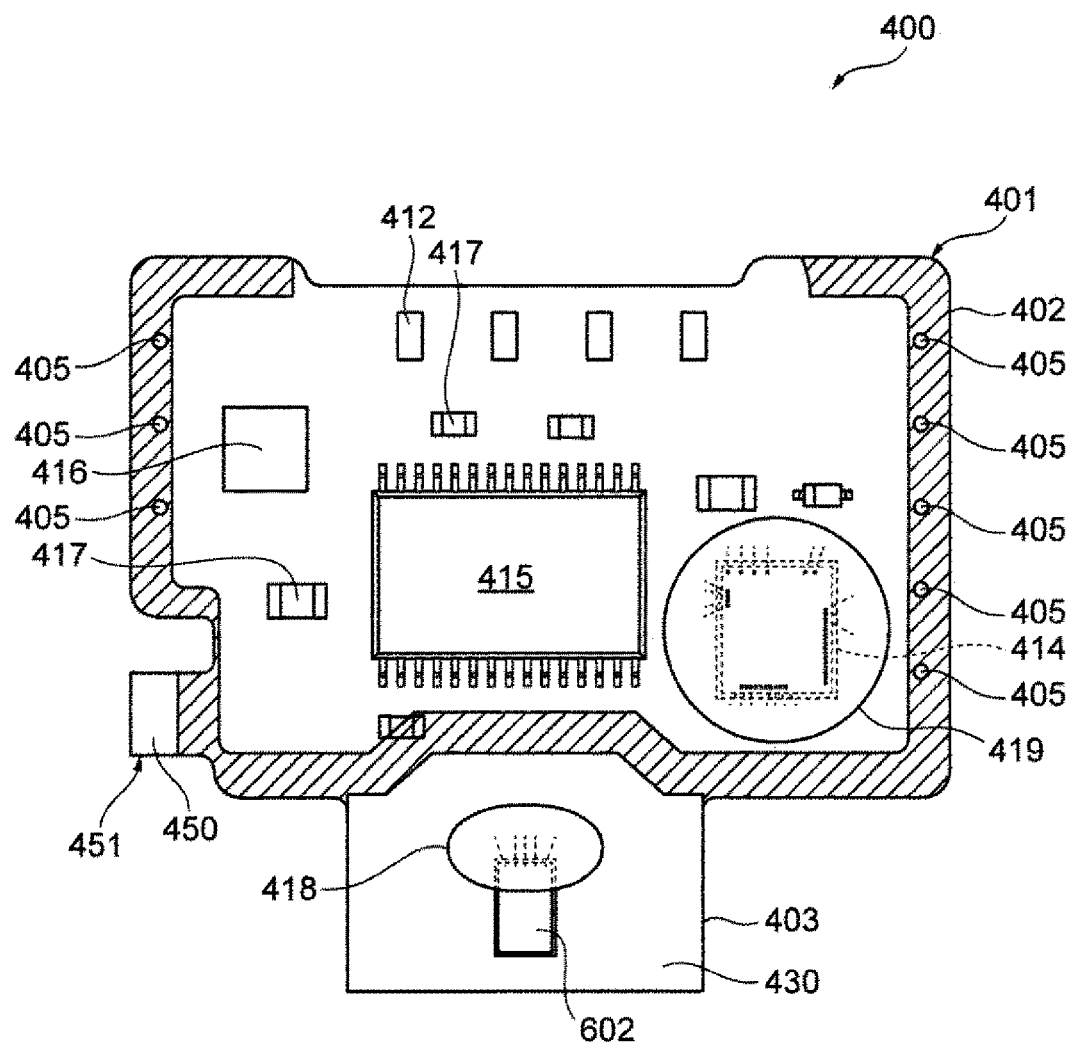

[Fig. 9-4]
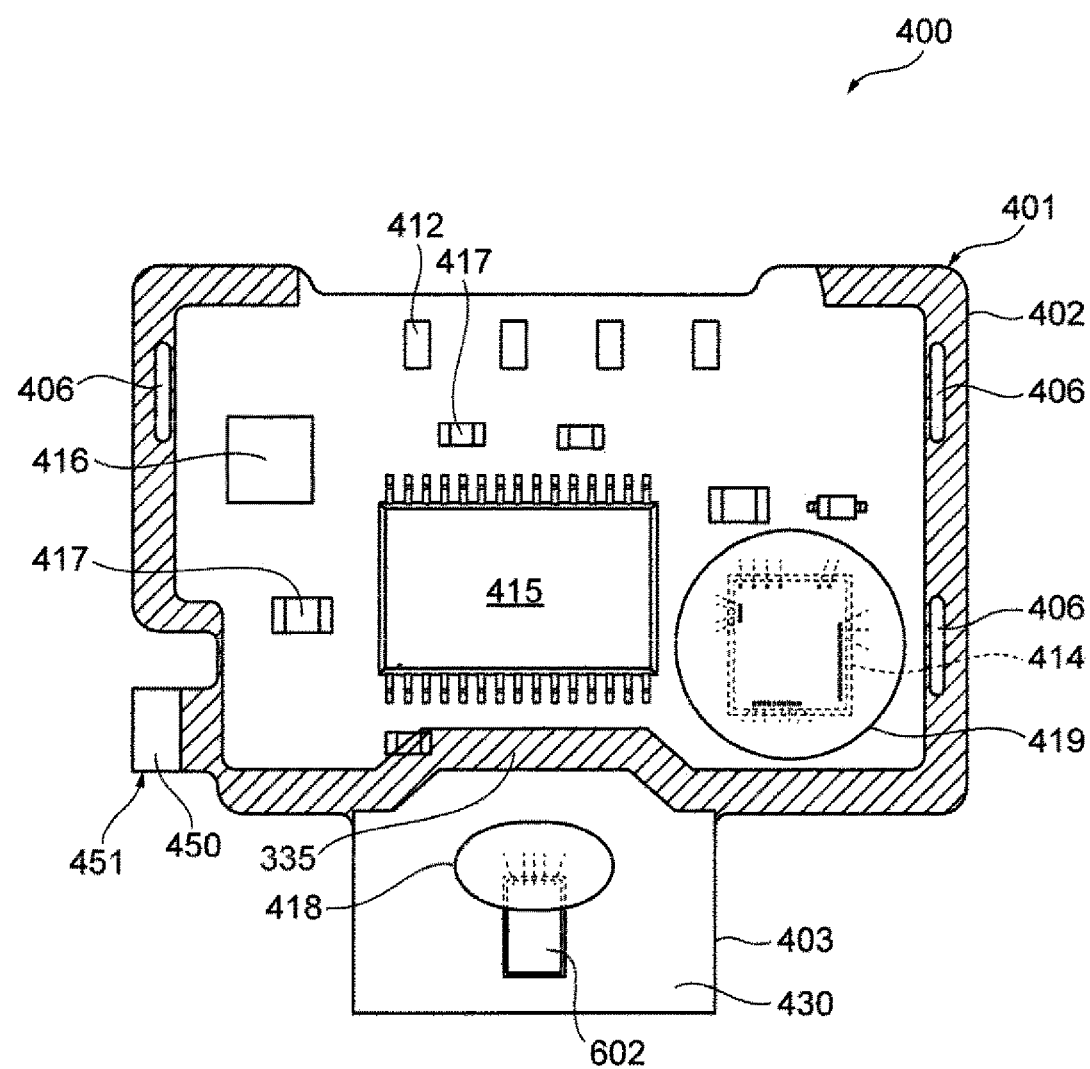

[Fig. 9-5]
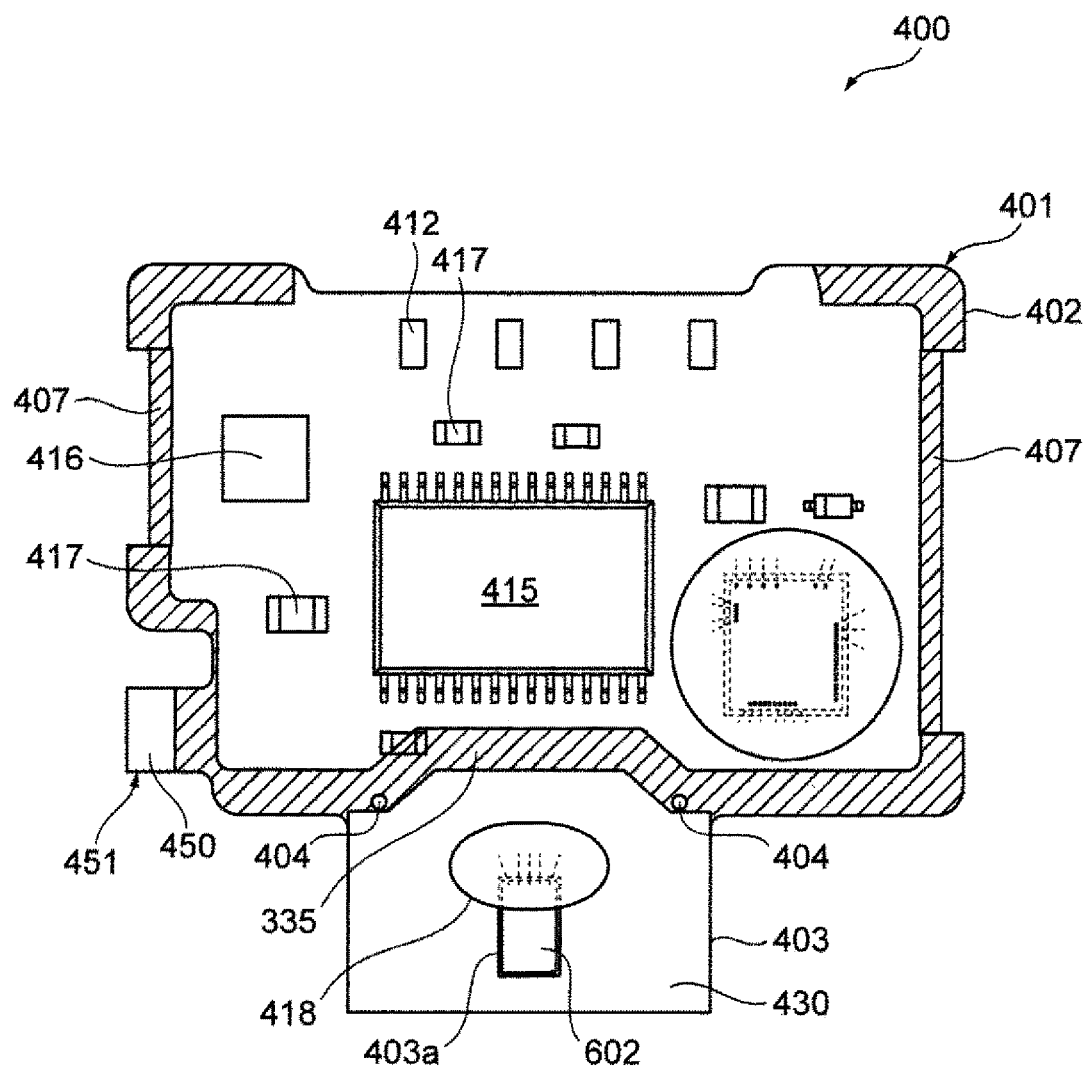

[Fig. 9-6]
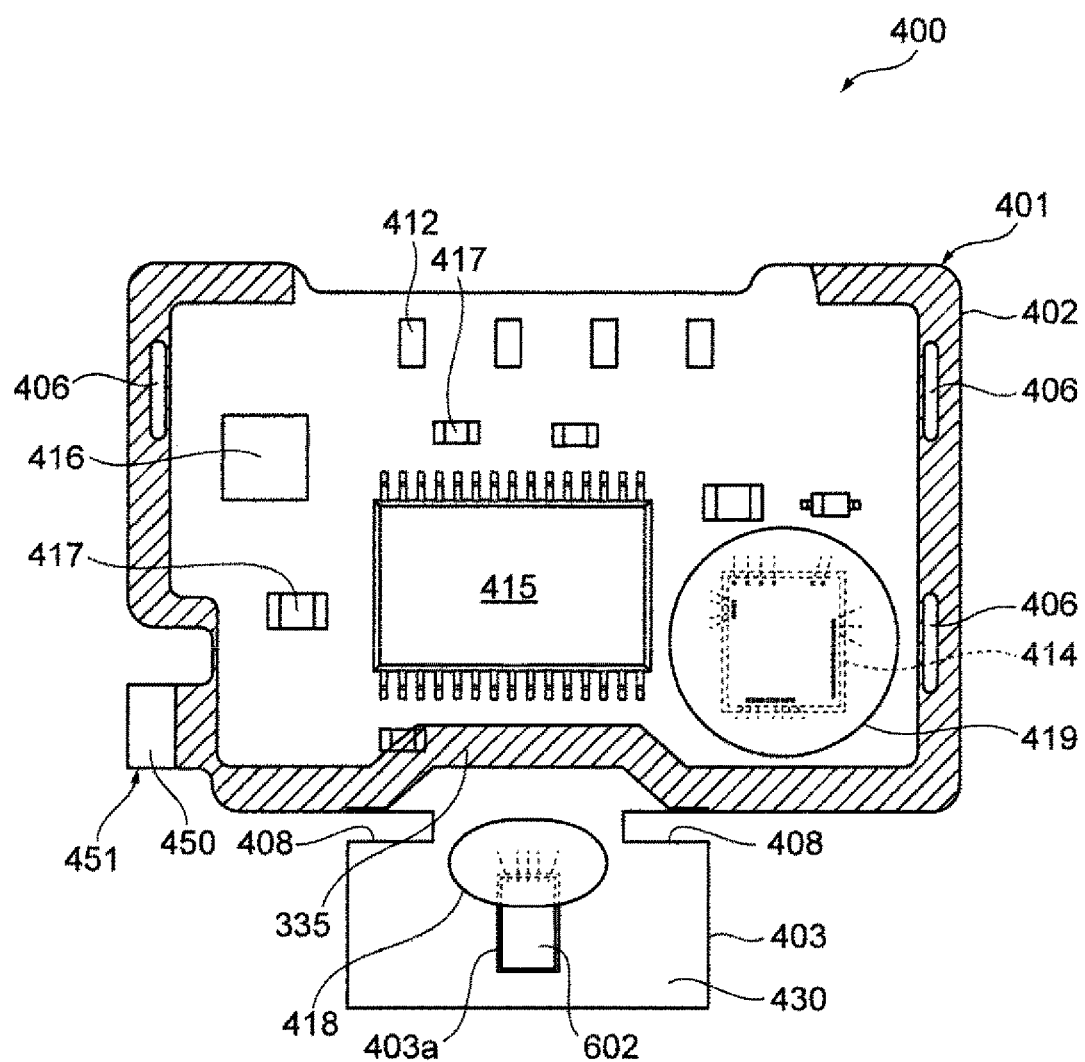

[Fig. 9-7]
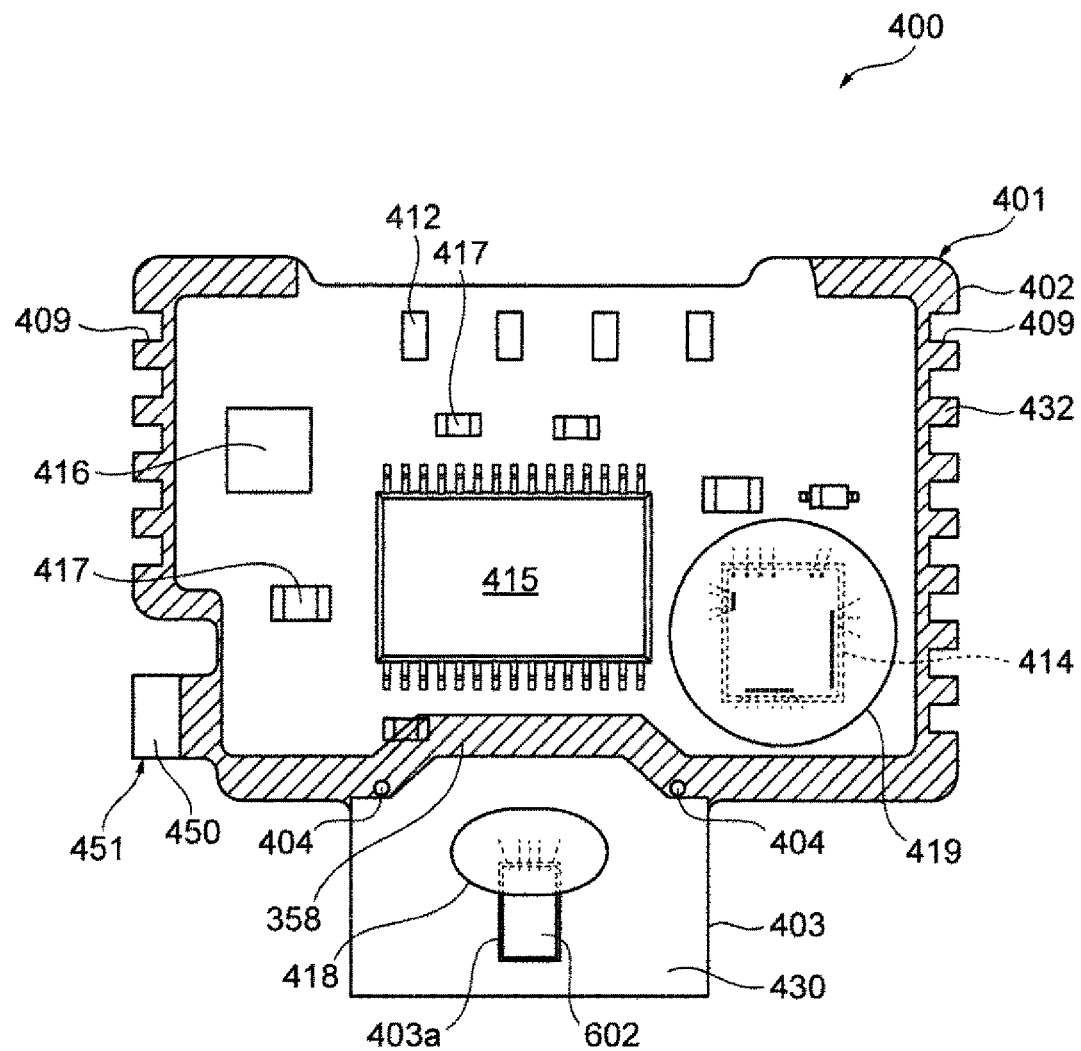

[Fig. 9-8]
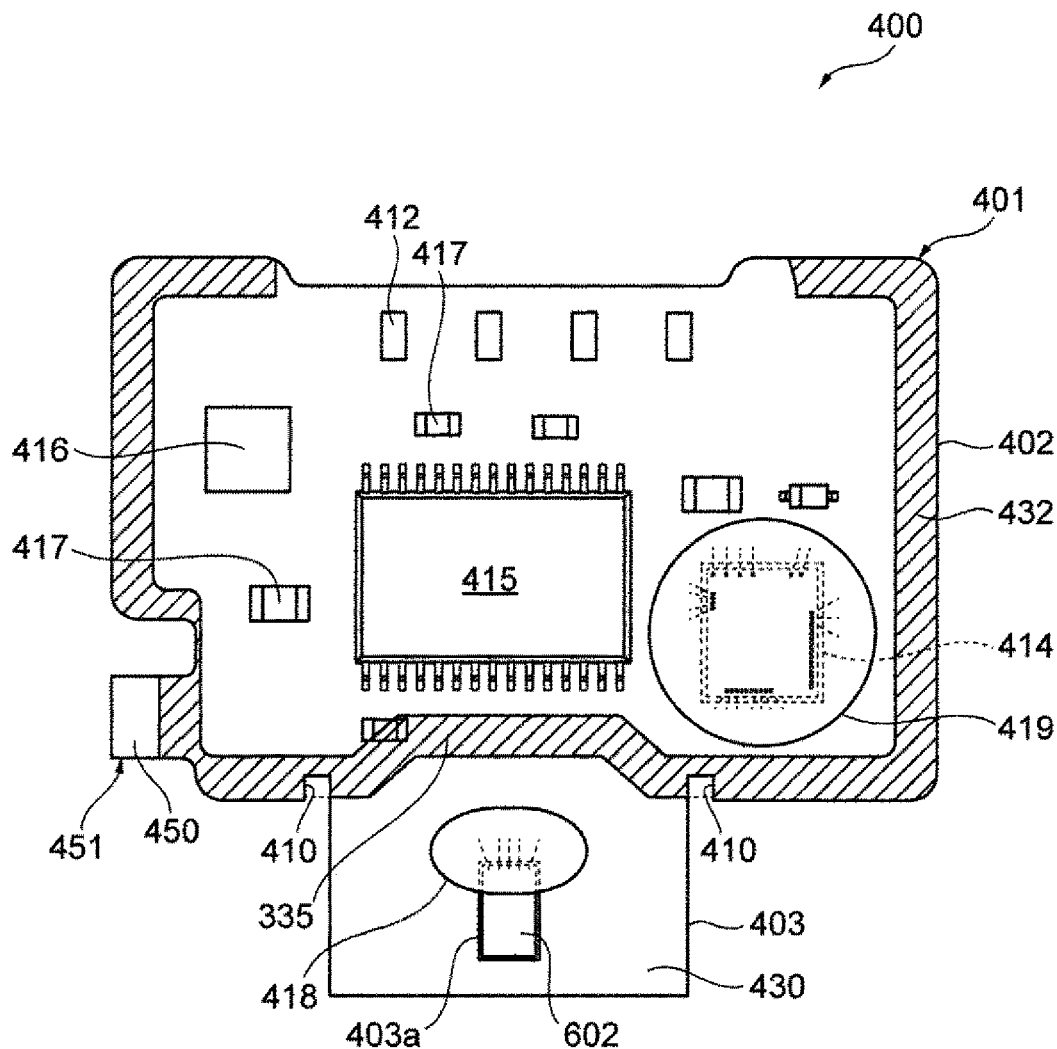

[Fig. 10-1]
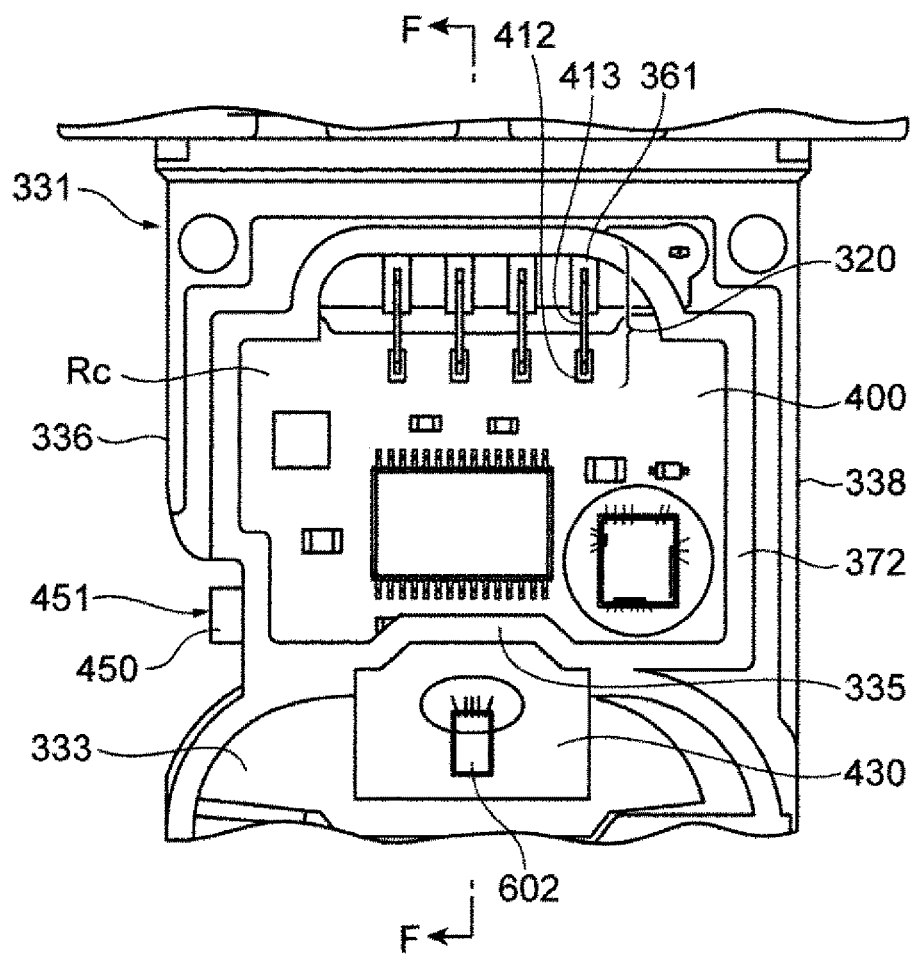

[Fig. 10-2]
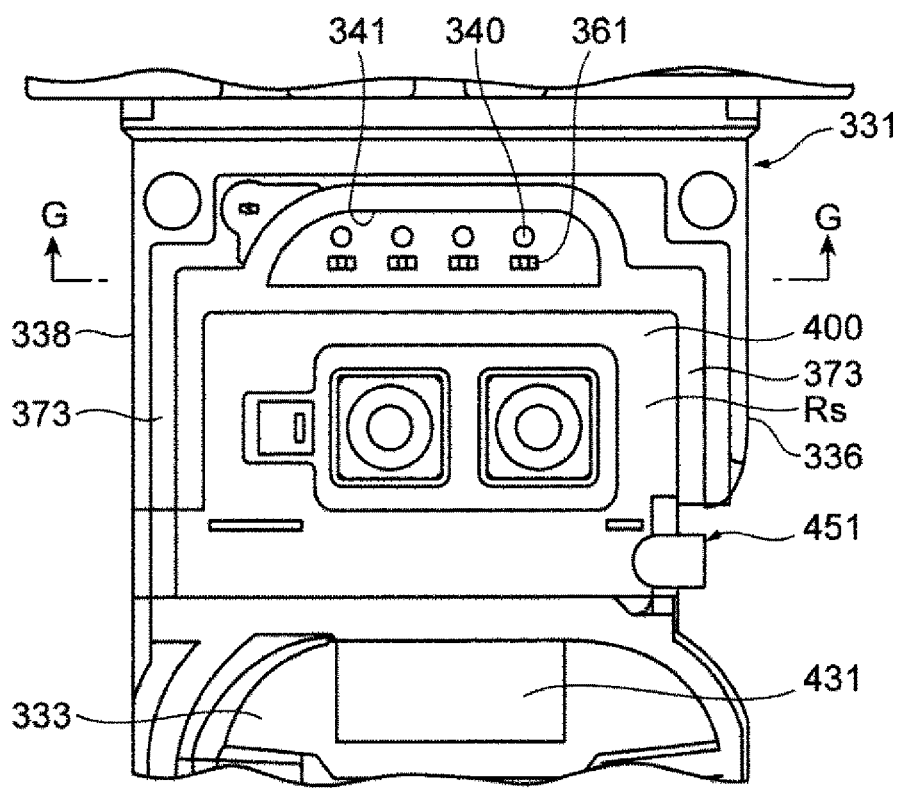

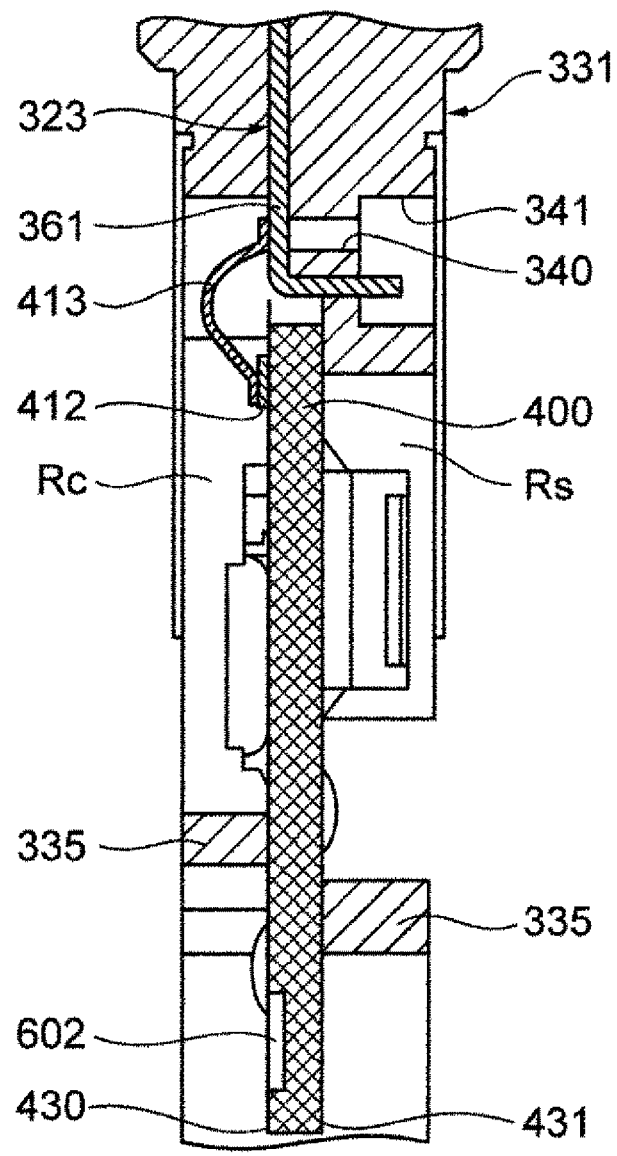
[Fig. 10-3]

[Fig. 10-4]
(a) BEFORE BEING CUT
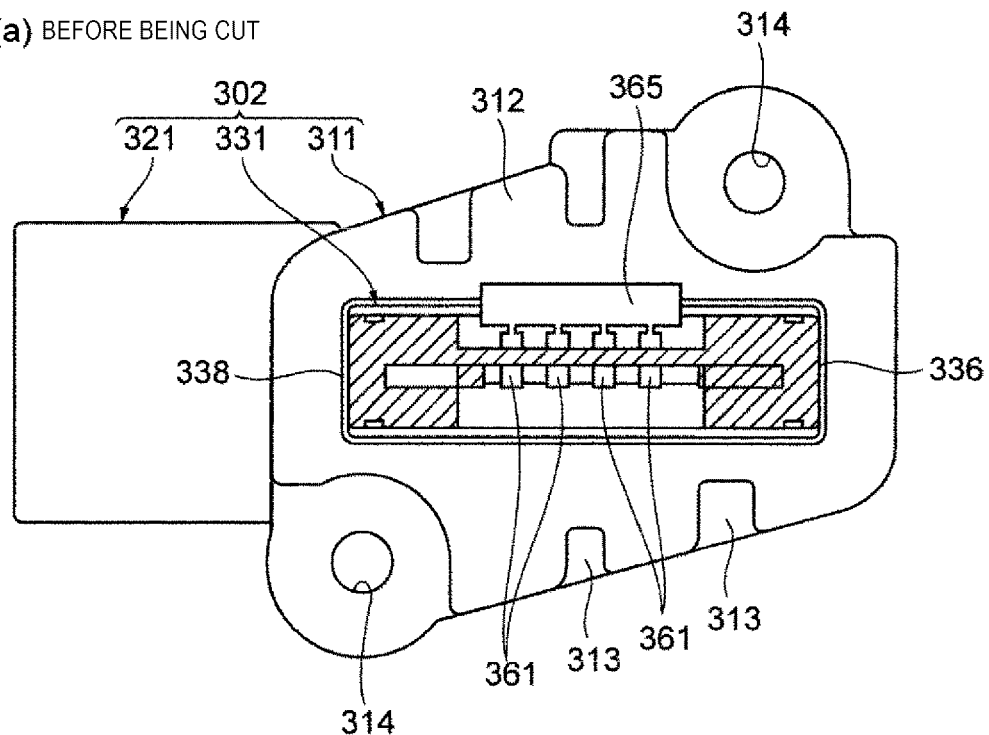
(b) AFTER BEING CUT
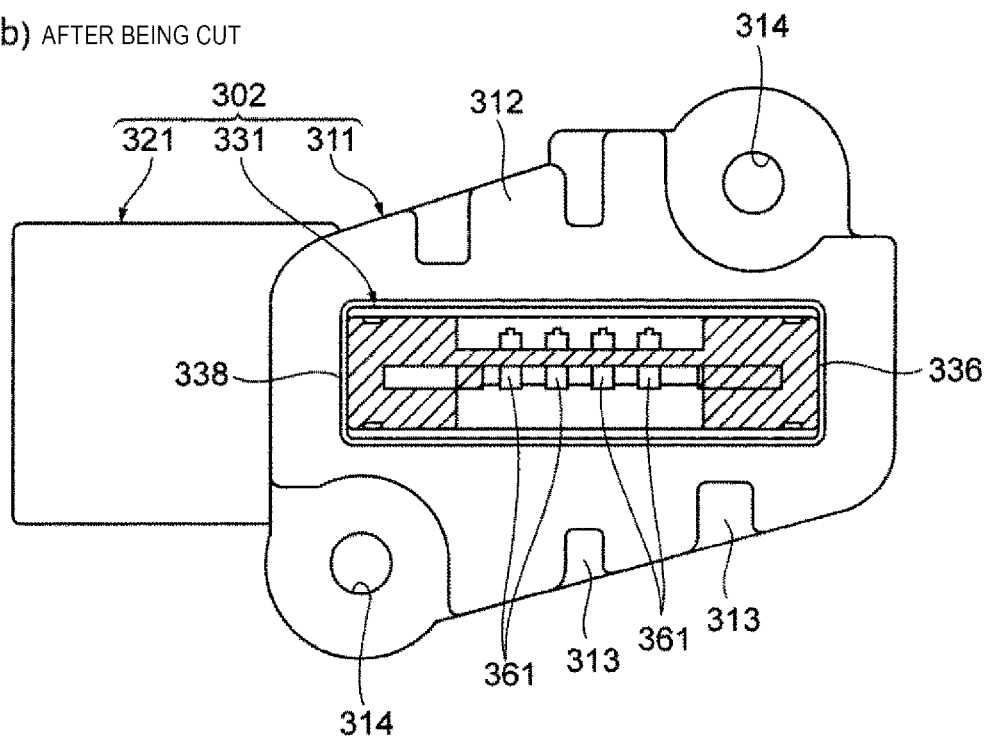

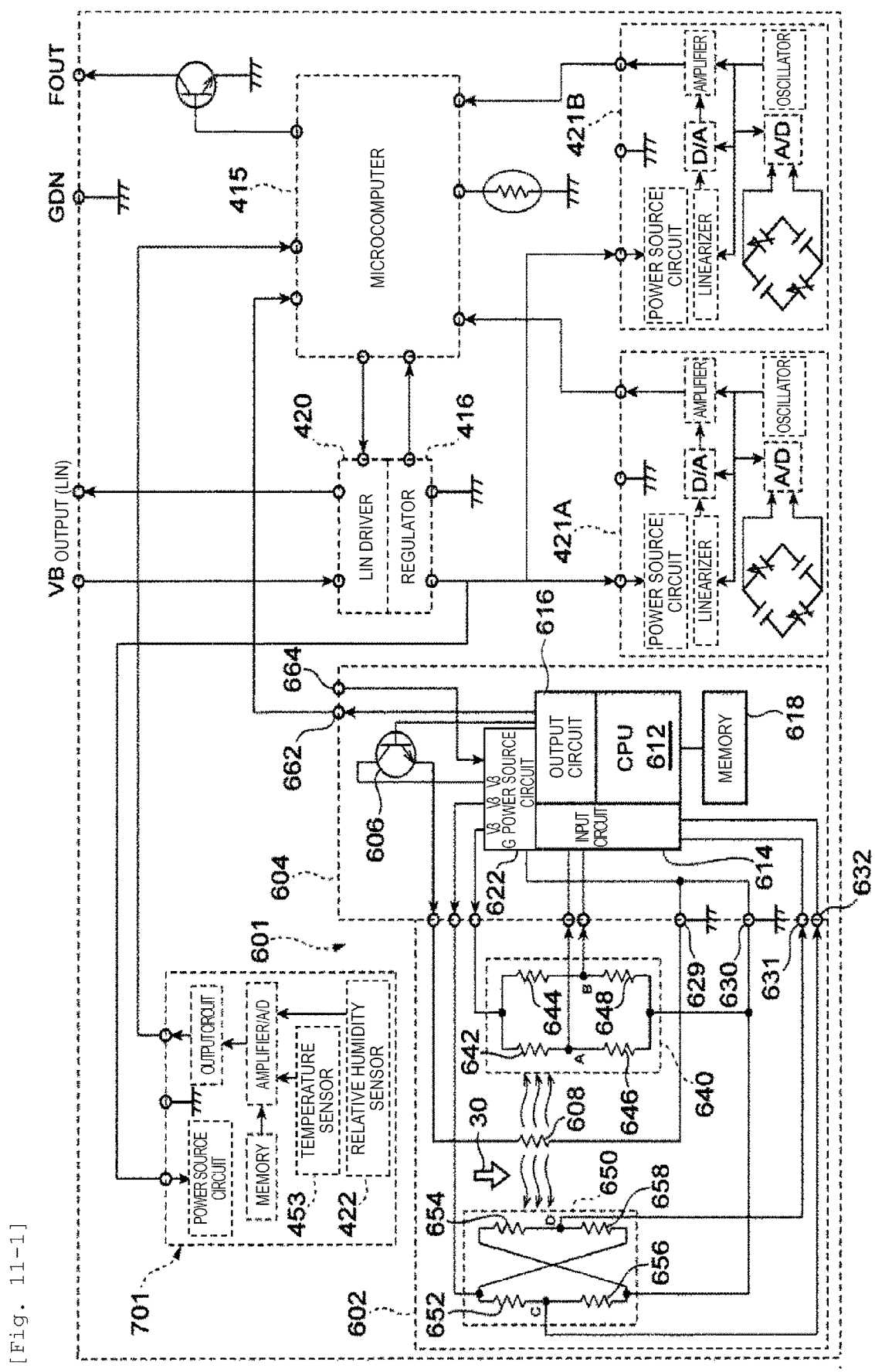
[Fig. 11-1]

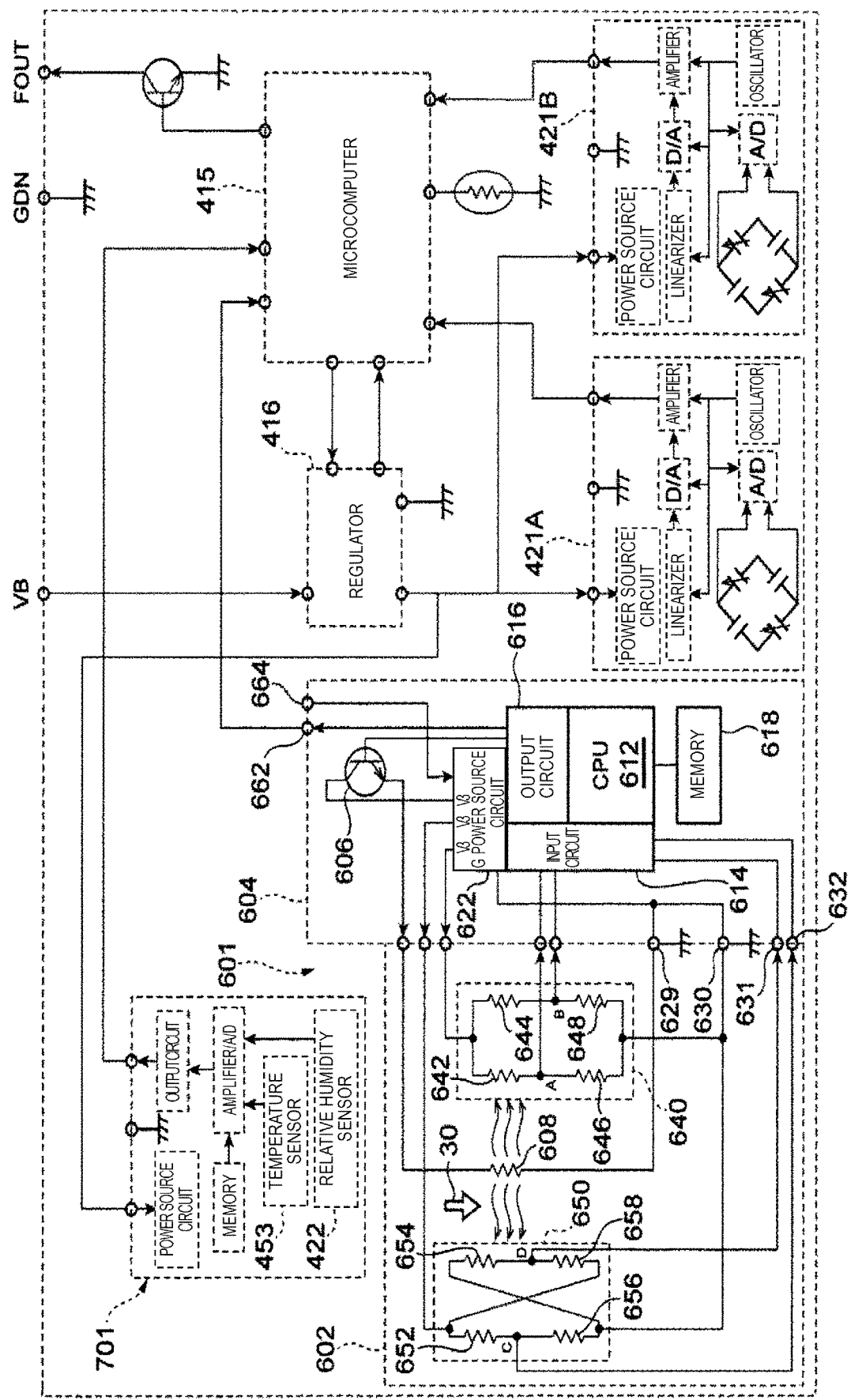
[Fig. 11-2]

[Fig. 12-1(a)]
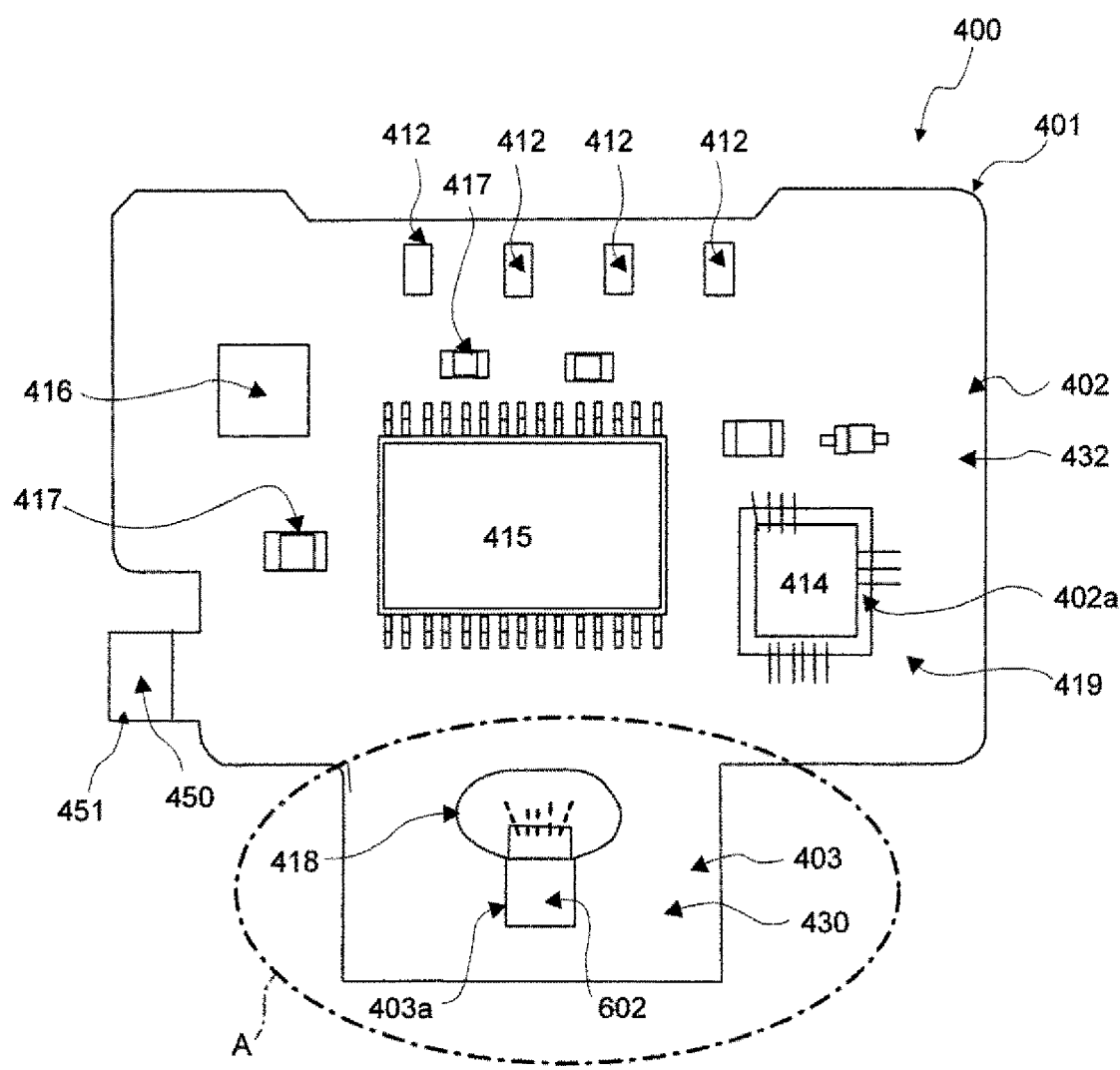

[Fig. 12-1(b)]
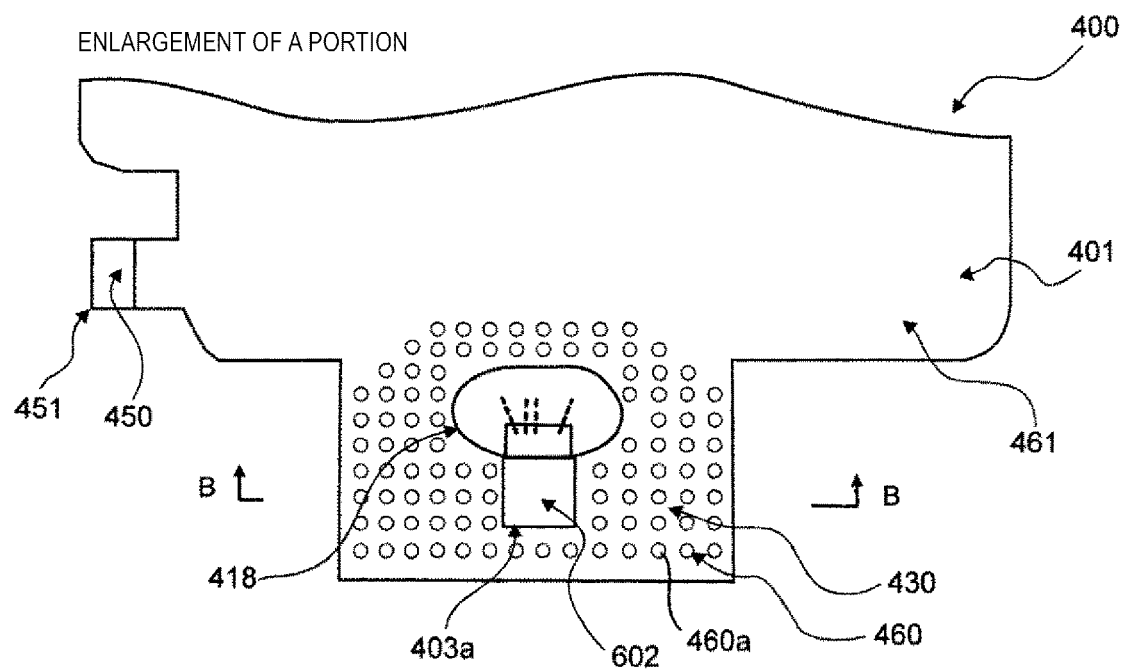

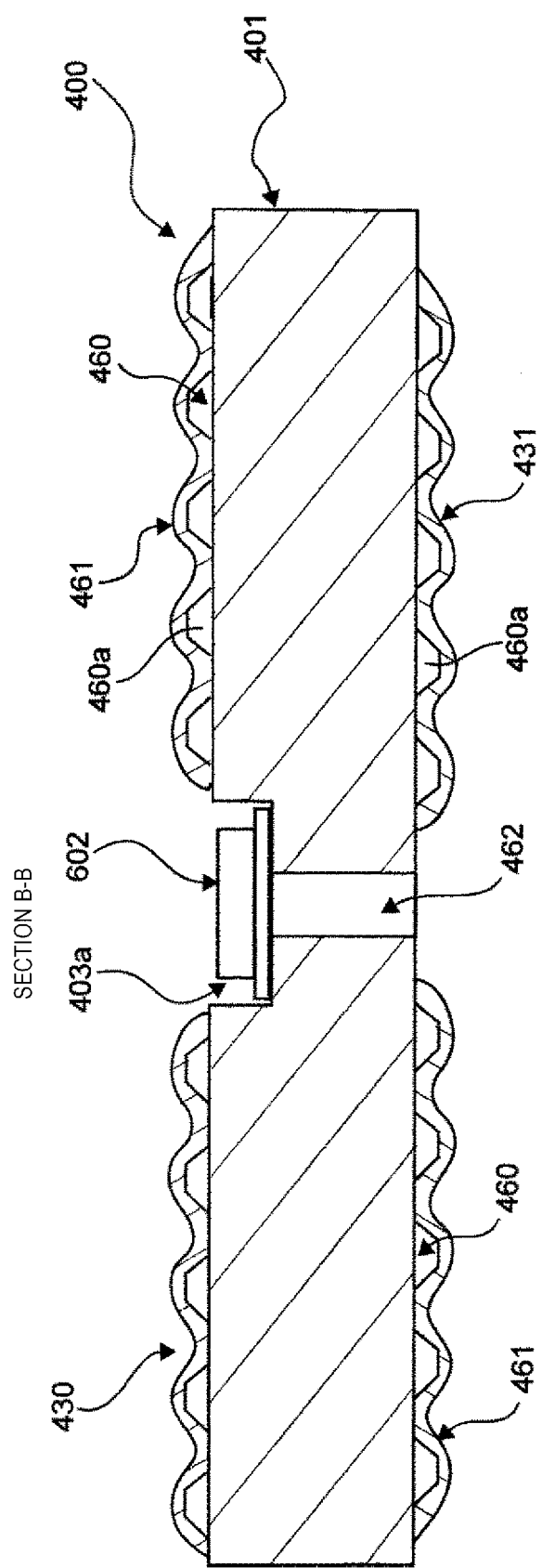
[Fig. 12-1(c)]

[Fig. 12-2(a)]
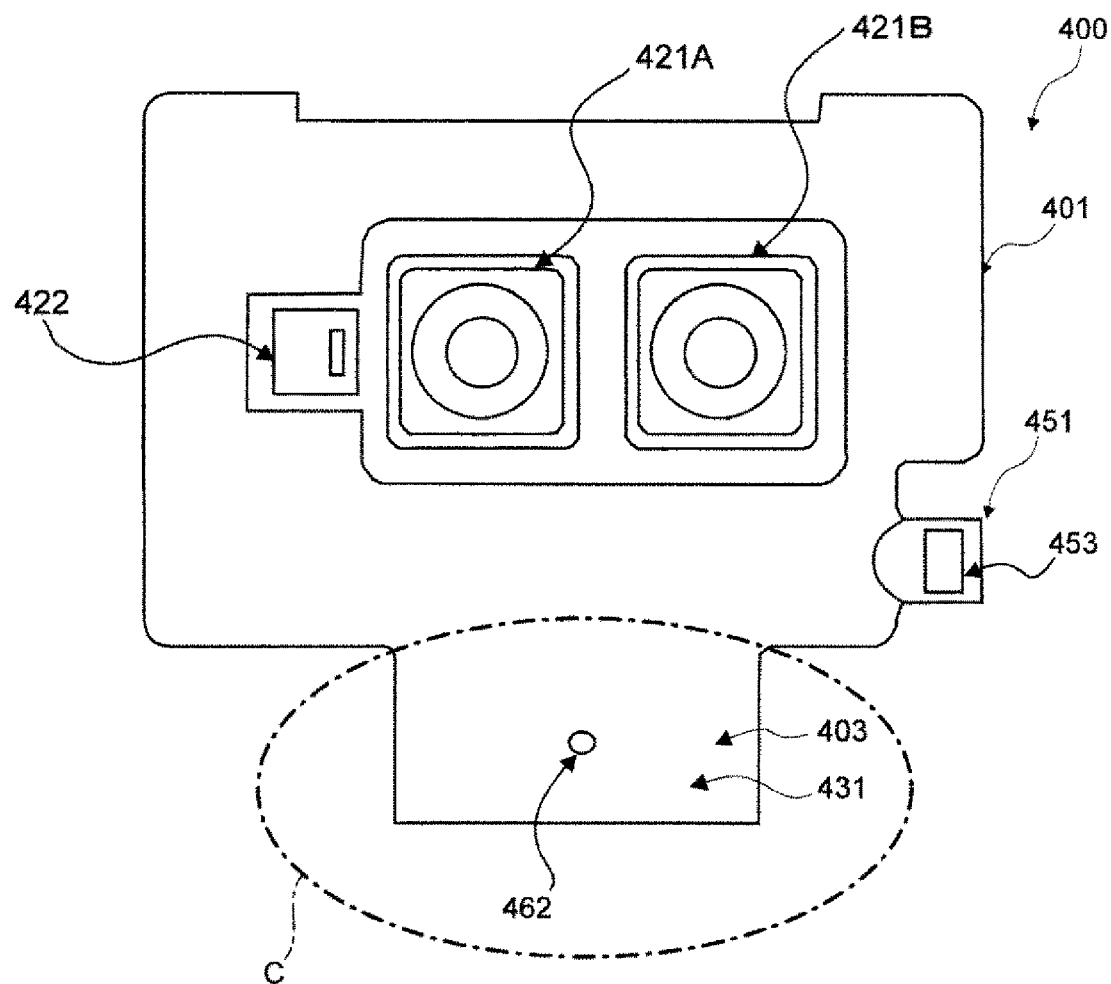

[Fig. 12-2(b)]
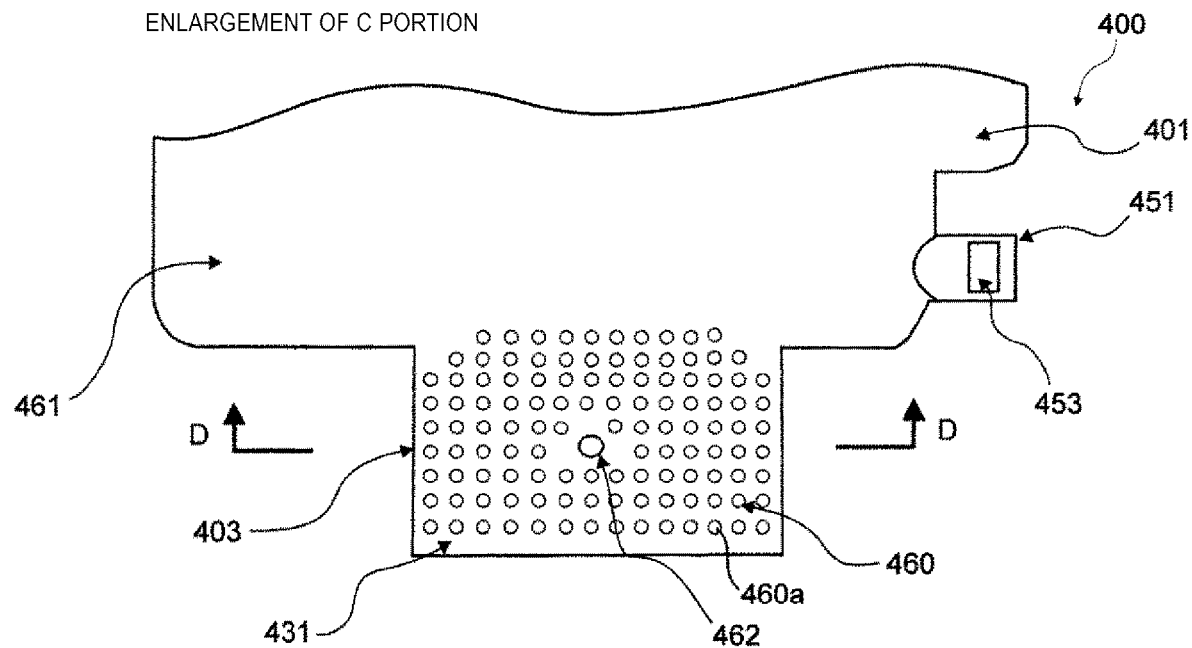

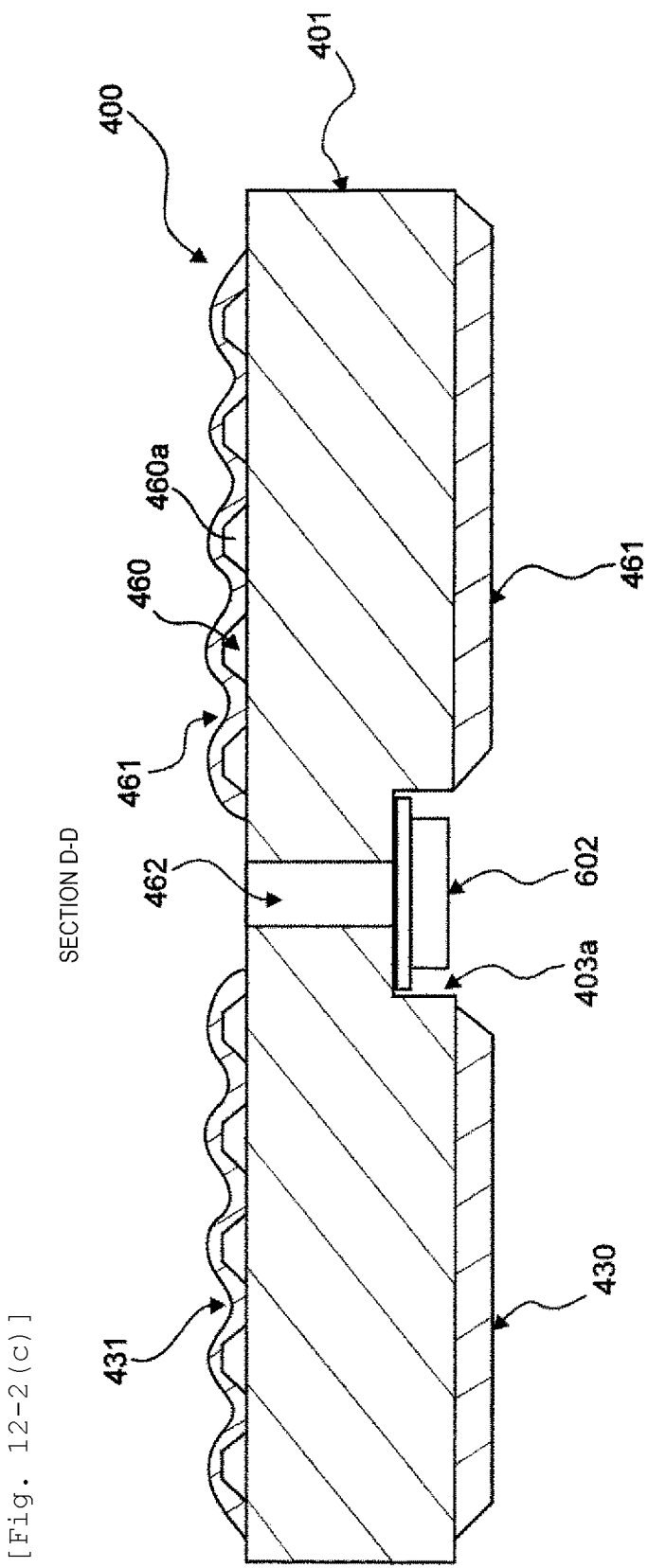

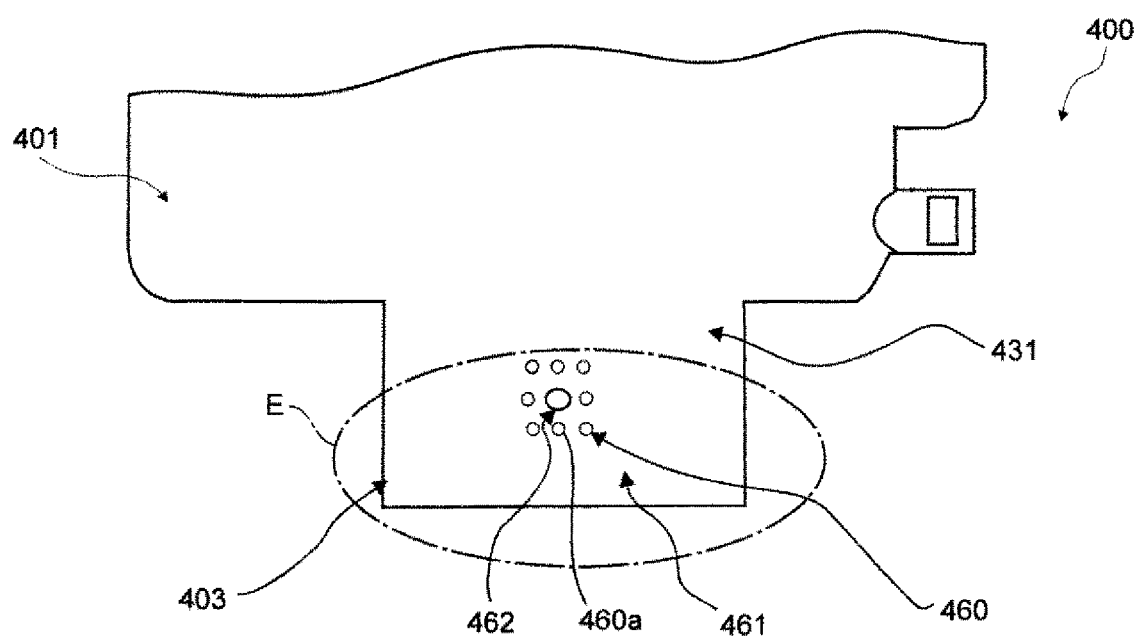
[Fig. 12-3(a)]

[Fig. 12-3(b)]
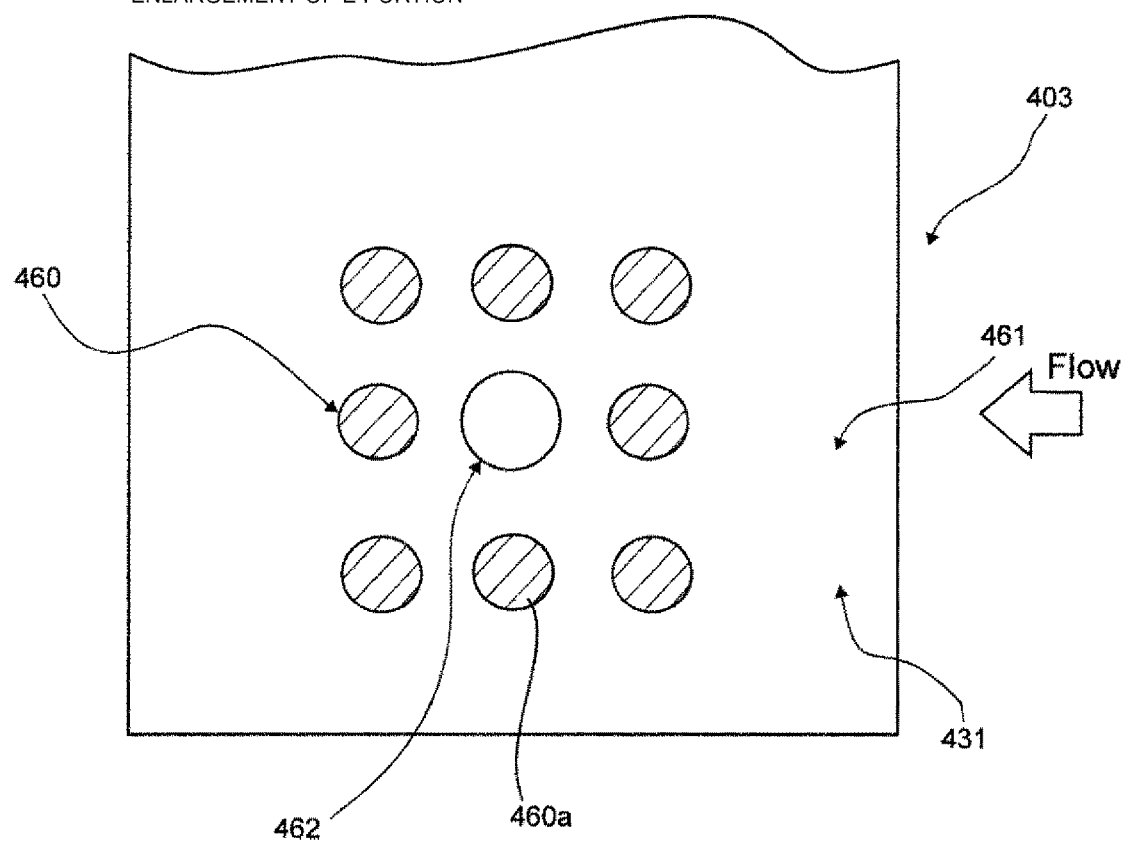

[Fig. 12-4(a)]
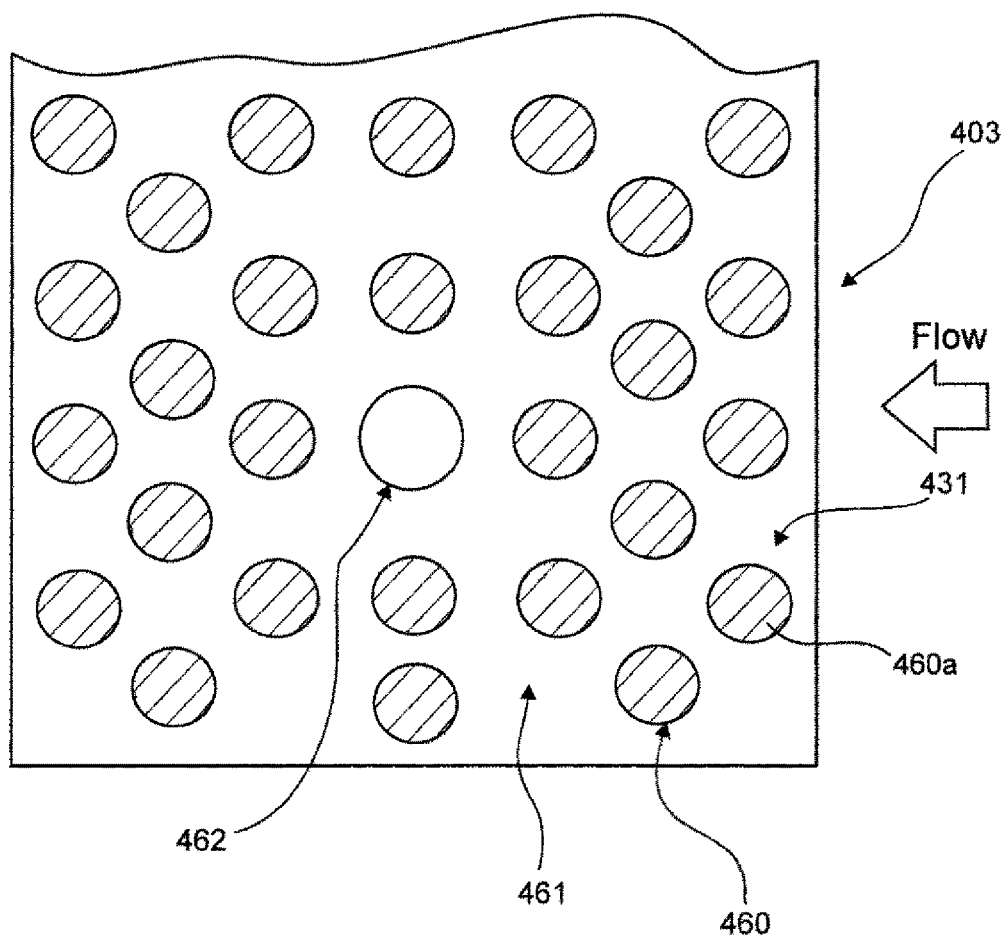

[Fig. 12-4(b)]
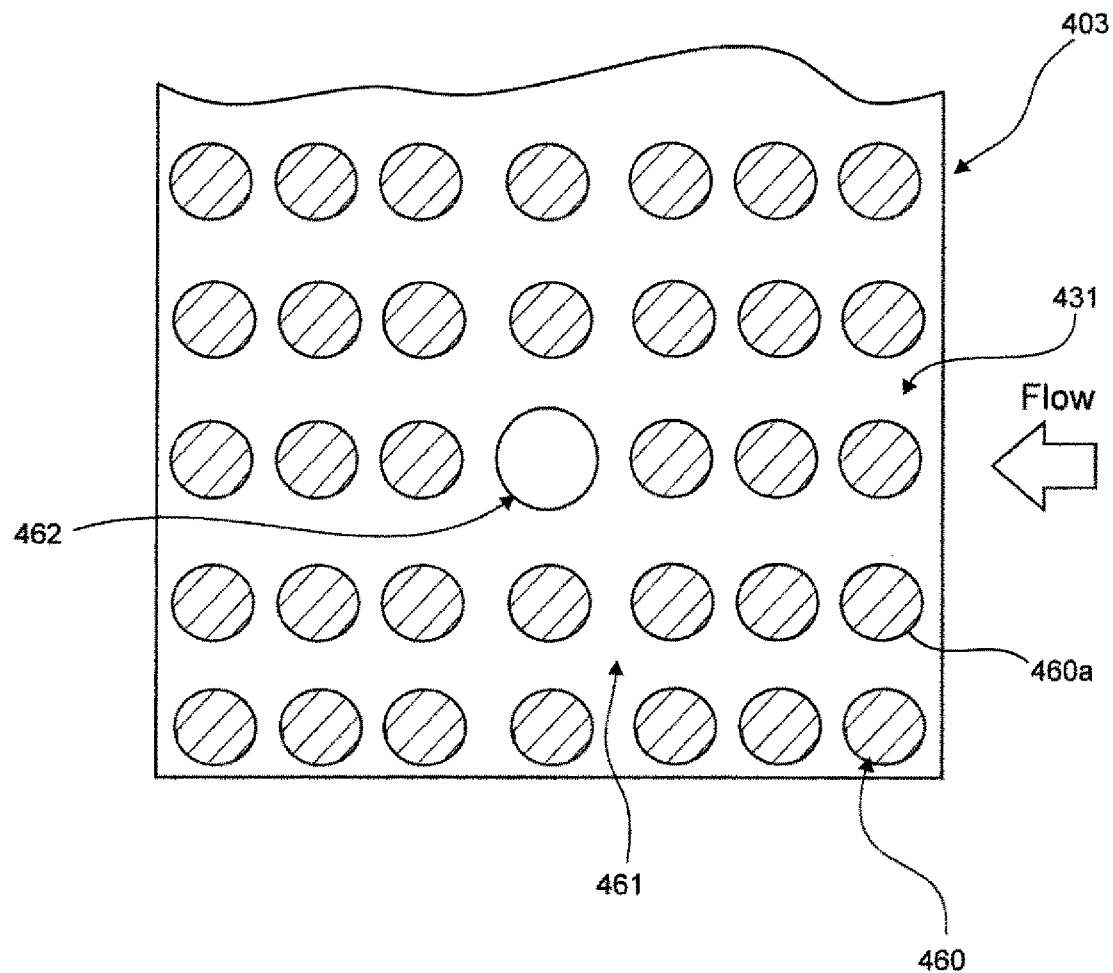

[Fig. 12-4(c)]
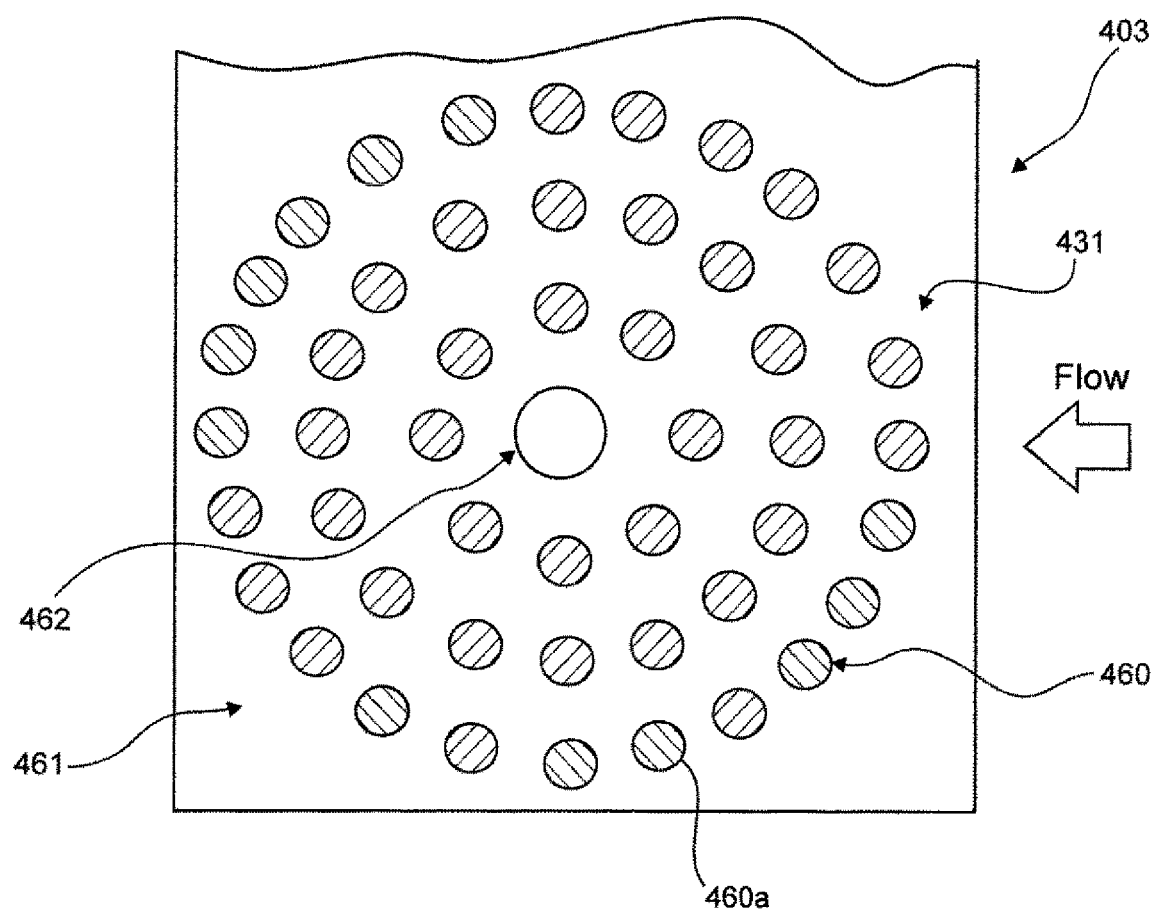

[Fig. 12-5(a)]
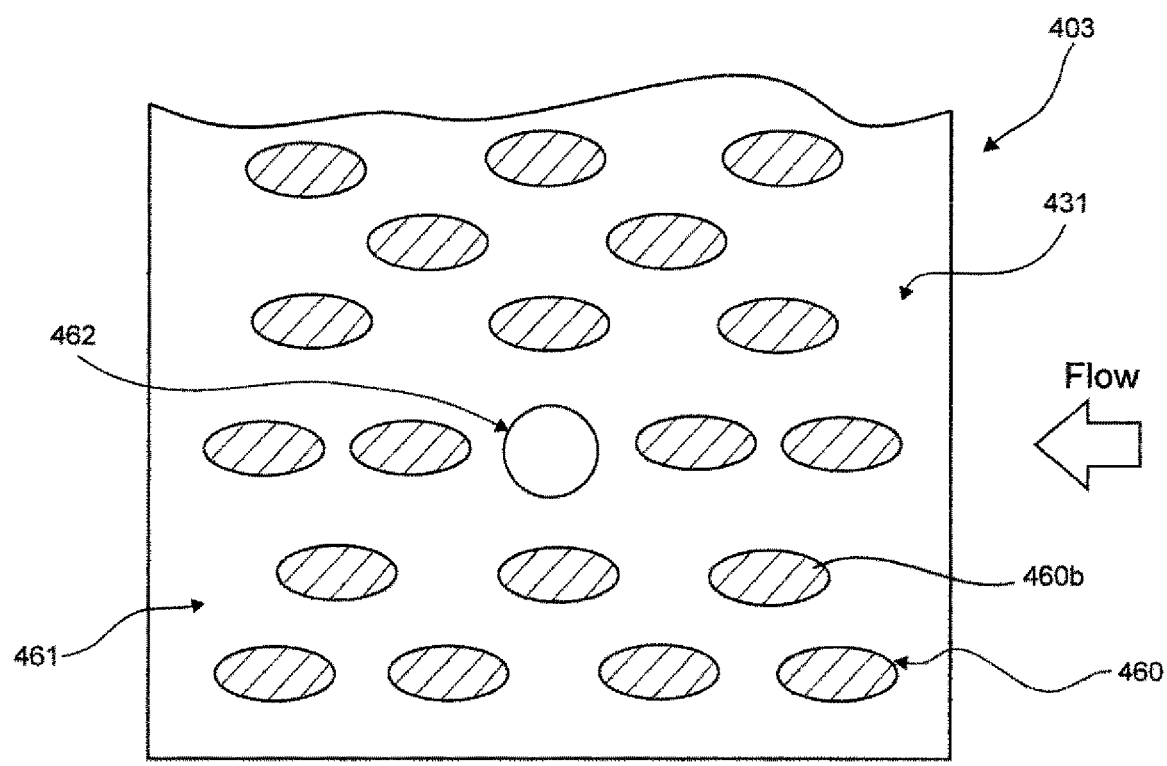

[Fig. 12-5(b)]
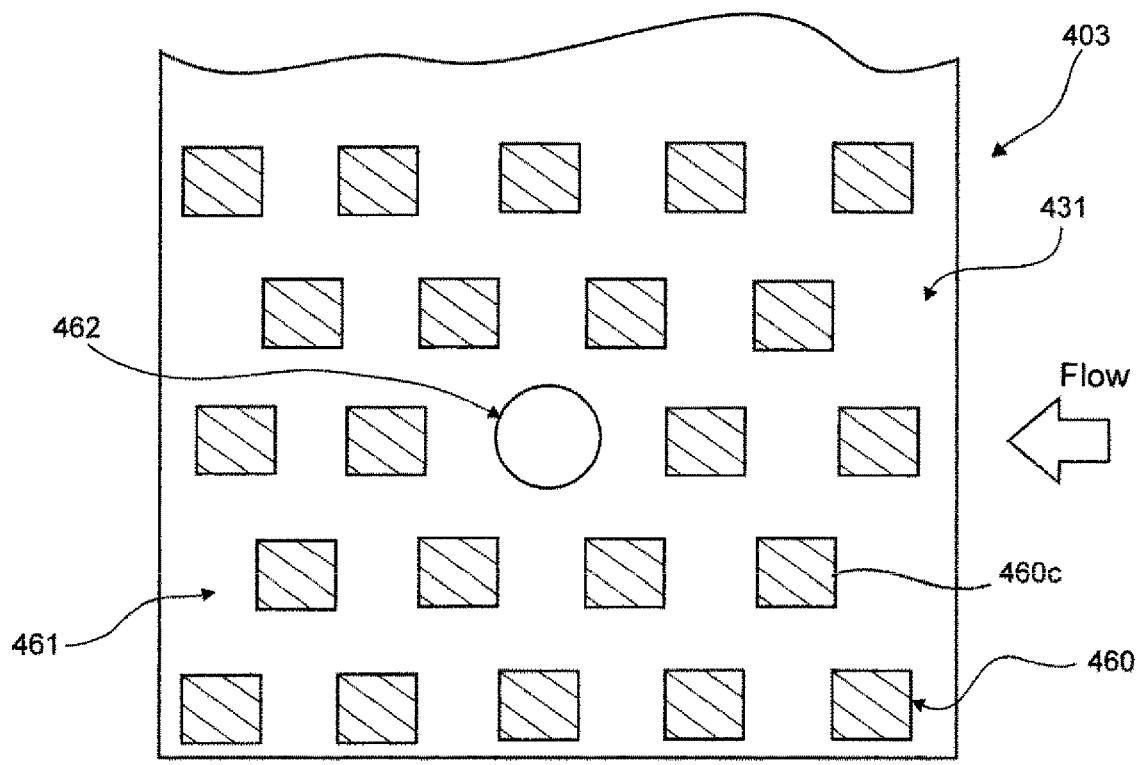

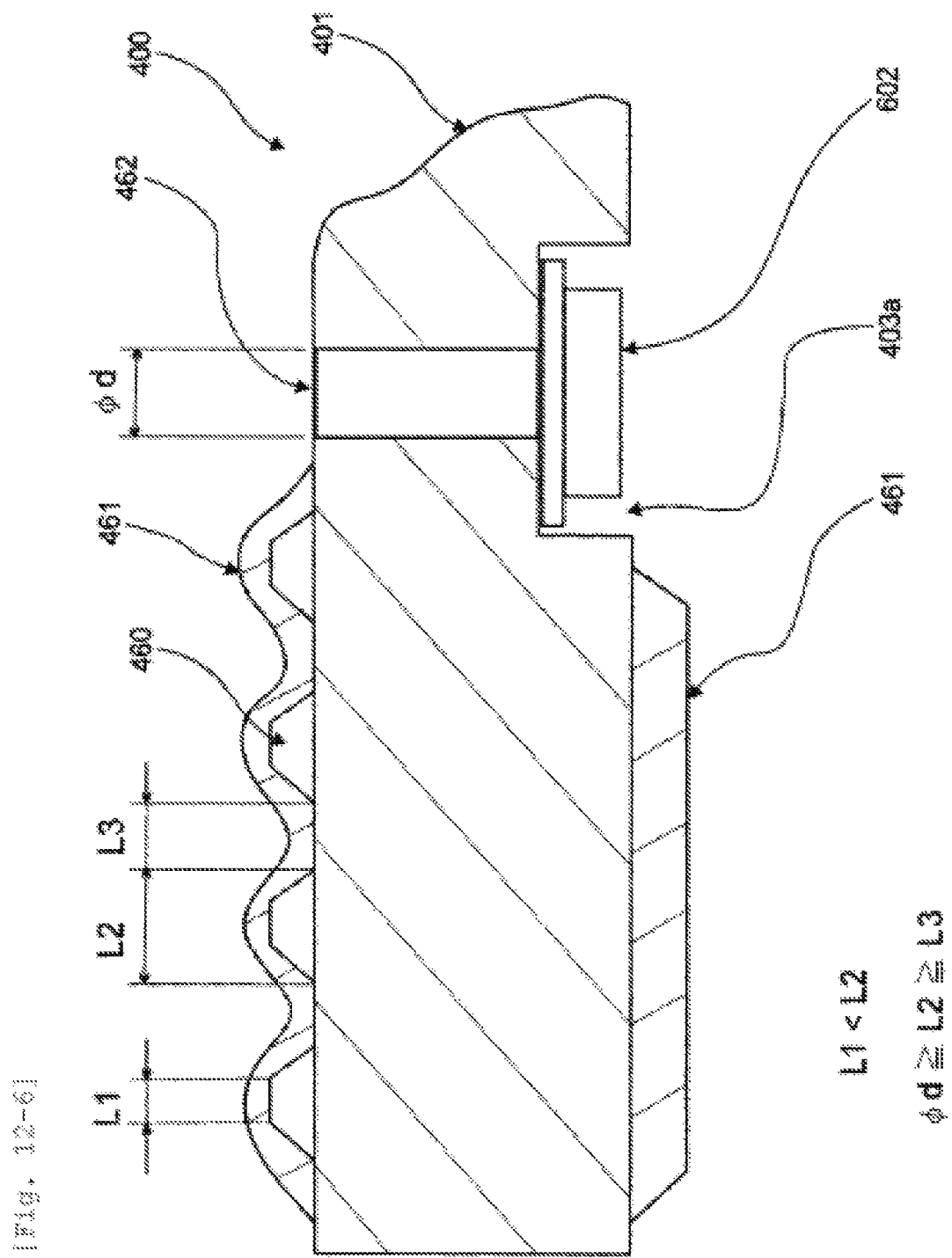

[Fig. 13-1(a)]
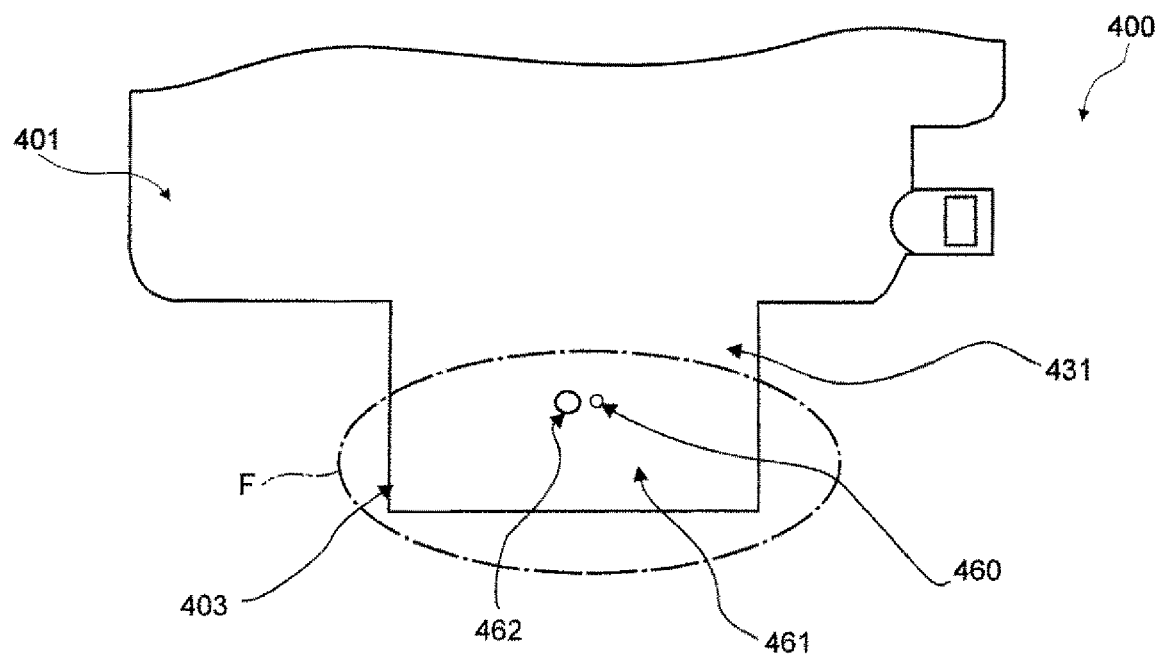

[Fig. 13-1(b)]
ENLARGEMENT OF F PORTION
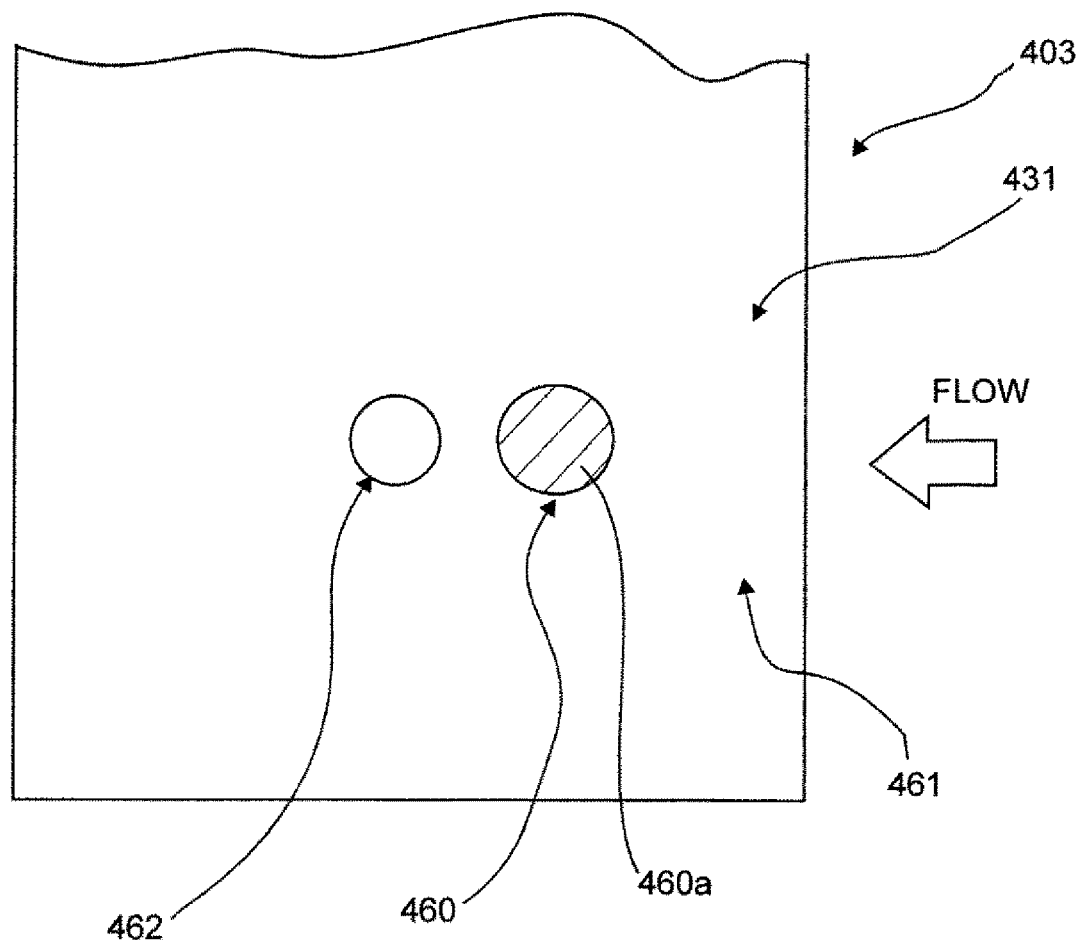

[Fig. 13-2(a)]
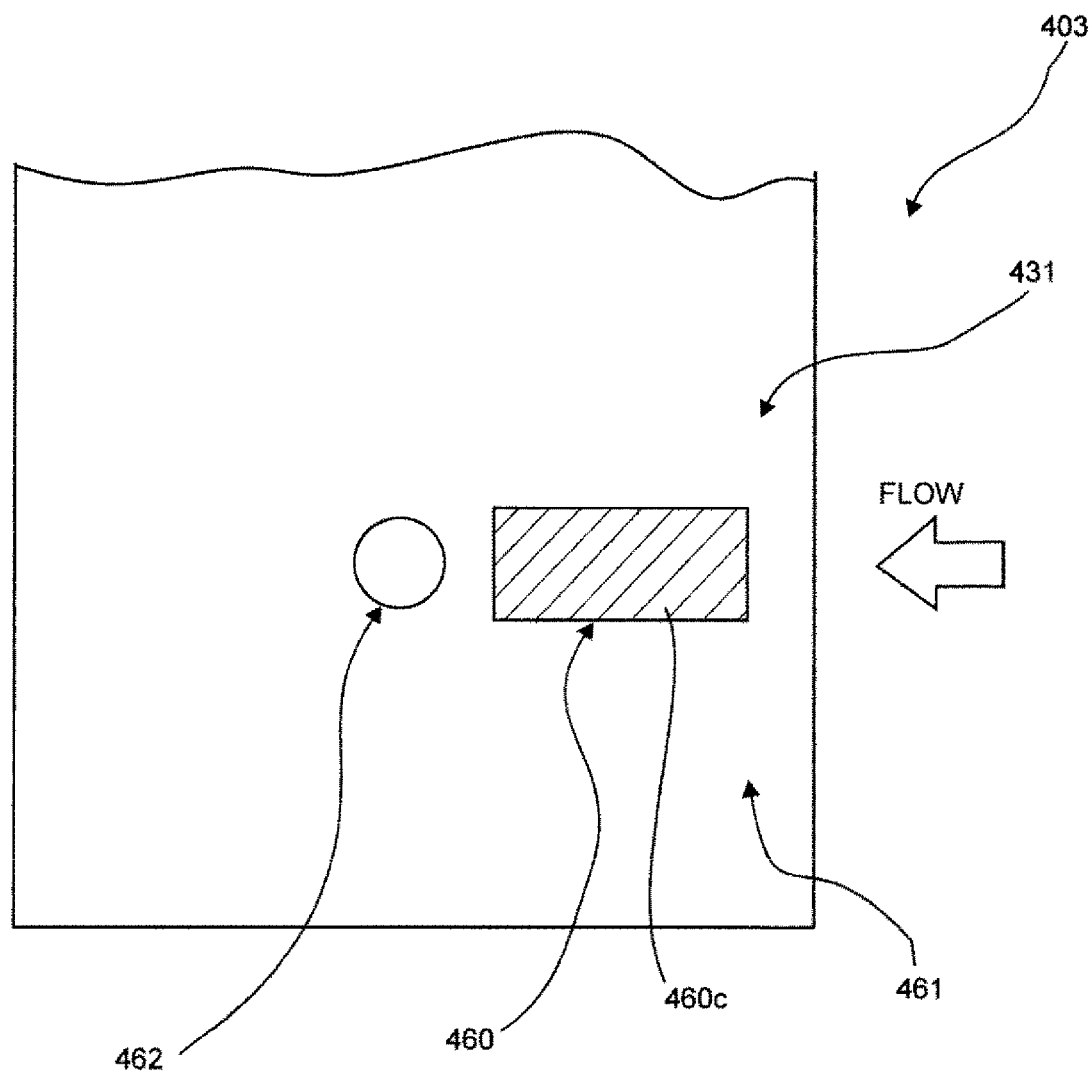

[Fig. 13-2(b)]
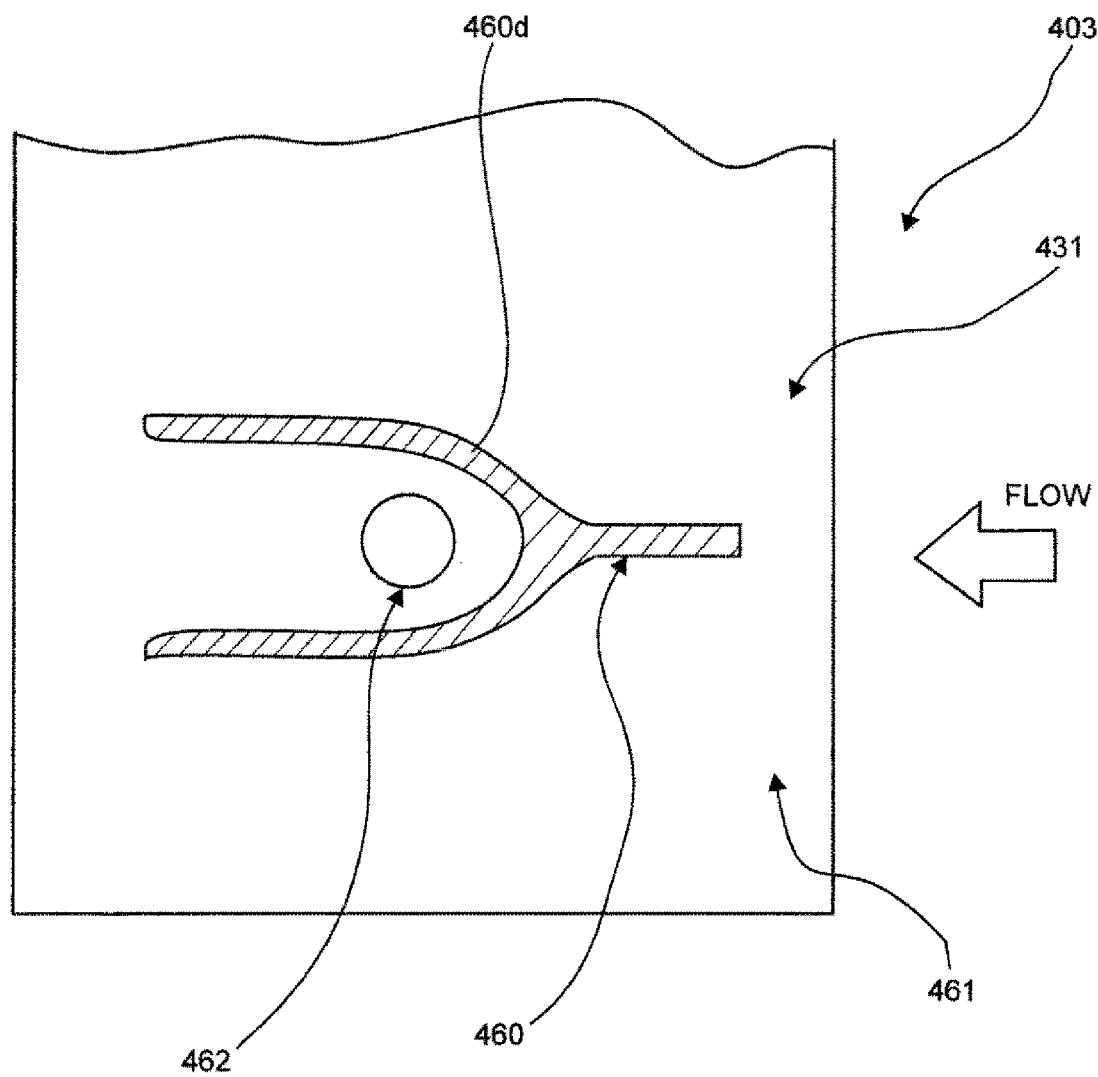

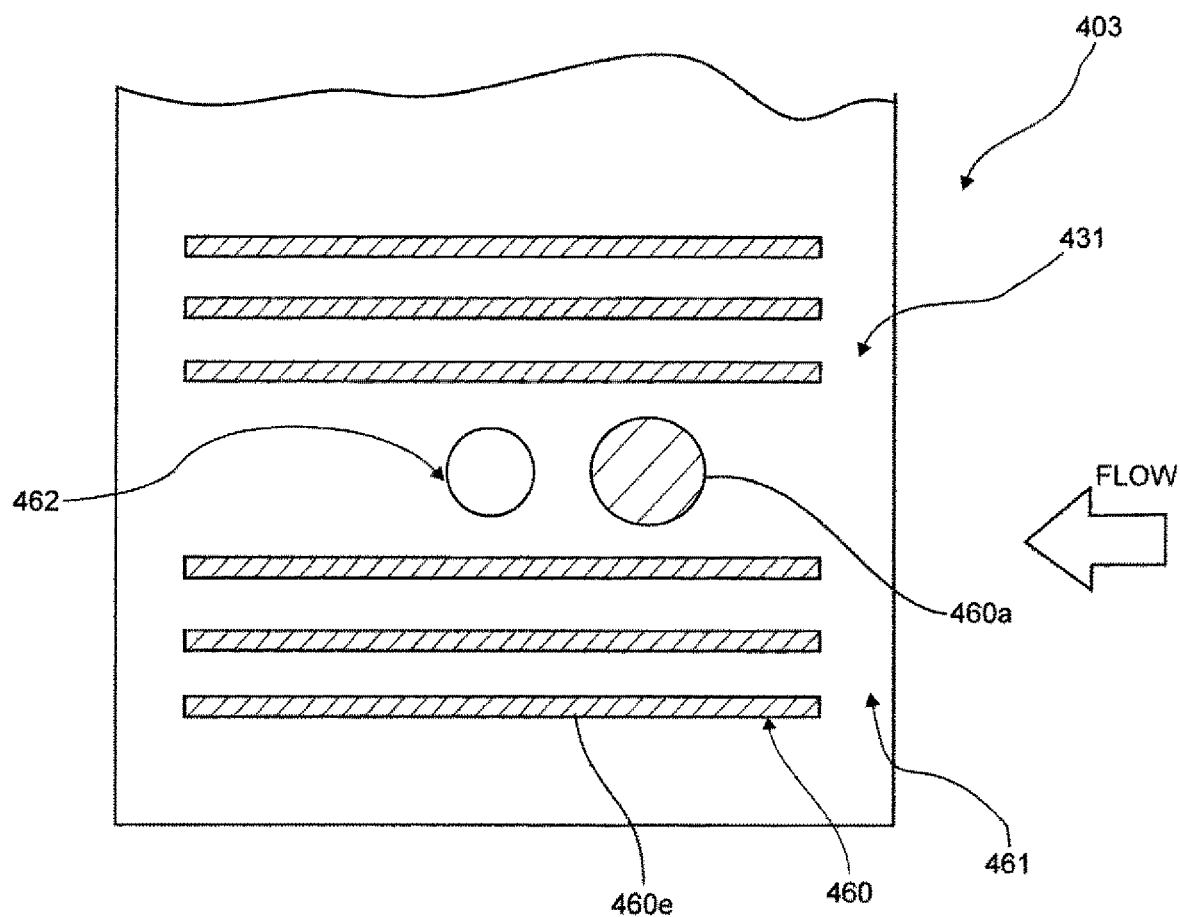
[Fig. 14-1(a)]

[Fig. 14-1(b)]
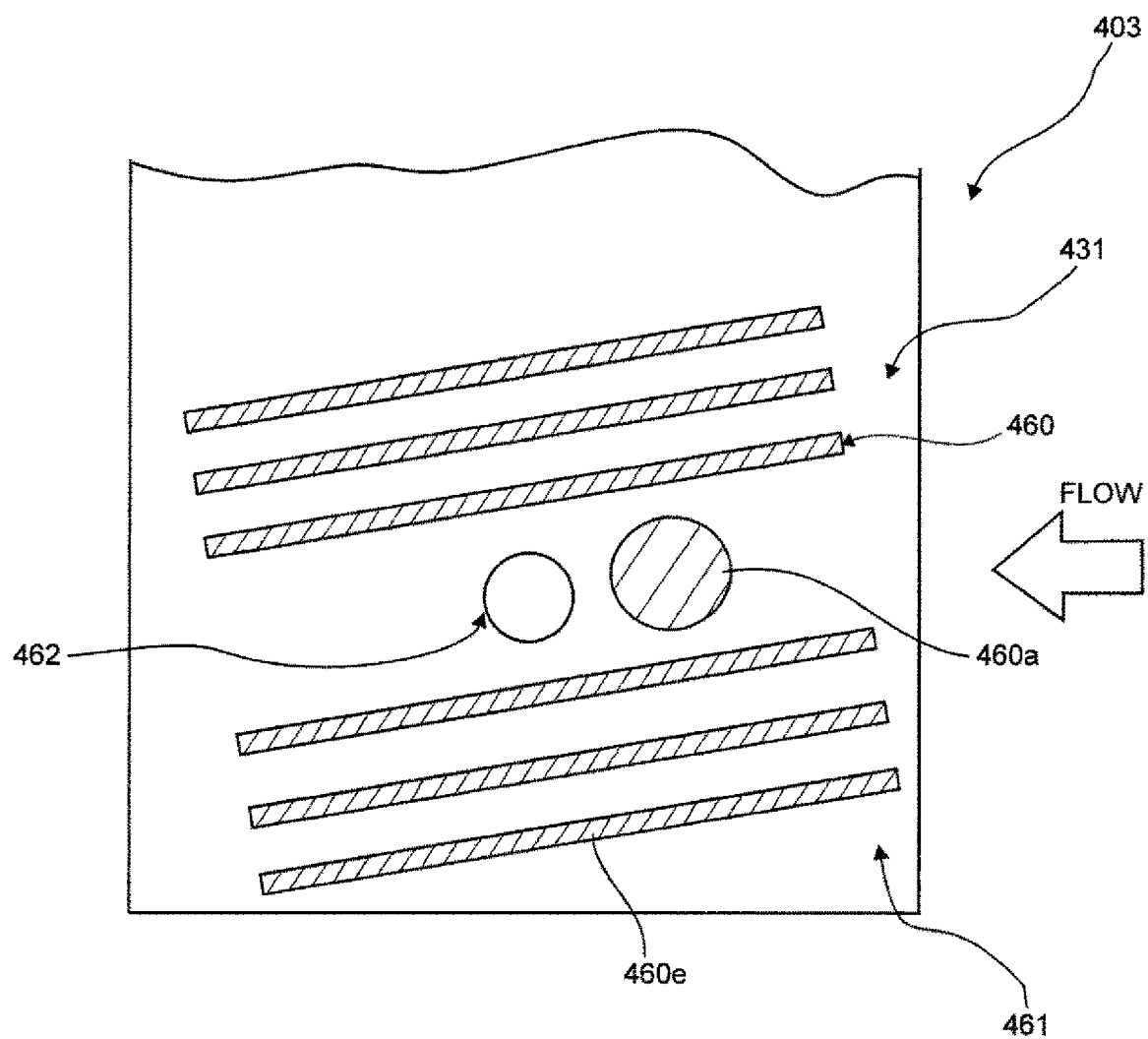

[Fig. 14-2(a)]
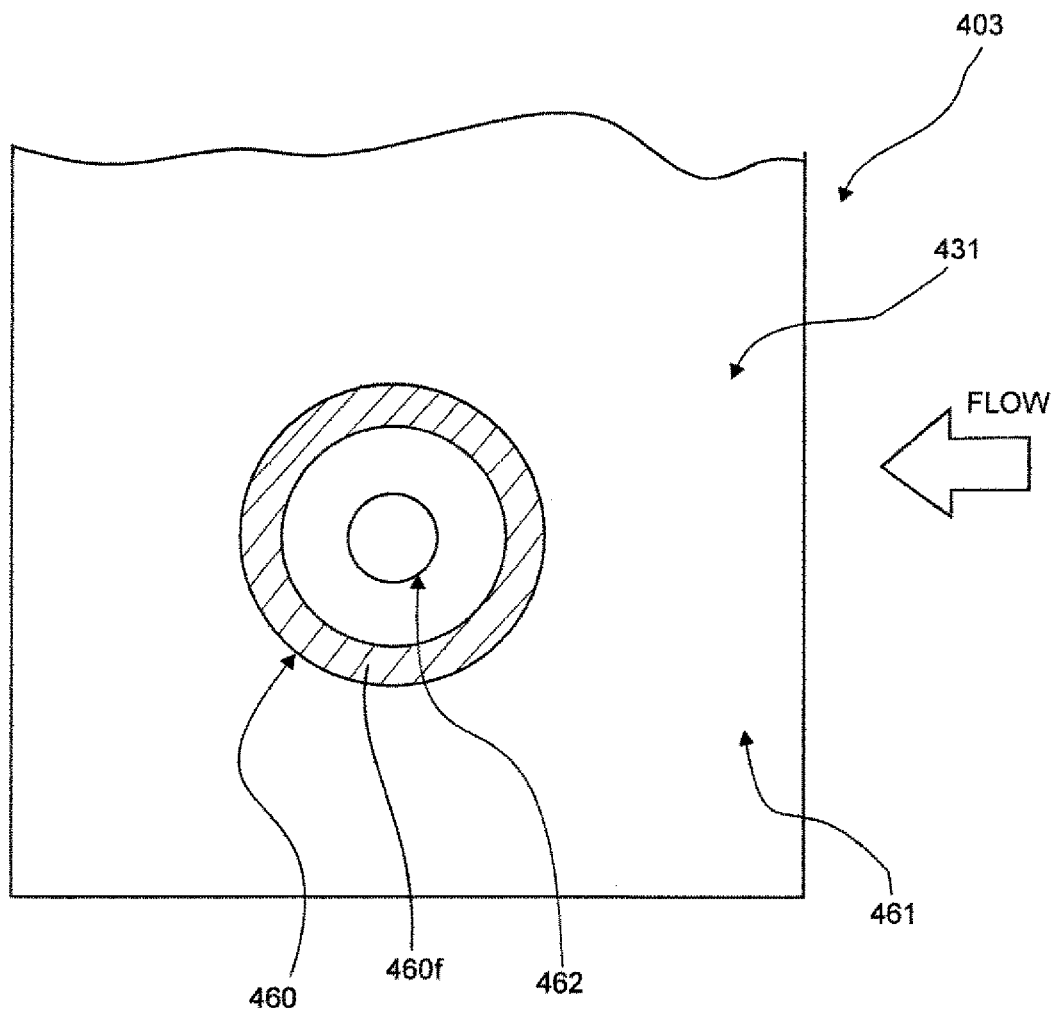

[Fig. 14-2(b)]
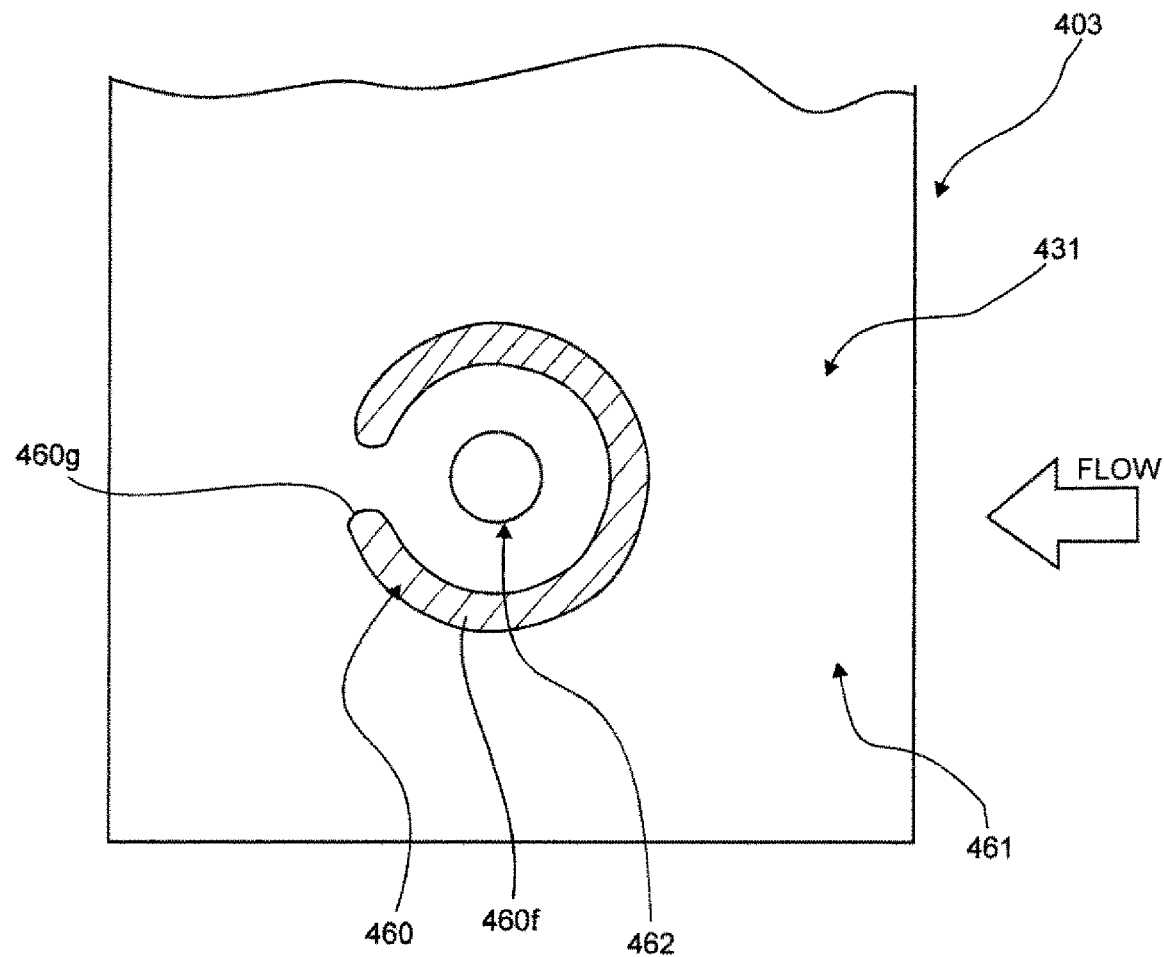

PHYSICAL QUANTITY DETECTING DEVICE WITH A CIRCUIT BOARD THAT HAS PROJECTIONS TO REPEL WATER

TECHNICAL FIELD

The present invention relates to a physical quantity measurement device for intake air in an internal combustion engine.

BACKGROUND ART

In PTL 1, in order to prevent a thin film diaphragm from being damaged due to boiling in a case where water drops are attached to the diaphragm serving as a sensing element in a thermal flowmeter, a convex structure made of a water repellent material is formed on an outer periphery of the thin film diaphragm.

CITATION LIST

Patent Literature

PTL 1: JP-A-2014-174064

SUMMARY OF INVENTION

Technical Problem

The invention disclosed in PTL 1 relates to a structure of the thermal flowmeter in which, in order to prevent the thin film diaphragm from being damaged by boiling in water drops attached to the diaphragm, the protrusion structure which is provided to be spaced from the outer periphery of the thin film diaphragm with a gap and is made of a water repellent material is provided on a surface of the thin film diaphragm, but it is very difficult to practically form a convex structure by using a water repellent material repelling water.

Regarding a method of forming a protrusion shape on a diaphragm surface of several mm, there may be a method using a process of printing and curing a resin paste, and a process of adhering a protrusion member (for example, a film-like sheet) formed in a convex shape in advance to a diaphragm surface, but product cost increases since an expensive water repellent material is used. A processing process is established by a special step and special equipment, and thus there is a disadvantage that product cost further increases.

In a case where water permeates into a diaphragm serving as a sensing portion of silicon semiconductor via a through-hole which is provided in a circuit board and is directly connected to the diaphragm, there is concern that the diaphragm is damaged by boiling in the water permeating into the diaphragm, and thus characteristics thereof are influenced.

Therefore, an object of the invention is to provide a physical quantity measurement device with high reliability by preventing water drops being attached to a diaphragm area.

Solution to Problem

In order to solve the problems, according to the present invention, there is provided a physical quantity measurement device including a circuit board that is provided with a measurement portion measuring a physical quantity of a gas to be measured passing through a main passage and a circuit portion performing a calculation process on the physical quantity measured by the measurement portion; and a housing in which the circuit board is stored, in which, in the circuit board, a physical quantity measurement portion mounted on a part of the circuit board and a part of the circuit board are exposed to a physical quantity measurement space, and, in which a plurality of projections which are individually electrically disconnected from a circuit wiring are provided on a part of the circuit board.

Advantageous Effects of Invention

According to the present invention, it is possible to provide a physical quantity measurement device with high reliability by preventing water drops from being attached to a diaphragm area by repelling water drops. Objects, configurations, and effects other than those described above will become apparent through description of the following embodiments.

BRIEF DESCRIPTION OF DRAWINGS

FIG. 1 is a system diagram illustrating one Example in which a physical quantity measurement device according to the present invention is used in an internal combustion engine control system.

FIG. 2-1 is a front view of the physical quantity measurement device.

FIG. 2-2 is a rear view of the physical quantity measurement device.

FIG. 2-3 is a left side view of the physical quantity measurement device.

FIG. 2-4 is a right side view of the physical quantity measurement device.

FIG. 2-5 is a plan view of the physical quantity measurement device.

FIG. 2-6 is a bottom view of the physical quantity measurement device.

FIG. 3-1 is a front view illustrating a state in which a front cover is detached from the physical quantity measurement device.

FIG. 3-2 is a rear view illustrating a state in which a rear cover is detached from the physical quantity measurement device.

FIG. 3-3 is a left side view illustrating a state in which the front cover and the rear cover are detached from the physical quantity measurement device.

FIG. 3-4 is a right side view illustrating a state in which the front cover and the rear cover are detached from the physical quantity measurement device.

FIG. 3-5 is a sectional view taken along the line A-A in FIG. 3-1.

FIG. 4-1 is a rear view for explaining another Example of a housing.

FIG. 4-2 is a right side view of the housing illustrated in FIG. 4-1.

FIG. 5 is a diagram illustrating a configuration of the front cover.

FIG. 6 is a diagram illustrating a configuration of the rear cover.

FIG. 7-1 is a front view of a circuit board.

FIG. 7-2 is a right side view of the circuit board.

FIG. 7-3 is a rear view of the circuit board.

FIG. 7-4 is a left side view of the circuit board.

FIG. 7-5 is a sectional view taken along the line B-B in FIG. 7-1.

FIG. 7-6 is a diagram illustrating another Example corresponding to the sectional view taken along the line B-B in FIG. 7-1.

FIG. 7-7 is a sectional view taken along the line C-C in FIG. 7-1.

FIG. 8-1 is a diagram illustrating a structure of a sensor chamber, in which FIG. 8-1(a) is an enlarged diagram, and FIG. 8-1(b) is a sectional view taken along the line E1-E1 in FIG. 8-1(a).

FIG. 8-2 is a diagram illustrating a structure of another Example of the sensor chamber, in which FIG. 8-2(a) is an enlarged diagram of the sensor chamber, and FIG. 8-2(b) is a sectional view taken along the line E2-E2 in FIG. 8-2(a).

FIG. 8-3 is a diagram illustrating a structure of still another Example of the sensor chamber, in which FIG. 8-3(a) is an enlarged diagram of the sensor chamber, and FIG. 8-3(b) is a sectional view taken along the line E3-E3 in FIG. 8-3(a).

FIG. 9-1 is a front view illustrating another Example of the circuit board.

FIG. 9-2 is a front view illustrating still another Example of the circuit board.

FIG. 9-3 is a front view illustrating still another Example of the circuit board.

FIG. 9-4 is a front view illustrating still another Example of the circuit board.

FIG. 9-5 is a front view illustrating still another Example of the circuit board.

FIG. 9-6 is a front view illustrating still another Example of the circuit board.

FIG. 9-7 is a front view illustrating still another Example of the circuit board.

FIG. 9-8 is a front view illustrating still another Example of the circuit board.

FIG. 10-1 is a diagram illustrating a structure of a terminal connection portion.

FIG. 10-2 is a diagram illustrating a structure of the terminal connection portion.

FIG. 10-3 is a sectional view taken along the line F-F in FIG. 10-1.

FIG. 10-4 is a sectional view taken along the line G-G in FIG. 10-2.

FIG. 11-1 is a diagram for explaining an example of a circuit configuration of the physical quantity measurement device.

FIG. 11-2 is a diagram for explaining another Example of a circuit configuration of the physical quantity measurement device.

FIG. 12-1(a) is a diagram illustrating the entire front surface of the circuit board.

FIG. 12-1(b) is an enlarged view of an A portion in FIG. 12-1(a).

FIG. 12-1(c) is a sectional view taken along the line B-B in FIG. 12-1(b).

FIG. 12-2(a) is a diagram illustrating the entire back surface of the circuit board.

FIG. 12-2(b) is an enlarged view of a C portion in FIG. 12-2(a).

FIG. 12-2(c) is a sectional view taken along the line D-D in FIG. 12-2(b).

FIG. 12-3(a) is a diagram illustrating the entire protrusion portion of the back surface of the circuit board.

FIG. 12-3(b) is an enlarged view of an E portion in FIG. 12-3(a).

FIG. 12-4(a) is a diagram illustrating an example of arrangement of convex projections on the back surface of the circuit board.

FIG. 12-4(b) is a diagram illustrating an example of arrangement of convex projections on the back surface of the circuit board.

FIG. 12-4(c) is a diagram illustrating an example of arrangement of convex projections on the back surface of the circuit board.

FIG. 12-5(a) is a diagram illustrating an example of a shape of convex projections on the back surface of the circuit board.

FIG. 12-5(b) is a diagram illustrating an example of arrangement of convex projections on the back surface of the circuit board.

FIG. 12-6 is a diagram illustrating a dimension relationship of the circuit board.

FIG. 13-1(a) is a diagram illustrating the entire back surface protrusion position of the circuit board.

FIG. 13-1(b) is an enlarged view of an F portion in FIG. 13-1(a).

FIG. 13-2 (a) is a diagram illustrating another embodiment of the embodiment illustrated in FIG. 13-1(b).

FIG. 13-2(b) is a diagram illustrating still another embodiment of the embodiment illustrated in FIG. 13-1(b).

FIG. 14-1(a) is a diagram illustrating still another embodiment of the embodiment illustrated in FIG. 13-1(b).

FIG. 14-1(b) is a diagram illustrating still another embodiment of the embodiment illustrated in FIG. 13-1 (b).

FIG. 14-2(a) is a diagram illustrating still another embodiment of the embodiment illustrated in FIG. 13-1(b).

FIG. 14-2(b) is a diagram illustrating still another embodiment of the embodiment illustrated in FIG. 13-1(b).

DESCRIPTION OF EMBODIMENTS

In the following description, the best mode for carrying out the invention (hereinafter, referred to as, an Example) solves various problems desired to be solved in an actual product, and, particularly solves various problems desired to be solved in a measurement device measuring a physical quantity of intake air in a vehicle, so as to achieve various effects. One of various problems solved by the following Examples is the content described in the section of Solution to Problem, and one of various effects achieved by the following Examples is the effect described in the section of Advantageous Effects of Invention. Problems solved by the following Examples and various effects achieved by the following Examples will be described in description of the following Examples. Therefore, the content of problems solved by Examples or effects, described in the following Examples, may be the content other than the content described in the section of Solution to Problem and the section of Advantageous Effects of Invention.

In the following Examples, the same reference numeral indicates the same constituent element throughout the drawings, and thus the same advantageous effect is achieved. A constituent element which has already been described is given only a reference numeral, and description thereof is omitted, in some cases.

1. One Example in which Physical Quantity Measurement Device According to the Present Invention is Used in Internal Combustion Engine Control System FIG. 1 is a system diagram illustrating one Example in which a physical quantity measurement device according to the present invention is used in an internal combustion engine control system of an electronic fuel injection type. Intake air which is sucked from an air cleaner 122 as a gas 30 to be measured is guided to a combustion chamber of an engine cylinder 112 via, for example, a main passage 124 such as an intake body, a throttle body 126, an intake manifold 128 on the basis of an operation of an internal combustion engine 110 including the engine cylinder 112 and an engine piston 114. A physical quantity of the gas 30 to be measured which is intake air guided to the combustion chamber is measured by a physical quantity measurement device 300 according to the present invention, and a fuel is supplied from a fuel injection valve 152 on the basis of the measured physical quantity, and is guided to the combustion chamber in a state of a mixed gas along with intake air 20. In the present example, the fuel injection valve 152 is provided at an intake port of the internal combustion engine, a fuel injected into the intake port forms a mixed gas along with the gas 30 to be measured which is intake air, and is guided to the combustion chamber via an intake valve 116 so as to be burnt and to generate mechanical energy.

The fuel and the air guided to the combustion chamber are in a mixed state of the fuel and the air, and are explosively burnt due to spark ignition of an ignition plug 154 so as to generate mechanical energy. The burnt gas is guided to an exhaust tube via an exhaust valve 118, and is exhausted to the outside of a vehicle from the exhaust tube as an exhaust gas 24. A flow rate of the gas 30 to be measured which is intake air guided to the combustion chamber is controlled by a throttle valve 132 of which an opening degree changes on the basis of an operation on an accelerator pedal. A fuel supply amount is controlled on the basis of a flow rate of intake air guided to the combustion chamber, and a driver controls an opening degree of the throttle valve 132 so as to control a flow rate of intake air guided to the combustion chamber, and can thus control mechanical energy generated by the internal combustion engine.

1.1 Summary of Control of Internal Combustion Engine Control System

A physical quantity such as a flow rate, the temperature, humidity, or pressure of the gas 30 to be measured which is intake air taken in from the air cleaner 122 and flowing through the main passage 124 are measured by the physical quantity measurement device 300, and an electric signal indicating the physical quantity of the intake air is input to a control device 200 from the physical quantity measurement device 300. An output from a throttle angle sensor 144 measuring an opening degree of the throttle valve 132 is input to the control device 200, and an output from a rotation angle sensor 146 is input to the control device 200 in order to measure a position or a state of the engine piston 114, the intake valve 116, or the exhaust valve 118 of the internal combustion engine, and a rotation speed of the internal combustion engine. An output from an oxygen sensor 148 is input to the control device 200 in order to measure a state of a mixture ratio between a fuel amount and an air amount on the basis of a state of the exhaust gas 24.

The control device 200 calculates a fuel injection amount or an ignition timing on the basis of the physical quantity of the intake air which is an output from the physical quantity measurement device 300, and the rotation speed of the internal combustion engine which is measured by using the output from the rotation angle sensor 146. A fuel amount supplied from the fuel injection valve 152 and the ignition timing at which a fuel is ignited by the ignition plug 154. A fuel supply amount or an ignition timing is actually finely controlled on the basis of a temperature or a change state of a throttle angle measured by the physical quantity measurement device 300, a change state of an engine rotation speed, and a state of a fuel air ratio measured by the oxygen sensor 148. The control device 200 controls an amount of air bypassing the throttle valve 132 with an idle air control valve 156 in an idle operation state of the internal combustion engine, and controls a rotation speed of the internal combustion engine in the idle operation state.

1.2 Importance of Improvement of Measurement Accuracy in Physical Quantity Measurement Device and Mounting Environment of Physical Quantity Measurement Device Both of a fuel supply amount and an ignition timing which are primary control amounts of the internal combustion engine are calculated by using outputs from the physical quantity measurement device 300 as main parameters. Therefore, improvement of measurement accuracy in the physical quantity measurement device 300, suppression of a change over time, and improvement of reliability are important in improvement of control accuracy of a vehicle or ensuring of reliability thereof.

Particularly, in recent years, the demand for fuel saving of vehicles is very high, and the demand for purification of exhaust gas is very high. In order to cope with these demands, it is considerably important to improve measurement accuracy of a physical quantity of the intake air 20 measured by the physical quantity measurement device 300. It is also important for the physical quantity measurement device 300 to maintain high reliability.

A vehicle on which the physical quantity measurement device 300 is mounted is used in an environment in which a change in a temperature or humidity is great. It is desirable in the physical quantity measurement device 300 that coping with a change in a temperature or humidity in the usage environment, or coping with dust or contaminants is also taken into consideration.

The physical quantity measurement device 300 is attached to the intake tube influenced by heat generated from the internal combustion engine. Thus, heat generated from the internal combustion engine is delivered to the physical quantity measurement device 300 via the intake tube which is the main passage 124. The physical quantity measurement device 300 performs heat transfer with a gas to be measured so as to measure a flow rate of the gas to be measured, and thus it is important to suppress the influence of heat from the outside as much as possible.

The physical quantity measurement device 300 mounted on a vehicle solves the problem described in the section of Solution to Problem and achieves the effect described in the section of Advantageous Effects of Invention, and also solves various problems desired to be solved in a product so as to achieve various effects as described below by taking into sufficient consideration of the above-described various problems. Specific problems solved or specific effects achieved by the physical quantity measurement device 300 will be described in the following Examples.

2. Configuration of Physical Quantity Measurement Device 300

2.1 Exterior Structure of Physical Quantity Measurement Device 300

FIGS. 2-1 to 2-6 are diagrams illustrating an exterior of the physical quantity measurement device 300, in which FIG. 2-1 is a front view of the physical quantity measurement device 300, FIG. 2-2 is a rear view thereof, FIG. 2-3 is a left side view thereof, FIG. 2-4 is a right side view thereof, FIG. 2-5 is a plan view thereof, and FIG. 2-6 is a bottom view thereof.

The physical quantity measurement device 300 includes a housing 302, a front cover 303, and a rear cover 304. The housing 302 is formed by molding a synthetic resin material, and includes a flange 311 which fixes the physical quantity measurement device 300 to the intake body which is the main passage 124, an external connection portion 321 having a connector protruding from the flange 311 and used for electrical connection to an external apparatus, and a measurement portion 331 extending to protrude toward the center of the main passage 124 from the flange 311.

A circuit board 400 is integrally provided with the measurement portion 331 through insert molding when the housing 302 is formed through molding (refer to FIGS. 3-1 and 3-2). The circuit board 400 is provided with at least one measurement portion measuring a physical quantity of the gas 30 to be measured flowing through the main passage 124, and a circuit portion processing a signal measured by the measurement portion. The measurement portion is disposed at a position exposed to the gas 30 to be measured, and the circuit portion is disposed in a circuit chamber sealed with the front cover 303.

A subsidiary passage is provided between a front surface and a rear surface of the measurement portion 331, and a first subsidiary passage 305 is formed through cooperation with the front cover 303 and the rear cover 304. A distal end part of the measurement portion 331 is provided with a first subsidiary passage inlet 305a for incorporating a part of the gas 30 to be measured such as intake air into the first subsidiary passage 305, and a first subsidiary passage outlet 305b for returning the gas 30 to be measured to the main passage 124 from the first subsidiary passage 305. A part of the circuit board 400 protrudes in the middle of the first subsidiary passage 305, and a flow rate measurement portion 602 (refer to FIG. 3-1) which is the measurement portion is disposed in the protruding portion so as to measure a flow rate of the gas 30 to be measured.

A second subsidiary passage 306 for incorporating a part of the gas 30 to be measured such as intake air into a sensor chamber Rs is provided in an intermediate part of the measurement portion 331 located further toward the flange 311 than the first subsidiary passage 305. The second subsidiary passage 306 is formed through cooperation with the measurement portion 331 and the rear cover 304. The second subsidiary passage 306 has a second subsidiary passage inlet 306a which is open in an upstream side outer wall 336 in order to incorporate the gas 30 to be measured, and a second subsidiary passage outlet 306b which is open in a downstream side outer wall 338 in order to return the gas 30 to be measured to the main passage 124 from the second subsidiary passage 306. The second subsidiary passage 306 communicates with the sensor chamber Rs formed on the back surface side of the measurement portion 331. A pressure sensor and a humidity sensor which are measurement portions provided on a rear surface of the circuit board 400 are provided in the sensor chamber Rs.

2.2 Effects Based on Exterior Structure of Physical Quantity Measurement Device 300

In the physical quantity measurement device 300, the second subsidiary passage inlet 306a is provided in the intermediate part of the measurement portion 331 extending toward the center of the main passage 124 from the flange 311, and the first subsidiary passage inlet 305a is provided in the distal end part of the measurement portion 331. Therefore, a gas in a portion close to the central portion of the main passage 124 separated from an inner wall surface instead of the vicinity of the inner wall surface can be incorporated into the first subsidiary passage 305 and the second subsidiary passage 306. Therefore, the physical quantity measurement device 300 can measure a physical quantity of a gas in the portion separated from the inner wall surface of the main passage 124, and can thus reduce a measurement error of a physical quantity due to heat or a flow velocity reduction near the inner wall surface.

The measurement portion 331 has a long shape extending along an axis from an outer wall of the main passage 124 toward the center, but has a narrow shape since a thickness width is small as illustrated in FIGS. 2-3 and 2-4. In other words, the measurement portion 331 of the physical quantity measurement device 300 has a substantially rectangular shape in a front view since a width of a side surface thereof is small. Consequently, the physical quantity measurement device 300 can be provided with the sufficiently long first subsidiary passage 305, and can thus reduce fluid resistance to a small value with respect to the gas 30 to be measured. Thus, the physical quantity measurement device 300 can measure a flow rate of the gas 30 to be measured with high accuracy while reducing fluid resistance to a small value.

2.3 Structure and Effect of Flange 311

A plurality of depressions 313 are provided on a lower surface 312 facing the main passage 124 in the flange 311, and thus reduce a heat transfer surface with the main passage 124, so that the physical quantity measurement device 300 is hardly influenced by heat. In the physical quantity measurement device 300, the measurement portion 331 is inserted into the main passage 124 through an attachment hole provided in the main passage 124, and thus the lower surface 312 of the flange 311 faces the main passage 124. The main passage 124 is, for example, the intake body, and the main passage 124 is often maintained at a high temperature. In contrast, the temperature of the main passage 124 may be considerably low at the time of starting in a cold district. If a high temperature or low temperature state of the main passage 124 influences measurement of various physical quantities, measurement accuracy deteriorates. The flange 311 has the depressions 313 on the lower surface 312, and a space is formed between the lower surface 312 facing the main passage 124, and the main passage 124. Therefore, heat transfer from the main passage 124 to the physical quantity measurement device 300 can be reduced, and thus deterioration in measurement accuracy due to heat can be prevented.

Screw holes 314 of the flange 311 are used to fix the physical quantity measurement device 300 to the main passage 124, and a space is formed between a surface facing the main passage 124 around each of the screw holes 314 and the main passage 124 such that the surface facing the main passage 124 around each of the screw holes 314 is separated from the main passage 124. In the above-described way, a structure is provided in which heat transfer from the main passage 124 to the physical quantity measurement device 300 can be reduced, and thus deterioration in measurement accuracy due to heat can be prevented.

2.4 Structure of External Connection Portion 321

The external connection portion 321 has a connector 322 which is provided on an upper surface of the flange 311, and protrudes toward a downstream side of the flow direction of the gas 30 to be measured from the flange 311. The connector 322 is provided with an insertion hole 322a into which a communication cable for connection to the control device 200 is inserted. As illustrated in FIG. 2-4, four external terminals 323 are provided in the insertion hole 322a. The external terminals 323 are terminals for outputting information regarding a physical quantity which is a measurement result in the physical quantity measurement device 300 and power supply terminals for supplying DC power for operating the physical quantity measurement device 300.

The connector 322 has a shape which protrudes the downstream side in the flow direction of the gas 30 to be measured from the flange 311 and is inserted from the downstream side toward the upstream side in the flow direction, but is not limited to this shape, and may have, for example, a shape which protrudes vertically from the upper surface of the flange 311 and is inserted in an extending direction of the measurement portion 331, and may cover various modifications.

3. Entire Structure and Effects of Housing 302

3.1 Entire Structure of Housing 302

Next, the entire structure of the housing 302 will be described with reference to FIGS. 3-1 to 3-5. FIGS. 3-1 to 3-5 are diagrams illustrating a state of the housing 302 in which the front cover 303 and the rear cover 304 are detached from the physical quantity measurement device 300, in which FIG. 3-1 is a front view of the housing 302, FIG. 3-2 is a rear view of the housing 302, FIG. 3-3 is a right side view of the housing 302, FIG. 3-4 is a left side view of the housing 302, and FIG. 3-5 is a sectional view taken along the line A-A in FIG. 3-1.

The housing 302 has a structure in which the measurement portion 331 extends toward the center of the main passage 124 from the flange 311. The circuit board 400 is formed on a basal end side of the measurement portion 331 through insert molding. The circuit board 400 is disposed in parallel along and to the surfaces of the measurement portion 331 at an intermediate position between the front surface and the rear surface of the measurement portion 331, and is integrally molded into the housing 302, so as to divide the basal end side of the measurement portion 331 into one side and the other side in a thickness direction.

A circuit chamber Rc in which the circuit portion of the circuit board 400 is stored is formed on the front surface side of the measurement portion 331, and the sensor chamber Rs in which a pressure sensor 421 and a humidity sensor 422 are stored is formed on the rear surface side thereof. The circuit chamber Rc is closed by attaching the front cover 303 to the housing 302, and is completely isolated from the outside. On the other hand, the second subsidiary passage 306, and the sensor chamber Rs which is an internal space communicating with the outside of the measurement portion 331 via the second subsidiary passage 306 are formed by attaching the rear cover 304 to the housing 302. A part of the circuit board 400 protrudes (a protrusion part 403) into the first subsidiary passage 305 from a partition wall 335 which partitions the measurement portion 331 into the circuit chamber Rc and the first subsidiary passage 305, and the flow rate measurement portion 602 is provided on a measurement channel surface 430 of the protrusion part.

3.2 Structure of Subsidiary Passage Groove

Subsidiary passage grooves for forming the first subsidiary passage 305 are provided on the distal end side of the measurement portion 331 in a length direction. The subsidiary passage grooves for forming the first subsidiary passage 305 have a front side subsidiary passage groove 332 illustrated in FIG. 3-1 and a rear side subsidiary passage groove 334 illustrated in FIG. 3-2. As illustrated in FIG. 3-1, the front side subsidiary passage groove 332 is gradually curved toward the flange 311 side which is the distal end side of the measurement portion 331 from the first subsidiary passage outlet 305b which is open in the downstream side outer wall 338 of the measurement portion 331 toward the upstream side outer wall 336, and communicates with an opening part 333 which penetrates through the measurement portion 331 in the thickness direction at a position near the upstream side outer wall 336. The opening part 333 is formed along the flow direction of the gas 30 to be measured of the main passage 124 so as to extend from the upstream side outer wall 336 to the downstream side outer wall 338.

As illustrated in FIG. 3-2, the rear side subsidiary passage groove 334 is divided into two ways at an intermediate position between the upstream side outer wall 336 and the downstream side outer wall 338 from the upstream side outer wall 336 toward the downstream side outer wall 338, one way extends linearly as a discharge passage and is open in a discharge port 305c of the downstream side outer wall 338, and the other way is gradually curved to the flange 311 side which is the basal end side of the measurement portion 331 toward the downstream side outer wall 338, and communicates with the opening part 333 at a position near the downstream side outer wall 338.

The rear side subsidiary passage groove 334 forms an inlet groove through which the gas 30 to be measured flows from the main passage 124, and the front side subsidiary passage groove 332 forms an outlet groove through which the gas 30 to be measured incorporated from the rear side subsidiary passage groove 334 is returned to the main passage 124. Since the front side subsidiary passage groove 332 and the rear side subsidiary passage groove 334 are provided at the distal end part of the housing 302, a gas in a portion separated from the inner wall surface of the main passage 124, that is, a gas flowing through a portion close to the central portion of the main passage 124 can be incorporated as the gas 30 to be measured. A gas flowing near the inner wall surface of the main passage 124 tends to have a temperature which is different from an average temperature of gases flowing through the main passage 124, such as the intake air 20, due to the influence of the temperature of the wall surface of the main passage 124. A gas flowing near the inner wall surface of the main passage 124 tends to have a flow velocity lower than an average flow velocity of gases flowing through the main passage 124. The physical quantity measurement device 300 of the Example is hardly influenced thereby, and thus it is possible to prevent deterioration in measurement accuracy.

As illustrated in FIG. 3-2, a part of the gas 30 to be measured flowing through the main passage 124 is incorporated into the rear side subsidiary passage groove 334 from the first subsidiary passage inlet 305a, and flows through the rear side subsidiary passage groove 334. A foreign substance having great mass included in the gas 30 to be measured flows into the discharge passage which extends linearly from the branch, along with the part of the gas to be measured, and is discharged to the main passage 124 from the discharge port 305c of the downstream side outer wall 338.

The rear side subsidiary passage groove 334 has a shape which is gradually deepened, and thus the gas 30 to be measured is gradually moved to the front side of the measurement portion 331 while flowing along the rear side subsidiary passage groove 334. Particularly, the rear side subsidiary passage groove 334 is provided with a steep part 334a which is rapidly deepened in front of the opening part 333, and thus part of air having small mass is moved along the steep part 334a so as to flow through the measurement channel surface 430 side of the circuit board 400 in the opening part 333. On the other hand, a foreign substance having great mass hardly changes its course, and thus flows through a rear surface 431 side of the measurement channel surface.

As illustrated in FIG. 3-1, the gas 30 to be measured moved to the front side in the opening part 333 flows along the measurement channel surface 430 of the circuit board, and is brought into heat transfer with the flow rate measurement portion 602 provided on the measurement channel surface 430, and thus a flow rate is measured. The air which flows into the front side subsidiary passage groove 332 from the opening part 333 flows along the front side subsidiary passage groove 332, and is discharged to the main passage 124 from the first subsidiary passage outlet 305*b* which is open in the downstream side outer wall 338.

A substance having great mass, such as waste matter mixed with the gas 30 to be measured, has large inertial force, and thus hardly rapidly changes its course in a depth direction of the groove along a surface of a portion of the steep part 334*a* in which the depth of the groove steeply increases. Thus, a foreign substance having great mass is moved to the rear surface 431 side of the measurement channel surface, and thus the foreign substance can be prevented from passing the vicinity of the flow rate measurement portion 602. In the present example, most of foreign substances having great mass other than a gas are configured to pass through the rear surface 431 of the measurement channel surface which is a back surface of the measurement channel surface 430, and thus it is possible to reduce the influence of contamination due to a foreign substance such as oil, carbon, or waste matter, and thus to prevent deterioration in measurement accuracy. In other words, the shape is formed such that a course of the gas 30 to be measured rapidly changes along an axis crossing the flow axis of the main passage 124, and thus it is possible to reduce the influence of a foreign substance mixed with the gas 30 to be measured.

3.3 Structures and Effects of Second Subsidiary Passage and Sensor Chamber

The second subsidiary passage 306 is formed linearly from the second subsidiary passage inlet 306*a* to the second subsidiary passage outlet 306*b* in parallel to the flange 311 along the flow direction of the gas 30 to be measured. The second subsidiary passage inlet 306*a* is formed by notching a part of the upstream side outer wall 336, and the second subsidiary passage outlet 306*b* is formed by notching a part of the downstream side outer wall 338. Specifically, as illustrated in FIG. 3-3, the second subsidiary passage inlet and outlet are formed by notching a part of the upstream side outer wall 336 and a part of the downstream side outer wall 338 from the rear surface side of the measurement portion 331 at a position continuing to and along an upper surface of the partition wall 335. The second subsidiary passage inlet 306*a* and the second subsidiary passage outlet 306*b* are notched to a depth position which is coplanar with the rear surface of the circuit board 400. The second subsidiary passage 306 is a pass through which the gas 30 to be measured passes along a rear surface of a board main body 401 of the circuit board 400, and thus functions as a cooling channel for cooling the board main body 401. The circuit board 400 such as an LSI or a microcomputer often holds heat, and such heat can be transferred to the rear surface of the board main body 401 so as to be dissipated by the gas 30 to be measured passing through the second subsidiary passage 306.

The sensor chamber Rs is provided further toward the basal end side of the measurement portion 331 than the second subsidiary passage 306. A part of the gas 30 to be measured which has flowed into the second subsidiary passage 306 from the second subsidiary passage inlet 306*a* flows into the sensor chamber Rs, and thus pressure and relative humidity thereof are respectively measured by the pressure sensor 421 and the humidity sensor 422 in the sensor chamber Rs. The sensor chamber Rs is disposed further toward the basal end side of the measurement portion 331 than the second subsidiary passage 306, and thus it is possible to reduce the influence of dynamic pressure of the gas 30 to be measured passing through the second subsidiary passage 306. Therefore, it is possible to improve measurement accuracy in the pressure sensor 421 in the sensor chamber Rs.

Since the sensor chamber Rs is disposed further toward the basal end side of the measurement portion 331 than the second subsidiary passage 306, for example, in a case where the distal end side of the measurement portion 331 is attached to the intake passage so as to be directed downward, it is possible to prevent contaminants or water drops flowing into the second subsidiary passage 306 along with the gas 30 to be measured from being attached to the pressure sensor 421 or the humidity sensor 422 disposed on the downstream side thereof.

Particularly, in the present example, since, in the sensor chamber Rs, the pressure sensor 421 with a relatively large exterior is disposed on the upstream side, and the humidity sensor 422 with a relatively small exterior is disposed on the downstream side of the pressure sensor 421, contaminants or water drops flowing into the second subsidiary passage along with the gas 30 to be measured from are attached to the pressure sensor 421, and are prevented from being attached to the humidity sensor 422. Therefore, it is possible to protect the humidity sensor 422 with low resistance to contaminants or water drops.

The pressure sensor 421 and the humidity sensor 422 are hardly influenced by a flow of the gas 30 to be measured compared with the flow rate measurement portion 602, and, especially, the humidity sensor 422 has only to secure a diffusion level of moisture in the gas 30 to be measured, and can thus be provided in the sensor chamber Rs adjacent to the linear second subsidiary passage 306. In contrast, regarding the flow rate measurement portion 602, a certain flow velocity or more is required, it is necessary to keep dust and contaminants away, and the influence of pulsation is also required to be taken into consideration. Therefore, the flow rate measurement portion 602 is provided in the first subsidiary passage 305 which has a shape circulating in a loop form.

FIGS. 4-1 and 4-2 are diagram illustrating another form of the second subsidiary passage. In this form, a through-hole 337 is provided in the upstream side outer wall 336 and the downstream side outer wall 338 so as to form the second subsidiary passage inlet 306*a* and the second subsidiary passage outlet 306*b* instead of notching the upstream side outer wall 336 and the downstream side outer wall 338. In a case where the second subsidiary passage inlet 306*a* and the second subsidiary passage outlet 306*b* are respectively formed by notching the upstream side outer wall 336 and the downstream side outer wall 338 as in the second subsidiary passage illustrated in FIGS. 3-2 to 3-5 described above, a width of the upstream side outer wall 336 and a width of the downstream side outer wall 338 at these positions are locally reduced, and thus there is concern that the measurement portion 331 may be distorted in a substantially C shape with the notches as starting points due to thermoforming in molding. According to this form, the through-hole is provided instead of the notches, and thus it is possible to prevent the measurement portion 331 from being bent in a substantially C shape. Therefore, it is possible to prevent measurement accuracy from being influenced by a change in a position or a direction of the measurement portion for the gas 30 to be measured due to distortion of the housing 302, and thus to ensure normally constant measurement accuracy without an individual difference.

FIGS. 8-1, 8-2 and 8-3 are diagrams illustrating still another form of the second subsidiary passage.

A partition wall for partition into the second subsidiary passage 306 and the sensor chamber Rs may be provided on the rear cover 304. According to this configuration, the gas 30 to be measured can be caused to indirectly flow into the sensor chamber Rs from the second subsidiary passage 306, so that the influence of dynamic pressure on the pressure sensor, and thus it is possible to prevent contaminants or water drops being attached to the humidity sensor.

In the example illustrated in FIG. 8-1, two pressure sensors 421A and 421B are provided to be arranged in a line along the second subsidiary passage 306, and a single humidity sensor 422 is provided on the downstream side thereof, in the sensor chamber Rs. Partition walls 352A and 352B are provided on the rear cover 304, and are disposed to extend between the second subsidiary passage 306 and the sensor chamber Rs by attaching the rear cover 304 to the housing 302. Specifically, the partition wall 352A is disposed between the pressure sensor on the upstream side and an upstream wall of the sensor chamber Rs, and the partition wall 352B is disposed along the humidity sensor between the pressure sensor on the downstream side and a downstream wall of the sensor chamber Rs.

In the example illustrated in FIG. 8-2, only the pressure sensor 421B on the downstream side is provided, the pressure sensor 421A on the upstream side is omitted, and thus a partition wall 352C is lengthened. A partition wall 352D on the downstream side is disposed along the humidity sensor between the pressure sensor on the downstream side and a downstream wall of the sensor chamber Rs, in the same manner as the partition wall 352B in FIG. 8-1. Therefore, the partition walls 352A and 352C prevent the gas 30 to be measured from coming into direct contact with the pressure sensor, and can thus reduce the influence of dynamic pressure. The partition walls 352B and 352D can prevent contaminants or water drops from being attached to the humidity sensor.

In the example illustrated in FIG. 8-3, both of the two pressure sensors 421A and 421B are omitted, and only a single humidity sensor 422 is provided in the sensor chamber Rs. A partition wall 352E on the upstream side has a substantially L shape which extends from the upstream wall of the sensor chamber Rs to an upstream position of the humidity sensor between the second subsidiary passage 306 and the sensor chamber Rs, and is bent at a downstream end so as to face the upstream side of the humidity sensor. A partition wall 352F is disposed along the humidity sensor between the pressure sensor on the downstream side and the downstream wall of the sensor chamber Rs in the same manner as the partition walls 352B and 352D. Therefore, the partition wall 352E can prevent contaminants or water drops contained in the gas 30 to be measured passing through the second subsidiary passage 306 being moved to the humidity sensor, and thus to protect the humidity sensor from such contaminants or the like.

3.4 Shapes and Effects of Front Cover 303 and Rear Cover 304

FIG. 5 is a diagram illustrating an exterior of the front cover 303, in which FIG. 5(a) is a front view, and FIG. 5(b) is a sectional view taken along the line B-B in FIG. 5(a). FIG. 6 is a diagram illustrating an exterior of the rear cover 304, in which FIG. 6(a) is a front view, and FIG. 6(b) is a sectional view taken along the line B-B in FIG. 6(a).

In FIGS. 5 and 6, the front cover 303 or the rear cover 304 forms the first subsidiary passage 305 by closing the front side subsidiary passage groove 332 and the rear side subsidiary passage groove 334 of the housing 302. The front cover 303 forms the closed circuit chamber Rc, and the rear cover 304 forms the second subsidiary passage 306 and the sensor chamber Rs communicating with the second subsidiary passage 306 by closing a recessed part of the measurement portion 331 on the rear surface side.

The front cover 303 is provided with a projection part 356 at a position facing the flow rate measurement portion 602, and is used to form a stop with the measurement channel surface 430. Thus, it is desirable that molding accuracy is high. The front cover 303 or the rear cover 304 is formed through a resin mold process in which a thermosetting resin is injected into a metal mold, and can be formed with high molding accuracy.

A plurality of fixation holes 351 into which a plurality of fixation pins 350 protruding from the measurement portion 331 are inserted are provided in the front cover 303 and the rear cover 304. The front cover 303 and the rear cover 304 are respectively attached to the front surface and the rear surface of the measurement portion 331, and, in this case, the fixation pins 350 are inserted into the fixation holes 351 such that positioning is performed. The front cover and the rear cover are bonded to each other through laser welding or the like performed along edges of the front side subsidiary passage groove 332 and the rear side subsidiary passage groove 334, and are similarly bonded to each other through laser welding or the like performed along edges of the circuit chamber Rc and the sensor chamber Rs.

3.5 Fixation Structure of Circuit Board 400 to Housing 302 and Effects

Next, a description will be made of a resin mold process of fixing the circuit board 400 to the housing 302. The circuit board 400 is integrally molded into the housing 302 such that the flow rate measurement portion 602 of the circuit board 400 is disposed at a predetermined location of the subsidiary passage groove forming the subsidiary passage, for example, in the present example, in the opening part 333 which connects the front side subsidiary passage groove 332 to the rear side subsidiary passage groove 334.

Portions which bury and fix an outer peripheral edge of a base portion 402 of the circuit board 400 in and to the housing 302 by using a resin mold are provided on the measurement portion 331 of the housing 302 as fixation portions 372 and 373. The fixation portions 372 and 373 fix the outer peripheral edge of the base portion 402 of the circuit board 400 by interposing the outer peripheral edge therebetween.

The housing 302 is manufactured in the resin mold process. In this resin mold process, the circuit board 400 is embedded in a resin of the housing 302, and is fixed to the inside of the housing 302 with a resin mold. In the above-described way, it is possible to maintain, with considerably high accuracy, a positional relationship or a directional relationship which is a relationship between shapes of subsidiary passages, for example, the front side subsidiary passage groove 332 and the rear side subsidiary passage groove 334 for measuring a flow rate through heat transfer between the flow rate measurement portion 602 and the gas 30 to be measured, and thus to reduce an error or variation occurring in each circuit board 400 to a very small value. As a result, it is possible to considerably improve measurement accuracy in the circuit board 400. For example, it is possible to remarkably improve measurement accuracy compared with a method in which fixation is performed by using an adhesive in the related art.

The physical quantity measurement device 300 tends to be produced through mass production, and thus there is a limit in accurate measurement and improvement of measurement accuracy in the fixation method using an adhesive.

However, as in the present example, since the subsidiary passages are formed and the circuit board 400 is also fixed in the resin mold process of forming subsidiary passages through which the gas 30 to be measured flows, it is possible to considerably reduce a variation in measurement accuracy, and thus to considerably improve measurement accuracy in each physical quantity measurement device 300.

For example, when further described with the Example illustrated in FIGS. 3-1 to 3-5, the circuit board 400 can be fixed to the housing 302 such that a relationship among the front side subsidiary passage groove 332, the rear side subsidiary passage groove 334, and the flow rate measurement portion 602 is a defined relationship. Consequently, in each of the physical quantity measurement devices 300 which are mass-produced, a positional relationship between the flow rate measurement portion 602 of each circuit board 400 and the first subsidiary passage 305 or a relationship between shapes can be normally obtained with considerably high accuracy.

Since the first subsidiary passage 305 to and in which the flow rate measurement portion 602 of the circuit board 400 is fixed and disposed is formed by using, for example, the front side subsidiary passage groove 332 and the rear side subsidiary passage groove 334 with considerably high accuracy, work of forming the first subsidiary passage 305 by using the subsidiary passage grooves 332 and 334 is work of covering both sides of the housing 302 with the front cover 303 and the rear cover 304. This work is very simple, and is thus a work process in which there are few factors to reduce measurement accuracy. The front cover 303 and the rear cover 304 are produced in the resin mold process in which molding accuracy is high. Therefore, the subsidiary passages provided to have a defined relationship with the flow rate measurement portion 602 of the circuit board 400 can be formed with high accuracy. According to this method, it is possible to achieve high productivity in addition to improvement of measurement accuracy.

In contrast, in the related art, a subsidiary passage is manufactured, and then a measurement portion is adhered to the subsidiary passage via an adhesive, so that a thermal flowmeter is produced. In a method using an adhesive as mentioned above, a variation in a thickness of an adhesive is great, and an adhesion position or an adhesion angle varies in each product. Thus, there is a limit in increasing measurement accuracy. In a case where such work is performed in a mass production process, it is considerably hard to improve measurement accuracy.

In the Example of the present invention, the circuit board 400 is fixed via a resin mold, and the subsidiary passage grooves for forming the first subsidiary passage 305 are formed by using the resin mold. In the above-described way, it is possible to form shapes of the subsidiary passage grooves and fix the flow rate measurement portion 602 to the subsidiary passage grooves with considerably high accuracy.

A portion related to measurement of a flow rate, for example, the flow rate measurement portion 602 or the measurement channel surface 430 to which the flow rate measurement portion 602 is attached is provided on the front surface of the circuit board 400. The flow rate measurement portion 602 and the measurement channel surface 430 are exposed from the resin molding the housing 302. In other words, the flow rate measurement portion 602 and the measurement channel surface 430 are not covered with the resin molding the housing 302. The flow rate measurement portion 602 or the measurement channel surface 430 of the circuit board 400 is used without being changed after resin molding of the housing 302, and is used to measure a flow rate in the physical quantity measurement device 300. Measurement accuracy is improved in the above-described way.

In the Example of the present invention, since the circuit board 400 is integrally molded into the housing 302, and thus the circuit board 400 is fixed to the housing 302 having the first subsidiary passage 305, the circuit board 400 can be reliably fixed to the housing 302. Particularly, since the protrusion part 403 of the circuit board 400 is configured to protrude to the first subsidiary passage 305 through the partition wall 335, sealing between the first subsidiary passage 305 and the circuit chamber Rc is high, the gas 30 to be measured can be prevented from leaking into the circuit chamber Rc out of the first subsidiary passage 305, and thus it is possible to prevent circuit components or wirings of the circuit board 400 from being corroded due to contact with the gas 30 to be measured.

3.6 Structure and Effect of Terminal Connection Portion 320

Next, a description will be made of a structure of a terminal connection portion with reference to FIGS. 10-1 to 10-4. FIG. 10-1 is a diagram for explaining a structure of the terminal connection portion, FIG. 10-2 is a diagram for explaining a structure of the terminal connection portion, FIG. 10-3 is a sectional view taken along the line F-F in FIG. 10-1, and FIG. 10-4 is a sectional view taken along the line G-G in FIG. 10-2.

The terminal connection portion 320 has a configuration in which inner end parts 361 of the external terminals 323 are connected to connection terminals 412 of the circuit board 400 via gold wires 413. As illustrated in FIG. 10-1, the inner end parts 361 of the respective external terminals 323 protrude into the circuit chamber Rc from the flange 311 side, and are disposed to be arranged with a predetermined gap in accordance with positions of the connection terminals 412 of the circuit board 400.

The inner end parts 361 are disposed at positions which are substantially coplanar with the front surface of the circuit board 400 as illustrated in FIG. 10-3. A front end thereof is bent in a substantially L shape from the front surface of the measurement portion 331 toward the rear surface thereof, and protrudes to the rear surface of the measurement portion 331. As illustrated in FIG. 10-4(*a*), the front ends of the inner end parts 361 are connected to a connection part 365, and, as illustrated in FIG. 10-4(*b*), the connection part 365 is cut off after molding, and thus the front ends are divided into individual parts.

Each inner end part 361 is fixed to the housing 302 via a resin mold such that the inner end parts 361 and the circuit board 400 are coplanar with each other in a mold process. The respective inner end parts 361 are fixed to the housing 302 in the resin mold process in a state of being integrally connected to each other via the connection part 365 in order to prevent deformation or deviation in arrangement. The inner end parts are fixed to the housing 302, and then the connection part 365 is cut off.

The inner end part 361 is resin-molded in a state of being interposed between the front surface side and the rear surface side of the measurement portion 331, and, at this time, a metal mold is brought into contact with the entire front surface of the inner end part 361, and a fixation pin is brought into contact with a rear surface of the inner end part 361. Therefore, the front surface of the inner end part 361 to which a gold wire is welded can be completely exposed without being covered with the mold resin, and thus the gold wire can be easily welded. A pin hole 340 which is a trace of pressing the inner end part 361 with the fixation pin is formed in the measurement portion 331.

The front end of the inner end part 361 protrudes into a recessed part 341 formed on the rear surface of the measurement portion 331. The recessed part 341 is covered with the rear cover 304, and the periphery of the recessed part 341 is continuously bonded to the rear cover 304 through laser welding or the like so as to form a closed inner space. Therefore, the inner end part 361 can be prevented from being corroded due to contact with the gas 30 to be measured.

4. Exterior of Circuit Board 400

4.1 Molding of Measurement Channel Surface 430 with Flow Rate Measurement Portion 602

FIGS. 7-1 to 7-6 illustrate an exterior of the circuit board 400. Diagonal line portions drawn on the exterior of the circuit board 400 indicate a fixation surface 432 and a fixation surface 434 which are fixed in a state in which the circuit board 400 is covered with a resin during molding of the housing 302 in the resin mold process.

FIG. 7-1 is a front view of the circuit board, FIG. 7-2 is a right side view of the circuit board, FIG. 7-3 is a rear view of the circuit board, FIG. 7-4 is a left side view of the circuit board, FIG. 7-5 is a sectional view taken along the line B-B, indicating a section of an LSI portion in FIG. 7-1, and FIG. 7-6 is a sectional view taken along the line C-C of a measurement portion in FIG. 7-1.

The circuit board 400 has the board main body 401, the circuit portion and the flow rate measurement portion 602 which is a sensing element are provided on the front surface of the board main body 401, and the pressure sensor 421 and the humidity sensor 422 which are sensing elements are provided on the rear surface of the board main body 401. The board main body 401 is made of a glass epoxy resin material, and has a value which is the same as or similar to a thermal expansion coefficient of a thermosetting resin molding the housing 302. Therefore, it is possible to reduce stress due to a difference between thermal expansion coefficients when the housing 302 is brought into insert molding, and thus to reduce distortion of the circuit board 400.

The board main body 401 has a plate shape with a predetermined thickness, includes the substantially square-shaped base portion 402, and the substantially square-shaped protrusion part 403 which protrudes from one side of the base portion 402 and is smaller than the base portion 402, and thus has a substantially T shape in a plan view. The circuit portion is provided on the front surface of the base portion 402. The circuit portion is formed of electronic components including an LSI 414, a microcomputer 415, a power source regulator 416, chip components 417 such as a resistor or a capacitor mounted on circuit wirings (not illustrated). The power source regulator 416 generates a relatively large amount of heat compared with other electrical connections such as the microcomputer 415 or the LSI 414, and is thus disposed on the relatively upstream side in the circuit chamber Rc. The LSI 414 is entirely sealed with a synthetic resin material 419 so as to include a gold wire 411, and thus improves handling property of the circuit board 400 during insert molding.

As illustrated in FIG. 7-5, a recessed part 402a into which the LSI 414 is fitted is provided to be recessed on the front surface of the board main body 401. The recessed part 402a may be formed by performing laser processing on the board main body 401. The board main body 401 made of the glass epoxy resin can be easily processed such that the recessed part 402a can be easily provided, compared with a board main body made of ceramics. The recessed part 402a has a depth in which a front surface of the LSI 414 is coplanar with the front surface of the board main body 401. As mentioned above, since the front surface of the LSI 414 matches the front surface of the board main body 401 in heights, wire bonding of connecting the LSI 414 to the board main body 401 via the gold wire 411 is facilitated, and thus it becomes easier to manufacture the circuit board 400. The LSI 414 may be directly provided on the front surface of the board main body 401 as illustrated in FIG. 7-6. In a case of such a structure, a synthetic resin material 419 coating the LSI 414 further protrudes, but processing for forming the recessed part 402a in the board main body 401 is not necessary, and thus manufacturing can be simplified.

The protrusion part 403 is disposed in the first subsidiary passage 305 when the circuit board 400 is inserted and molded into the housing 302, and the measurement channel surface 430 which is a front surface of the protrusion part 403 extends along the flow direction of the gas 30 to be measured. The flow rate measurement portion 602 is provided on the measurement channel surface 430 of the protrusion part 403. The flow rate measurement portion 602 performs heat transfer with the gas 30 to be measured so as to measure a state of the gas 30 to be measured, for example, a flow velocity of the gas 30 to be measured, and outputs an electric signal indicating a flow rate thereof flowing through the main passage 124. In order for the flow rate measurement portion 602 to measure a state of the gas 30 to be measured with high accuracy, it is desirable that a gas flowing in the vicinity of the measurement channel surface 430 is a laminar flow, and disturbance is small. Thus, it is desirable that the front surface of the flow rate measurement portion 602 is coplanar with the measurement channel surface 430, or a difference therebetween is equal to or less than a predetermined value.

A recessed part 403a is provided to be recessed on the front surface of the measurement channel surface 430, and the flow rate measurement portion 602 is fitted thereinto. The recessed part 403a may also be formed by performing laser processing. The recessed part 403a has a depth in which a front surface of the flow rate measurement portion 602 is coplanar with the front surface of the measurement channel surface 430. The flow rate measurement portion 602 and a wiring portion thereof are coated with a synthetic resin material 418, and thus the occurrence of electro-corrosion due to attachment of salt water is prevented.

Two pressure sensors 421A and 421B and a single humidity sensor 422 are provided on the rear surface of the board main body 401. The two pressure sensors 421A and 421B are respectively disposed in a line on the upstream side and the downstream side. The humidity sensor 422 is disposed on the downstream side of the pressure sensor 421B. The two pressure sensors 421A and 421B and the single humidity sensor 422 are disposed in the sensor chamber Rs. In the example illustrated in FIG. 7-3, a description has been made of a case where the two pressure sensors 421A and 421B and the single humidity sensor 422 are provided, but, as illustrated in FIG. 8-2(a), only the pressure sensor 421B and the humidity sensor 422 may be provided, and, as illustrated in FIG. 8-3(a), only the humidity sensor 422 may be provided.

In the circuit board 400, the second subsidiary passage 306 is disposed on the rear surface side of the board main body 401. Therefore, the entire board main body 401 can be cooled by the gas 30 to be measured passing through the second subsidiary passage 306.

4.2 Structure of Temperature Measurement Portion 451

A temperature measurement portion 451 is provided at an end side of the base portion 402 on the upstream side and a corner thereof on the protrusion part 403 side. The temperature measurement portion 451 forms one of measurement portions for measuring a physical quantity of the gas 30 to be measured flowing through the main passage 124, and is provided on the circuit board 400. The circuit board 400 has a protrusion part 450 which protrudes toward the upstream of the gas 30 to be measured from the second subsidiary passage inlet 306a of the second subsidiary passage 306, and the temperature measurement portion 451 includes a chip type temperature sensor 453 provided on the rear surface of the circuit board 400 in the protrusion part 450. The temperature sensor 453 and a wiring portion thereof are coated with a synthetic resin material, and thus the occurrence of electro-corrosion due to attachment of salt water is prevented.

For example, as illustrated in FIG. 3-2, the upstream side outer wall 336 in the measurement portion 331 forming the housing 302 is depressed toward the downstream side at the central part of the measurement portion 331 in which the second subsidiary passage inlet 306a is provided, and the protrusion part 450 of the circuit board 400 protrudes toward the upstream side from the depressed upstream side outer wall 336. A distal end of the protrusion part 450 is disposed at a position recessed more than the surface of the upstream side outer wall 336 on the most upstream side. The temperature measurement portion 451 is provided in the protrusion part 450 so as to face the rear surface of the circuit board 400, that is, the second subsidiary passage 306 side.

Since the second subsidiary passage inlet 306a is formed on the downstream side of the temperature measurement portion 451, the gas 30 to be measured flowing into the second subsidiary passage 306 from the second subsidiary passage inlet 306a comes into contact with the temperature measurement portion 451, and then flows into the second subsidiary passage inlet 306a, and thus the temperature thereof is measured when the gas to be measured comes into contact with the temperature measurement portion 451. The gas 30 to be measured having come into contact with the temperature measurement portion 451 flows into the second subsidiary passage 306 from the second subsidiary passage inlet 306a in this state, passes through the second subsidiary passage 306, and is discharged to the main passage 123 from the second subsidiary passage outlet 306b.

4.3 Fixation of Circuit Board 400 in Resin Mold Process and Effect Thereof

A diagonal line portion in FIG. 9-1 indicates the fixation surface 432 and the fixation surface 434 for covering the circuit board 400 with a thermosetting resin used in the resin mold process in order to fix the circuit board 400 to the housing 302. It is important that high accuracy is maintained such that a relationship between the measurement channel surface 430 and the flow rate measurement portion 602 provided on the measurement channel surface 430 and shapes of the subsidiary passages is a defined relationship.

Since, in the resin mold process, the subsidiary passages are molded, and the circuit board 400 is also fixed to the housing 302 molding the subsidiary passages, a relationship between the subsidiary passages, and the measurement channel surface 430 and the flow rate measurement portion 602 can be maintained with considerably high accuracy. In other words, since the circuit board 400 is fixed to the housing 302 in the resin mold process, the circuit board 400 can be positioned in and fixed to a metal mold for molding the housing 302 having the subsidiary passages with high accuracy. A thermosetting resin with a high temperature is injected into the metal mold, and thus the subsidiary passages are molded with high accuracy, and the circuit board 400 is also fixed with high accuracy. Therefore, an error or a variation occurring in each circuit board 400 can be reduced to a very small value. As a result, it is possible to considerably improve measurement accuracy in the circuit board 400.

In the present example, the outer periphery of the base portion 402 of the board main body 401 is covered with fixation portions 372 and 373 of a mold resin molding the housing 302, which are used as the fixation surfaces 432 and 434. In the Example illustrated in FIG. 9-1, as fixation means for stronger fixation, through-holes 404 is provided in the board main body 401 of the circuit board 400, the through-holes 404 are buried in a mold resin, and thus fixation force of the board main body 401 is increased. The through-holes 404 are provided in a location fixed by the partition wall 335, and a front side and a rear side of the partition wall 335 are connected to each other via the through-holes 404.

The through-holes 404 are preferably provided in a location corresponding to the partition wall 335. Since the mold resin is a thermosetting resin, and the board main body 401 is made of glass epoxy, mutual chemical bonding action is low, and adhesion hardly occurs. The partition wall 335 has a length larger than a width, and is configured to easily spread in a direction of becoming distant from the board main body 401. Therefore, the through-holes 404 are provided in a location corresponding to the partition wall 335, and thus the partition walls 335 with the board main body 401 interposed therebetween can be physically coupled to each other via the through-holes 404. Therefore, the circuit board 400 can be more strongly fixed to the housing 302, and thus it is possible to prevent a gap from being formed between the partition wall and the protrusion part 403. Therefore, the gas 30 to be measured can be prevented from permeating into the circuit chamber Rc through a gap between the partition wall 335 and the protrusion part 403, and thus the circuit chamber Rc can be completely sealed.

In the Example illustrated in FIG. 9-2, in addition to the through-holes 404, round hole-shaped through-holes 405 are provided in the end side on the upstream side and the downstream side of the base portion 402, and the through-holes 405 are buried in a mold resin, and thus fixation force of the board main body 401 is further increased. The end side on the upstream side and the end side on the downstream side of the base portion 402 are interposed between the fixation portions 372 and 373 from both sides in the thickness direction, and the front side and the rear side thereof are connected to each other via the through-holes 405. Therefore, the circuit board 400 can be more strongly fixed to the housing 302.

The through-holes 404 are preferably provided in the partition wall 335, but, in a case where the partition wall 335 is fixed to the board main body 401 with predetermined fixation force, the through-holes 404 may be omitted. In the Example illustrated in FIG. 9-3, the through-holes 404 are omitted, and the through-holes 405 are provided in the end side on the upstream side and the end side on the downstream side of the base portion 402. According to this configuration, the board main body 401 of the circuit board 400 can also be strongly fixed to the housing 302.

The through-hole is not limited to a round hole shape, and, for example, as illustrated in FIG. 9-4, may be a long hole-shaped through-hole 406. In the present example, the long hole-shaped through-holes 406 are provided to extend along the end side on the upstream side and the end side on the downstream side of the base portion 402. The through-hole 406 increases an amount of resins connecting the front side and the rear side of the measurement portion 331, and thus higher fixation force can be obtained, compared with a round hole-shaped through-hole.

In the above-described respective Examples, the through-holes 404, 405 and 406 have been described as an example of fixation means, but a through-hole is only an example. For example, in the Example illustrated in FIG. 9-5, large notch portions 407 which extend in a length direction thereof are provided in the end side on the upstream side and the end side on the downstream side of the base portion 402. In the Example illustrated in FIG. 9-6, notch portions 408 are provided between the base portion 402 and the protrusion part 403. In the Example illustrated in FIG. 9-7, a plurality of notch portions 409 are provided to be arranged with predetermined intervals in the end side on the upstream side and the end side on the downstream side of the base portion 402. In the Example illustrated in FIG. 9-8, a pair of notch portions 410 are provided to be notched toward the base portion 402 from both sides of the protrusion part 403. According to this configuration, the board main body 401 of the circuit board 400 can also be strongly fixed to the housing 302.

4.4 Convex Projection Provided on Circuit Board and Effect Thereof

FIG. 12-1(*a*) is a front view (front surface) of the circuit board, FIG. 12-1 (*b*) is an enlarged view of an A portion in FIG. 12-1(*a*), and FIG. 12-1(*c*) is a sectional view taken along the line B-B in FIG. 12-1(*b*). FIG. 12-2(*a*) is a rear view (rear surface) of the circuit board, FIG. 12-2(*b*) is an enlarged view of a C portion in FIG. 12-2(*a*), and FIG. 12-2(*c*) is a sectional view taken along the line D-D in FIG. 12-2(*b*).

In the present invention, the board main body 401 of the circuit board 400 has been description, and thus only a target portion of the present invention will be described in the following description. In the circuit board 400, the recessed part 403*a* is formed in a part of the measurement channel surface 430 of the protrusion part 403 protruding into the subsidiary passage which is a measurement space in the board main body 401. The flow rate measurement portion (physical quantity measurement portion) 602 measuring a flow rate of a fluid (that is, a gas to be measured) which is a physical quantity is mounted on the recessed part 403*a*. A through-hole 462 reaching the rear surface 431 of the measurement channel surface from the recessed part 403*a* formed on the measurement channel surface 430 side is disposed in the circuit board 400. The through-hole 462 is provided for ventilation between a diaphragm space formed by the flow rate measurement portion 602 stored in the recessed part 403*a* and outside air, and penetrates through the circuit board 400. The sealed diaphragm space is formed between a diaphragm of the flow rate measurement portion 602 and the recessed part 403*a*, and the through-hole 462 communicates with the diaphragm space.

A convex projection 460 is formed on at least one of the measurement channel surface 430 and the rear surface 431 of the measurement channel surface of the protrusion part 403. As illustrated in FIG. 12-1(*c*), the entire front surface and rear surface of the circuit board 400 are coated with a resist coat 461.

FIG. 12-1(*c*) illustrates a structure in which a plurality of projecting parts 460*a* are provided as the convex projection 460 on both of the measurement channel surface 430 and the rear surface 431 of the measurement channel surface of the circuit board 400, and FIG. 12-2(*c*) illustrates a structure in which a plurality of projecting parts 460*a* are provided on only the rear surface 431 of the measurement channel surface side. The plurality of projecting parts 460*a* are provided around the flow rate measurement portion 602 on the measurement channel surface 430, and are provided around the through-hole 462 on the rear surface 431 of the measurement channel surface.

In the present invention, hereinafter, regarding a description of implementation in a circuit board, an embodiment will be described by using a printed board as a model, but an effect is also the same for a ceramic board or a multilayer board (LTCC, HTCC) laminated with glass/ceramic, which are regarded as a circuit board in the present invention.

In a case where the circuit board 400 is a printed board, the convex projection 460 presented in the present invention can be easily formed by using a pattern forming technique. The printed board is laminated with a core material and a prepreg, and circuit wiring patterns are formed even in an interlayer and on front and rear surfaces. Wirings in respective layers are electrically connected to each other via plated through-holes, so as to form a circuit network. Regarding patterns using copper on respective interlayers and the front and rear surfaces, copper foils are etched to form circuit patterns, copper foils as wiring patterns are laminated in the respective interlayers, and are disposed on the front and rear surfaces so as to be brought into hot press, and a resin is cured and stabilized. Thereafter, a resist coat is formed on the front and rear surfaces, and is cured, and thus a printed board is formed.

In the printed board, as described above, patterns using copper foils formed on a prepreg surface are formed through etching processing (chemical treatment), there is no limit in a shape of a protection mask of when a circuit board is etched, and thus most of shapes such as thin lines and geometrical land shapes can be realized through etching. Therefore the printed board is used as a board of many electronic circuits. In the present invention, the convex projections 460 are disposed on the measurement channel surface 430 and the rear surface 431 of the measurement channel surface of the protrusion part 403 of the circuit board 400, but, in a case where the circuit board 400 is formed of a printed board, the convex projection 460 can be formed in an etching process of when the printed board is formed, and the convex projection 460 can be formed simultaneously with execution of etching processing for forming a circuit wiring pattern of a product circuit. Therefore, a general technique of the related art can be used, and thus the convex projection 460 can be formed without increasing the number of processes and cost.

Regarding an effect expected in the present invention, if water drops flowing into the subsidiary passage from the main passage 124 are attached to the protrusion part 403 of the circuit board 400, and are attached to the flow rate measurement portion 602 mounted on the recessed part 403*a* of the measurement channel surface 430, there is concern that the diaphragm is heated and is damaged until the attached water drops are boiled, and thus detaching the water drops attached to the measurement channel surface 430 early from the circuit board 400 is essential in improvement of reliability of the physical quantity measurement device 300.

One end of the through-hole 462 is open in the rear surface 431 of the measurement channel surface of the circuit board 400. The through-hole 462 communicates with the diaphragm space between the diaphragm of the flow rate measurement portion 602 mounted on the recessed part 403*a* of the circuit board 400 and the recessed part 403*a*, and penetrates to the rear surface 431 of the measurement channel surface of the circuit board 400 from the recessed part 403*a*.

As mentioned above, in a structure in which the diaphragm space inside the flow rate measurement portion 602 is directly ventilated through the through-hole 462, there is concern that a water drop permeates into the through-hole 462, and reaches the diaphragm space inside the flow rate measurement portion 602. If the diaphragm is filled with water drops, the diaphragm is heated until the attached water drops are boiled, and thus there is concern that the diaphragm is damaged. In a case where water drops fill the diaphragm space and are frozen in this state, stress is applied to the diaphragm and the flow rate measurement portion 602 due to volume expansion, and thus there is a probability that the diaphragm and the flow rate measurement portion may be damaged. Therefore, it is an important quality issue to realize a structure of preventing water drops from entering the through-hole 462 by repelling and removing water drops attached to the protrusion part 403 of the circuit board 400 early.

In a printed board as the circuit board 400 of the present invention, a solder resist coat 461 is formed on a front surface and a rear surface thereof. The resist coat 461 is generally formed by using an epoxy-based resin, the material is an organic compound having weak water repellency, and a contact angle with water is about 80 degrees. However, in order to repel and remove a water drop through water repelling, a super-water repellent surface state in which a contact angle with water exceeds 100 degrees is necessary. Such a super-water repellent state is a physical property value which is difficult to realize unless a fluorine-based resin or a silicone-based resin is used. The object of the present invention may be achieved by applying a coat using the above-described super-water repellent material on a surface of a circuit board, but very expensive materials, cumbersome coating, and a drying process are required, and thus cost is increased. Therefore, such coping is not appropriate for a general purpose product.

According to the present invention, the convex projection 460 formed on the circuit board 400 by using a pattern forming technique of a printed board copes such that characteristics of surface tension which is a feature of a water drop can be used. When a water drop is in a steady state, force is applied thereto such that the water drop tends to have a spherical shape, which becomes the most stable energy state as a state due to the surface tension. In this case, if the surface of the circuit board 400 to which the water drop is attached is uneven instead of being flat, the water drop cannot stay in a constant location. Therefore, the water drop is moved, and thus the water drop is repelled from the circuit board 400 due to kinetic energy. Therefore, the surface of the circuit board 400 preferably has a fine surface state in order to repel a water drop.

The convex projection 460 formed on the surface of the printed board may be formed by etching copper foils. A shape which can be formed is the convex projection 460 from the surface of the printed board. A sectional shape of the convex projection 460 is a trapezoidal sectional shape in which a dimension of a lower bottom is larger than a dimension of an upper bottom. A planar shape may be a circular shape. This is because a circular shape requires the minimum surface area in forming a sphere due to the surface tension of water, and an effect of more easily forming a water drop as a sphere is high.

As illustrated in FIG. 12-1 (c), the convex projection 460 may be formed both of the measurement channel surface 430 and the rear surface 431 of the measurement channel surface of the protrusion part 403 of the circuit board 400, and may be formed on only the rear surface 431 of the measurement channel surface in which one end of the through-hole 462 is open and is exposed, as illustrated in FIG. 12-2 (c). In the Example, the plurality of projecting parts 460a forming the convex projection 460 are provided to be spread over the entire surfaces of the measurement channel surface 430 and the rear surface 431 of the measurement channel surface. The projecting part 460a has a substantially circular shape in a plan view, and has a trapezoidal sectional shape in which a dimension of a lower bottom is larger than a dimension of an upper bottom. The plurality of projecting parts 460a are individually formed electrically separately from circuit wirings at a part of the circuit board 400.

FIG. 12-3(a) is a diagram illustrating the rear surface 431 of the measurement channel surface of the protrusion part 403, and FIG. 12-3(b) is an enlarged view of an E portion in FIG. 12-3(a). The convex projection 460 is provided on the rear surface 431 of the measurement channel surface, and the plurality of projecting parts 460a of the convex projection 460 are disposed in a grid form centering on the through-hole 462 so as to surround the periphery of the through-hole 462.

FIGS. 12-4(a), 12-4(b) and 12-4(c) are diagrams illustrating that arrangement of the convex projections 460 formed on the rear surface 431 of the measurement channel surface is defined. In the configuration example illustrated in FIG. 12-4(a), the convex projections 460 are disposed in a zigzag form centering on the through-hole 462. In the configuration example illustrated in FIG. 12-4(b), the plurality of projecting parts 460a of the convex projection 460 are disposed in a square form centering on the through-hole 462 while intersecting each other in series. In the configuration example illustrated in FIG. 12-4(c), the plurality of projecting parts 460a of the convex projection 460 are disposed radially centering on the through-hole 462.

FIGS. 12-5(a) and 12-5(b) are front views illustrating that arrangement of the convex projections 460 formed on the rear surface 431 of the measurement channel surface is defined. In the configuration example illustrated in FIG. 12-5(a), the convex projection 460 has a plurality of projecting parts 460b each of which has an elliptical shape as a planar shape. The plurality of projecting parts 460b are disposed such that a major axis of the elliptical shape is directed along the flow direction (FLOW) of a fluid. The projecting parts are disposed in a zigzag form centering on the through-hole 462 so as to be alternately located.

The elliptical shape of the projecting part 460b is effective in a case where a water drop horizontally scatters toward the projecting part 460b along the flow direction. In this case, the water drop comes into contact with a long side (large arc portion) of the projecting part 430b, and the water drop can be subdivided into an upper drop and a lower drop with this location as a starting point, and can be repelled and fly backward.

In the configuration example illustrated in FIG. 12-5 (b), the convex projection 460 has rectangular projecting parts 460c each of which has a rectangular shape as a planar shape. Each of the plurality of projecting parts 460c is disposed such that one side on the flow direction upstream side is orthogonal to the flow direction of a fluid. The projecting parts are disposed in a zigzag form centering on the through-hole 462 so as to be alternately located. A water drop contained in a fluid collides with one side of the projecting part 460c, and the water drop is subdivided into drops with this location as a starting point, and is repelled and fly backward. Therefore, it is possible to repel and remove a water drop attached to the circuit board 400 from the circuit board 400, and thus to prevent a water drop from entering the through-hole 462.

A recommended dimension of the convex projection 460 formed on the circuit board 400 based on specific verification will be presented. For example, as illustrated in FIG. 12-6, in a case where an inner diameter of the through-hole 462 is indicated by φd, a dimension of a convex projection upper bottom is indicated by L1, a dimension of a convex projection lower bottom is indicated by L2, and a dimension of a space between the convex projection lower bottom and an adjacent lower bottom is indicated by L3, dimensions are selected to satisfy a relationship of φd≥L2≥L3 (here, L1<L2), and thus a combination is obtained such that a water drop hardly enters the through-hole 462 which is open in the rear surface 431 of the measurement channel surface.

For example, in a case where the inner diameter φd of the through-hole 462 is φ0.1 to φ0.5, the lower bottom L2 of the convex projection 460 is 75 μm to 200 μm, and the space L3 between the lower bottom of the convex projection 460 and an adjacent lower bottom is 80 to 150 μm, a combination in which a water drop does not enter the through-hole 462 is obtained.

As an actual verification result, a combination of φd=φ0.3, L2=100 μm, and L3=75 μm has a relationship achieving an effect in which a water drop is repelled and flies most. The above-described dimension relationship is an example based on verification, and all dimensions and positional relationships are not defined in this relational expression.

FIG. 13-1(a) is a front view of the rear surface 431 of the measurement channel surface of the protrusion part 403, and FIG. 13-1(b) is an enlarged view of an F portion in FIG. 13-1(a). In the present example, a feature is that the convex projection 460 is disposed on the front side which is a flow direction upstream side of a fluid as a front obstacle of the through-hole 462, and thus a water drop does not enter the through-hole 462. In a structural system in a case where a flow of a fluid with a physical quantity to be measured from the main passage 124 to the circuit board 400 is constant with respect to the flow rate measurement portion 602 mounted on the protrusion part 403 of the circuit board 400 disposed in the main passage 124, the convex projection 460 is provided as a front obstacle in front of the through-hole 462 with respect to an inflow direction of a flow rate of the through-hole 462 provided in the rear surface 431 of the measurement channel surface of the circuit board 400. In other words, the convex projection 460 is disposed as a front obstacle in front of the through-hole 462. A water drop which flows in from the main passage 124 collides with the convex projection 430 disposed in front of the through-hole 462, so that the water drop is subdivided, and thus it is possible that the water drop does not come into direct contact with the through-hole 462.

In a case where the circuit board 400 is a printed board, the convex projection 460 can be easily formed through a copper etching process of forming a circuit wiring pattern formed on the printed board presented in FIGS. 12-1 to 12-6. For example, a size of the projecting part forming the convex projection 430 is made larger than an inner diameter of the through-hole 462, and thus it is possible to promote a water drop scattering effect using a front obstacle. The convex projection 460 is formed of the projecting part 460a of which a planar shape is a circular shape, and is formed in a diameter larger than that of the through-hole 462 as illustrated in FIG. 13-1(b).

FIGS. 13-2(a) and 13-2(b) illustrate other embodiments of the convex projection 460 used as the front obstacle presented in FIG. 13-1.

In a configuration illustrated in FIG. 13-2(a), the convex projection 460 has a projecting part 460c disposed in front of the through-hole 462. The projecting part 460c fundamentally has a rectangular shape along the flow direction, and is disposed such that a long side thereof is along the inflow direction of a fluid, and a short side thereof is along a direction which is orthogonal to the inflow direction of the fluid. A length of the short side of the projecting part 460c is larger than a dimension of the through-hole 462, and thus the through-hole 462 is hidden on the rear side of the projecting part. The projecting part 460c serves as a front obstacle of the through-hole 462, and can thus prevent a water drop flowing in along with a fluid from coming into direct contact with the through-hole 462. There is no difference in an effect even if a collision surface of the projecting part 460c disposed on the inflow direction upstream side of a fluid may be chamfered or formed in an R shape.

In a structure illustrated in FIG. 13-2(b), a projecting part 460d of which a planar shape is a tuning fork shape is provided in front of the through-hole 462 as the convex projection 460. The projecting part 460d has a shape which extends along the flow direction of a fluid, and branches into two ways in the middle position. The through-hole 462 is disposed inside of the branches of the projecting part 460d. The projecting part 460d has a tuning fork shape which branches into two ways from a single way in the inflow direction of a fluid, and can thus cause a water drop to flow to the downstream side by avoiding the through-hole 462 without the water drop being directly attached thereto even if the water drop flows in.

FIGS. 14-1(a) and 14-1(b) illustrate embodiments other than the convex projection 460 presented in FIGS. 12 and 13. In FIG. 14-1(a), in a structural system in a case where a flow of a fluid with a physical quantity to be measured from the main passage 124 to the circuit board 400 is constant with respect to the flow rate measurement portion 602 mounted on the protrusion part 403 of the circuit board 400 disposed in the main passage 124, the projecting part 460a and slits 460e are provided as the convex projection 460 with respect to the inflow direction of a flow rate of the through-hole 462 provided in the rear surface 431 of the measurement channel surface of the circuit board 400. The projecting part 460a is larger than the through-hole 462, and is disposed as a front obstacle in front of the through-hole 462. The slit 460e is disposed to be an elongated slit-shaped convex projection in a state of being along the inflow direction of a fluid at a position of being separated from the distal end side and the basal end side of the protrusion part 403 with respect to the through-hole 462.

The projecting part 460a has a shape larger than the through-hole 462, and is disposed in front of the through-hole 462. A plurality of slits 460e are respectively disposed on the distal end side and the basal end side of the protrusion part 403 with respect to the through-hole 462, and are disposed along the flow direction of a fluid. Therefore, even if water drops scatter from the inflow direction, most of the water drops are subdivided at the projecting part 460a serving as a front obstacle, and water drops riding the slits 460e are slid and moved to the downstream position of the through-hole 462 without being changed. Therefore, it is possible that the through-hole 462 does not come into direct contact with a water drop.

FIG. 14-1(b) illustrates another Example of the Example of the invention presented in FIG. 14-1(a). The central axis of the projecting part 460a as a front obstacle is disposed at a deviated position relative to the through-hole 462 which is open in the rear surface 431 of the measurement channel surface of the circuit board 400. There is a structure in which central line of the through-hole 462 is located at a position lower than the central axis of the projecting part 460*a*, and slits 460*e* which are elongated slit-shaped projections are disposed in a state of being inclined obliquely downward with respect to the inflow direction of a fluid on upper and lower sides of the through-hole 462. According to this structure, it is possible to prevent a water drop from coming into direct contact with the through-hole 462.

FIGS. 14-2 (*a*) and 14-2 (*b*) illustrate other embodiments of the convex projection 462 and the front obstacle 463 presented in FIGS. 12 and 13. In a structure illustrated in FIG. 14-2(*a*), the convex projection 460 has a structure of being disposed in the entire outer circumference of the through-hole 462. In other words, the convex projection 460 has a ring-shaped projecting part 460*f* which is circumferentially continued so as to surround the circumference of an opening of the through-hole 462 which is open in the rear surface 431 of the measurement channel surface. Therefore, in a structural system in which a fluid with a physical quantity to be measured flows into the subsidiary passage from the main passage 124, and flows through the subsidiary passage along the circuit board 400, even if a water drop flows in, the water drop can be caused to come into contact with the projecting part 460*f* earlier than the through-hole 462. Therefore, it is possible to prevent a water drop from coming into direct contact with the through-hole 462.

In a structure illustrated in FIG. 14-2(*b*), the convex projection 460 has a structure of being disposed on the entire outer circumference of the through-hole 462, and a notch 460*g* is provided at a part on the downstream side of the through-hole 462 in the inflow direction of a physical quantity.

In other words, the projecting part 460*f* of the convex projection 460 has a ring shape which is circumferentially continued so as to surround the circumference of an opening of the through-hole 462 which is open in the rear surface 431 of the measurement channel surface, and the notch 460*g* which is partially notched on the downstream side is provided. In a case where a water drop scatters and reaches the through-hole 462 crossing over the projecting part 460*g*, the notch 460*g* is used to discharge the water drop to the downstream side which is a lower side of the through-hole 462. Preferably, the notch 460*g* is disposed along a flow line of the inflow direction of a physical quantity and is disposed on the downstream side of the through-hole 462.

5. Circuit Configuration of Physical Quantity Measurement Device 300

5.1 Entire Circuit Configuration of Physical Quantity Measurement Device 300

FIG. 11-1 is a circuit diagram of the physical quantity measurement device 300. The physical quantity measurement device 300 includes a flow rate measurement circuit 601 and a temperature/humidity measurement circuit 701.

The flow rate measurement circuit 601 includes the flow rate measurement portion 602 having a heat generation body 608, and a processing portion 604. The processing portion 604 controls a heating value of the heat generation body 608 of the flow rate measurement portion 602, and outputs a signal indicating a flow rate to the microcomputer 415 via a terminal 662 on the basis of an output from the flow rate measurement portion 602. In order to perform the process, the processing portion 604 includes a central processing unit (CPU) 612, an input circuit 614, an output circuit 616, a memory 618 holding data indicating a relationship between a correction value or a measurement value and a flow rate, and a power source circuit 622 which supplies a predetermined voltage to each necessary circuit. DC power is supplied to the power source circuit 622 from an external power source such as an on-vehicle battery via a terminal 664 and a ground terminal (not illustrated).

The flow rate measurement portion 602 is provided with the heat generation body 608 heating the gas 30 to be measured. The power source circuit 622 supplies a voltage V1 to a collector of a transistor 606 forming a current supply circuit of the heat generation body 608, a control signal is applied to a base of the transistor 606 from the CPU 612 via the output circuit 616, and a current is supplied to the heat generation body 608 from the transistor 606 via a terminal 624 on the basis of the control signal. A current amount supplied to the heat generation body 608 is controlled on the basis of a control signal applied to the transistor 606 forming the current supply circuit of the heat generation body 608 from the CPU 612 via the output circuit 616. The processing portion 604 controls a heating value of the heat generation body 608 such that the temperature of the gas 30 to be measured is increased from an initial temperature to a predetermined temperature, for example, 100° C. through heating in the heat generation body 608.

The flow rate measurement portion 602 includes a heat generation control bridge 640 for controlling a heating value of the heat generation body 608 and a flow rate sensing bridge 650 for measuring a flow rate. A predetermined voltage V3 is supplied to one end of the heat generation control bridge 640 from the power source circuit 622 via a terminal 626, and the other end of the heat generation control bridge 640 is connected to a ground terminal 630. A predetermined voltage V2 is supplied to one end of the flow rate sensing bridge 650 from the power source circuit 622 via a terminal 625, and the other end of the flow rate sensing bridge 650 is connected to the ground terminal 630.

The heat generation control bridge 640 has a resistor 642 which is a temperature measurement resistor of which a resistance value changes depending on the temperature of the gas 30 to be measured, and the resistor 642, a resistor 644, a resistor 646, and a resistor 648 form a bridge circuit. A potential difference between an intersection A between the resistor 642 and the resistor 646 and an intersection B between the resistor 644 and the resistor 648 is input to the input circuit 614 via a terminal 627 and a terminal 628, and the CPU 612 controls a current supplied from the transistor 606 such that the potential difference between the intersection A and the intersection B becomes a predetermined value, for example, a zero volts in this Example, and thus controls a heating value of the heat generation body 608. The flow rate measurement circuit 601 illustrated in FIG. 11-1 heats the gas 30 to be measured with the heat generation body 608 such that the initial temperature of the gas 30 to be measured is increased to a predetermined temperature, for example, 100° C. at all times. In order to perform the heating control with high accuracy, when the temperature of the gas 30 to be measured which is warmed by the heat generation body 608 is increased from an initial temperature to a predetermined temperature, for example, 100° C. at all times, a resistance value of each resistor forming the heat generation control bridge 640 is set such that a potential difference between the intersection A and the intersection B becomes zero volts. Therefore, in the flow rate measurement circuit 601, the CPU 612 controls a current supplied to the heat generation body 608 such that a potential difference between the intersection A and the intersection B becomes zero volts.

The flow rate sensing bridge 650 is formed of four temperature measurement resistors such as a resistor 652, a resistor 654, a resistor 656, and a resistor 658. The four temperature measurement resistors are disposed along a flow of the gas 30 to be measured, the resistor 652 and the resistor 654 are disposed on an upstream side of a channel of the gas 30 to be measured with respect to the heat generation body 608, and the resistor 656 and the resistor 658 are disposed on a downstream side of the channel of the gas 30 to be measured with respect to the heat generation body 608. In order to increase measurement accuracy, the resistor 652 and the resistor 654 are disposed such that distances thereof to the heat generation body 608 are substantially the same as each other, and the resistor 656 and the resistor 658 are disposed such that distances thereof to the heat generation body 608 are substantially the same as each other.

A potential difference between an intersection C between the resistor 652 and the resistor 656 and an intersection D between the resistor 654 and the resistor 658 is input to the input circuit 614 via a terminal 631 and a terminal 632. Each resistance of the flow rate sensing bridge 650 is set such that a potential difference between the intersection C and the intersection D becomes zero, for example, in a state in which a flow of the gas 30 to be measured is zero in order to increase measurement accuracy. Therefore, in a state in which a potential difference between the intersection C and the intersection D is, for example, zero volts, the CPU 612 outputs an electric signal indicating that a flow rate of the main passage 124 is zero from the terminal 662 on the basis of a measurement result of the flow rate of the gas 30 to be measured being zero.

In a case where the gas 30 to be measured flows in an arrow direction in FIG. 11-1, the resistor 652 or the resistor 654 disposed on the upstream side is cooled by the gas 30 to be measured, the resistor 656 or the resistor 658 disposed on the downstream side of the gas 30 to be measured is warmed by the gas 30 to be measured which is warmed by the heat generation body 608, and thus the temperatures of the resistor 656 and the resistor 658 are increased. Thus, a potential difference occurs between the intersection C and the intersection D of the flow rate sensing bridge 650, and this potential difference is input to the input circuit 614 via the terminal 631 and the terminal 632. The CPU 612 searches for data indicating a relationship between the potential difference and a flow rate of the main passage 124 stored in the memory 618 on the basis of the potential difference occurs between the intersection C and the intersection D of the flow rate sensing bridge 650, so as to obtain a flow rate of the main passage 124. An electric signal indicating the flow rate of the main passage 124 obtained in the above-described way is output via the terminal 662. A terminal 664 and the terminal 662 illustrated in FIG. 11-1 are given new reference numerals, but are included in the connection terminal 412 illustrated in FIG. 9-1 described above.

The memory 618 stores data indicating a relationship between a potential difference between the intersection C and the intersection D and a flow rate of the main passage 124, and also stores correction data for reducing a measurement error such as a variation, obtained on the basis of an actually measured value of a gas after the circuit board 400 is produced.

The temperature/humidity measurement circuit 701 includes an input circuit such as an amplifier/A/D converter to which measurement signals from the temperature sensor 453 and the humidity sensor 422 are input, an output circuit, a memory which holds data indicating a relationship between a correction value or a temperature and absolute humidity, and the power source circuit 622 which supplies a predetermined voltage to a necessary circuit. Signals output from the flow rate measurement circuit 601 and the temperature/humidity measurement circuit 701 are input to the microcomputer 415. The microcomputer 415 includes a flow rate computation unit, a temperature computation unit, and an absolute humidity computation unit, calculates a flow rate, a temperature, and absolute humidity which are physical quantities of the gas 30 to be measured on the basis of the signals, and outputs the calculated physical quantities to an ECU 200.

The physical quantity measurement device 300 and the ECU 200 are connected to each other via a communication cable, and perform communication using digital signals based on a communication standard such as SENT, LIN, or CAN. In the present example, a signal is input to a LIN driver 420 from the microcomputer 415, and LIN communication is performed from the LIN driver 420. Information which is output to the ECU 200 from the LIN driver of the physical quantity measurement device 300 is output in a superimposed manner through digital communication by using a single-wire or two-wire communication cable.

The absolute humidity computation unit of the microcomputer 415 performs a process of computing absolute humidity on the basis of information regarding relative humidity which is output from the humidity sensor 422 and temperature information, and correcting the absolute humidity on the basis of an error. The corrected absolute humidity computed by the absolute humidity computation unit is used for various pieces of engine operation control in a control unit 62 of an ECU 18. The ECU 18 may directly use comprehensive error information for various pieces of engine operation control.

In the Example illustrated in FIG. 11, a description has been made of a case where the physical quantity measurement device 300 includes the LIN driver 420 and performs LIN communication, but the present invention is not limited thereto, and direct communication with the microcomputer 415 may be performed without using LIN communication as illustrated in FIG. 11-2.

As mentioned above, the embodiments of the present invention have been described in detail, but the present invention is not limited to the embodiments, and various design modifications may occur within the scope without departing from the spirit of the present invention disclosed in the claims. The embodiments have been described in detail for better understanding of the present invention, and thus are not necessarily limited to including all of the above-described configurations. Some configurations of a certain embodiment may be replaced with some configurations of another embodiment, and some configurations or all configurations of another embodiment may be added to configurations of a certain embodiment. The configurations of other embodiments may be added to, deleted from, and replaced with some of the configurations of each embodiment.

REFERENCE SIGNS LIST

30 GAS TO BE MEASURED
124 MAIN PASSAGE
300 PHYSICAL QUANTITY MEASUREMENT DEVICE
302 HOUSING
400 CIRCUIT BOARD
401 BOARD MAIN BODY

403 PROTRUSION PART
430 MEASUREMENT CHANNEL SURFACE
431 REAR SURFACE OF MEASUREMENT CHANNEL SURFACE
602 FLOW RATE MEASUREMENT PORTION
403a RECESSED PART
418 SYNTHETIC RESIN
450 PROTRUSION PART
451 TEMPERATURE MEASUREMENT PORTION
453 TEMPERATURE SENSOR
460 CONVEX PROJECTION
460a PROJECTING PART
460e SLIT
460g NOTCH
461 RESIST COAT
462 THROUGH-HOLE

The invention claimed is:

1. A physical quantity measurement device comprising:
a circuit board configured to measure a physical quantity of a gas to be measured passing through a main passage and to perform a calculation process on the physical quantity measured by the measurement function; and
a housing in which the circuit board is stored,
wherein, in the circuit board, a physical quantity measurement portion mounted on a part of the circuit board and the part of the circuit board are exposed to a physical quantity measurement space,
wherein a plurality of projections which are individually electrically disconnected from a circuit wiring are provided on the part of the circuit board,
wherein the circuit board is provided with a through-hole for ventilation between the physical quantity measurement portion and outside air, and
wherein, in a case where a dimension of an upper bottom of the projection is indicated by L1, a dimension of a lower bottom of the projection is indicated by L2, a dimension of a gap between adjacent projections is indicated by L3, and an inner diameter of the through-hole provided in the circuit board is indicated by $\phi d$, the projection satisfies a relationship of L1<L2, and $\phi d \geq L2 \geq L3$.

2. The physical quantity measurement device according to claim 1,
wherein the circuit board is a printed board, and
wherein the plurality of projections are projections which are formed when a pattern is formed on the printed board through etching processing on copper foils and plate.

3. The physical quantity measurement device according to claim 1,
wherein the projections are provided on only a surface of the circuit board in which the through-hole is open.

4. The physical quantity measurement device according to claim 1,
wherein a planar shape of each of the projections provided on the circuit board is a circular shape or an elliptical shape.

5. The physical quantity measurement device according to claim 1,
wherein the projections are provided to be arranged in a grid form centering on the through-hole provided in the circuit board.

6. The physical quantity measurement device according to claim 1,
wherein the projections are provided to be arranged in a zigzag form centering on the through-hole provided in the circuit board.

7. The physical quantity measurement device according to claim 1,
wherein the projections are provided to be arranged radially centering on the through-hole provided in the circuit board.

8. A physical quantity measurement device comprising:
a circuit board configured to measure a physical quantity of a gas to be measured passing through a main passage and to perform a calculation process on the physical quantity measured by the measurement function; and
a housing in which the circuit board is stored,
wherein, in the circuit board, a physical quantity measurement portion mounted on a part of the circuit board and the part of the circuit board are exposed to a physical quantity measurement space,
wherein a plurality of projections which are individually electrically disconnected from a circuit wiring are provided on the part of the circuit board,
wherein the circuit board is provided with a through-hole for ventilation between the physical quantity measurement portion and outside air, and
wherein a projection with a shape larger than the through-hole is disposed further toward an upstream side in an inflow direction of the gas to be measured than the through-hole, and is used as a front obstacle.

9. The physical quantity measurement device according to claim 8,
wherein elongated slit-shaped projections are provided to be arranged along the inflow direction of the gas to be measured.

10. The physical quantity measurement device according to claim 9,
wherein the slit-shaped projections are disposed to be inclined obliquely with respect to the inflow direction of the gas to be measured.

11. The physical quantity measurement device according to claim 8,
wherein a projection of which a planar shape is a tuning fork shape and which branches into two ways is provided along the inflow direction of the gas to be measured, and
wherein the through-hole is disposed inside branches of the projection.

12. The physical quantity measurement device according to claim 8,
wherein the projection has a ring shape which is circumferentially continued so as to surround a periphery of an opening of the through-hole.

13. The physical quantity measurement device according to claim 12,
wherein the projection has a notch formed by notching a part of the ring shape on a downstream side in the inflow direction of the gas to be measured.

* * * * *